(12) United States Patent
Boutakis

(10) Patent No.: US 11,235,833 B2
(45) Date of Patent: Feb. 1, 2022

(54) COMPACTABLE BICYCLE

(71) Applicant: HELIX LABS INC., Toronto (CA)

(72) Inventor: Peter Boutakis, North York (CA)

(73) Assignee: HELIX LABS INC., Toronto (CA)

( * ) Notice: Subject to any disclaimer, the term of this patent is extended or adjusted under 35 U.S.C. 154(b) by 360 days.

(21) Appl. No.: 16/338,847

(22) PCT Filed: Oct. 3, 2017

(86) PCT No.: PCT/CA2017/051178
§ 371 (c)(1),
(2) Date: Apr. 2, 2019

(87) PCT Pub. No.: WO2018/064763
PCT Pub. Date: Apr. 12, 2018

(65) Prior Publication Data
US 2020/0391817 A1    Dec. 17, 2020

Related U.S. Application Data

(60) Provisional application No. 62/403,541, filed on Oct. 3, 2016.

(51) Int. Cl.
*B62K 15/00*     (2006.01)
*B62K 21/24*     (2006.01)

(52) U.S. Cl.
CPC ............ *B62K 15/008* (2013.01); *B62K 21/24* (2013.01)

(58) Field of Classification Search
CPC .............................. B62K 15/008; B62K 21/24
(Continued)

(56) References Cited

U.S. PATENT DOCUMENTS 1,584,314 A * 5/1926 Mamiya ............... B62K 15/006
280/278
4,507,034 A 3/1985 Lew
(Continued)

FOREIGN PATENT DOCUMENTS

CN          2525024 Y      12/2002
CN        201494567 U      6/2010
(Continued)

OTHER PUBLICATIONS

Office Action for Chinese Patent Application No. 201910660141.9 dated May 7, 2020.
(Continued)

*Primary Examiner* — Kevin Hurley
*Assistant Examiner* — Felicia L. Brittman
(74) *Attorney, Agent, or Firm* — Millman IP Inc.

(57) ABSTRACT

In an aspect, a compactable bicycle is provided, comprising a base frame portion and a steering structure, at least one of which has a first and a second frame element. Each frame element has a locking surface, an end, and an aperture. The frame elements are positionable in a first position wherein the first and second apertures are aligned and the locking surfaces face away from one another, and in a second position in which the apertures are unaligned. A plunger has first and second plunger locking surfaces and is movable to a clamping position where it extends in both the first and second apertures and engages the first frame element locking surfaces, and a release position wherein the plunger retracts from the second aperture sufficiently to permit the first and second ends to be separated from one another.

12 Claims, 36 Drawing Sheets

(58) Field of Classification Search
 USPC .................................................... 280/491.1
 See application file for complete search history.

(56) References Cited

U.S. PATENT DOCUMENTS

| | | | |
|---|---|---|---|
| 5,301,972 A | 4/1994 | Lee | |
| 7,584,978 B2 | 9/2009 | Pourias | |
| 2007/0187922 A1* | 8/2007 | Boutakis | ................ B62M 17/00 |
| | | | 280/287 |
| 2010/0230927 A1 | 11/2010 | Yeh | |
| 2012/0024102 A1 | 2/2012 | Marion | |

FOREIGN PATENT DOCUMENTS

| | | |
|---|---|---|
| CN | 102582747 A | 7/2012 |
| CN | 202491887 U | 10/2012 |
| CN | 1867481 A | 11/2016 |
| DE | 1906014 A1 | 8/1969 |
| DE | 202009015884 U1 | 5/2011 |
| DE | 10328309 B4 | 2/2012 |
| EP | 3025946 A1 | 6/2016 |
| GB | 604113 A * | 6/1948 ........... B62K 15/006 |
| JP | S59155311 U | 10/1984 |
| JP | 3108848 U | 4/2005 |
| JP | 2007-508201 A | 4/2007 |
| JP | 2012-91586 A | 5/2012 |
| WO | 2004024546 A1 | 3/2004 |
| WO | 2011122738 A1 | 10/2011 |
| WO | 2015196286 A1 | 12/2015 |

OTHER PUBLICATIONS

Office Action for Chinese Patent Application No. 201710930836.5 dated May 7, 2020.
Extended European Search Report for Application No. 17857735.9 dated May 27, 2020.
Office Action for Canadian Patent Application No. 2,953,395 dated Jul. 9, 2020.
International Search Report and Written Opinion for PCT/CA2017/051178 dated Apr. 2, 2019.
Office Action for Japanese Patent Application No. 2017-519734 dated Apr. 23, 2019.
Office Action for Taiwanese Patent Application No. 104120258 dated Sep. 28, 2018.
Office Action for Chinese Patent Application No. 201580045231.7 dated Sep. 29, 2018.

* cited by examiner

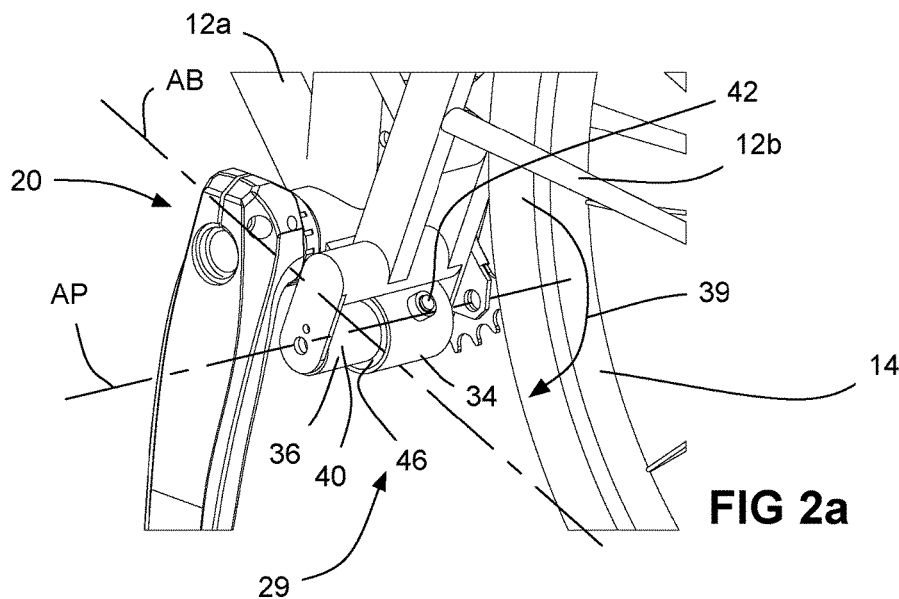
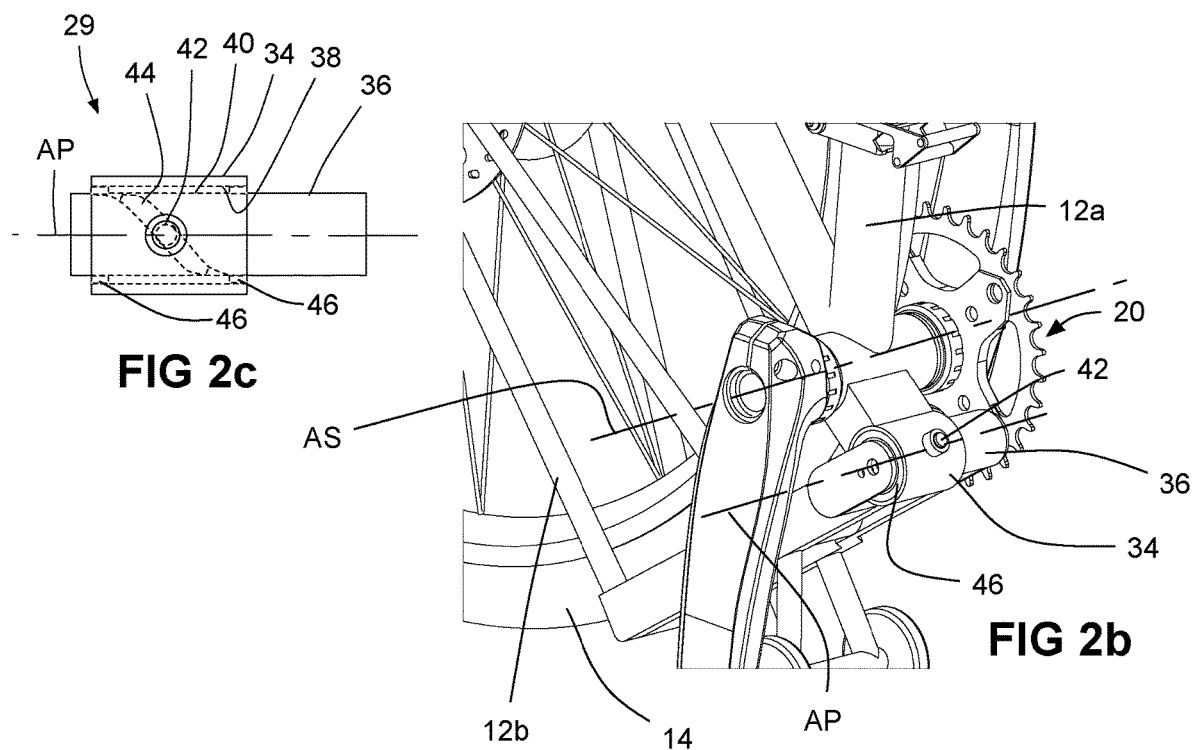

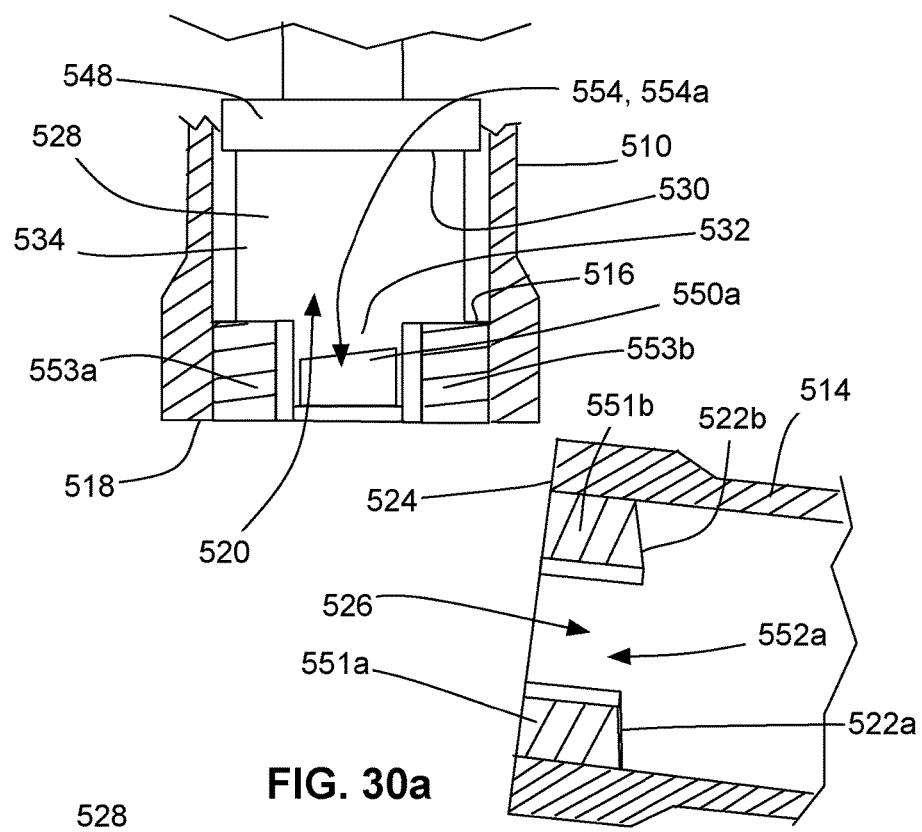
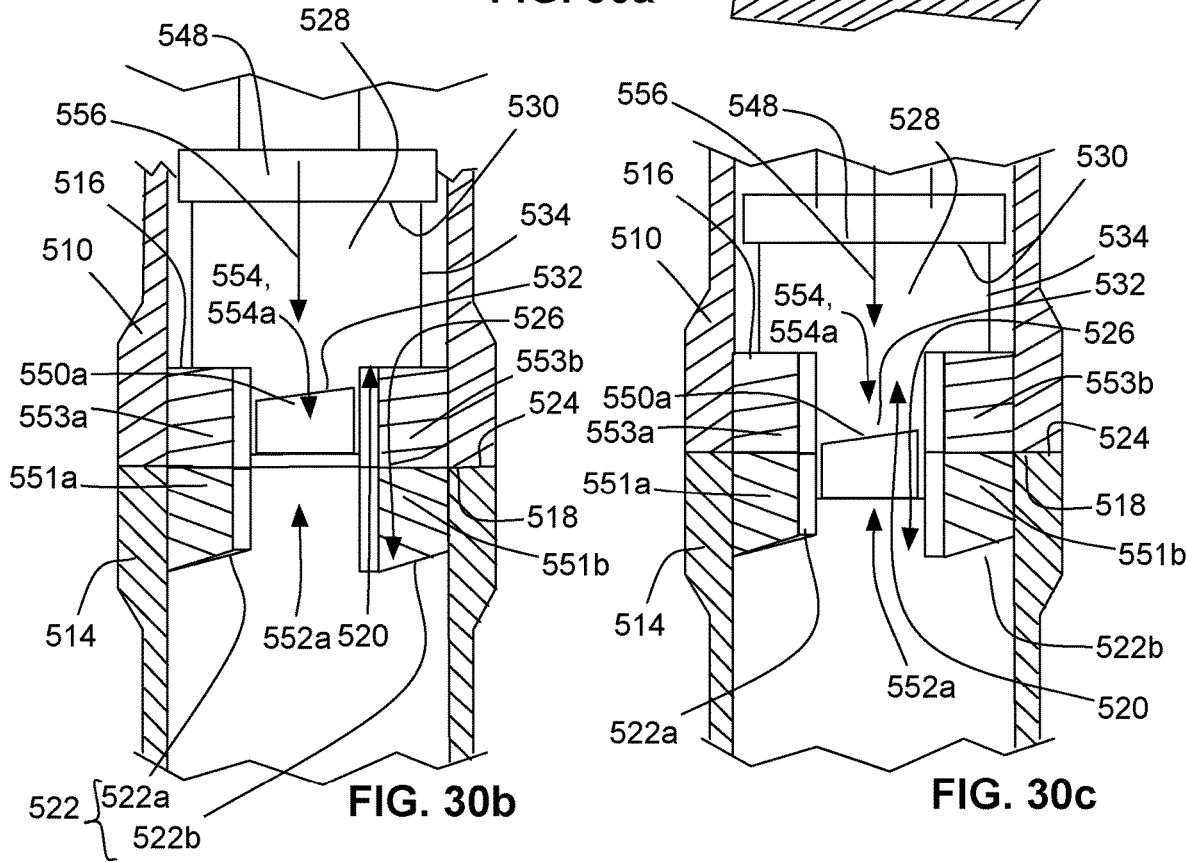
FIG. 30a
FIG. 30b
FIG. 30c

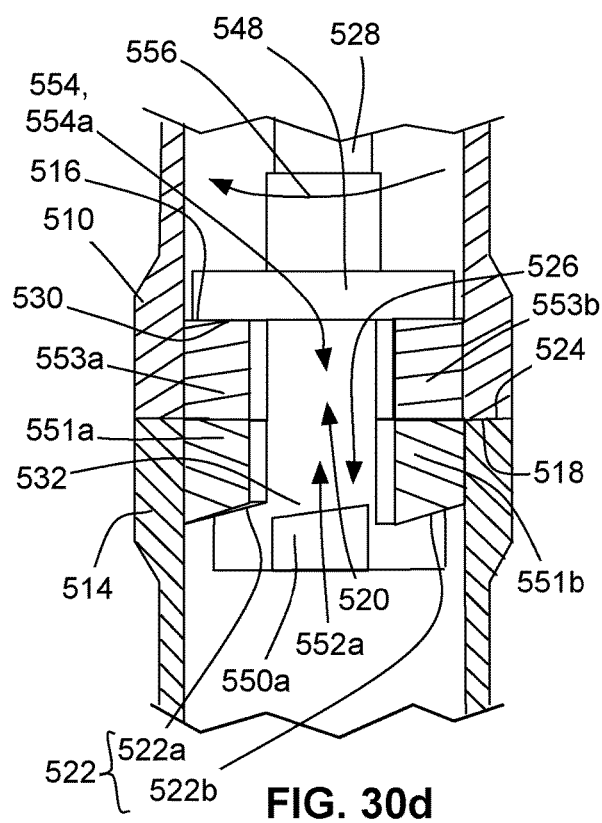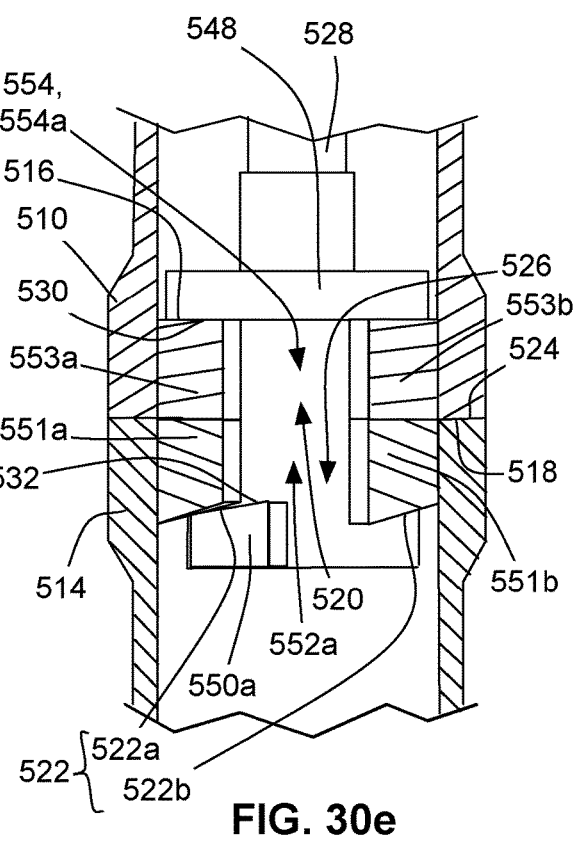

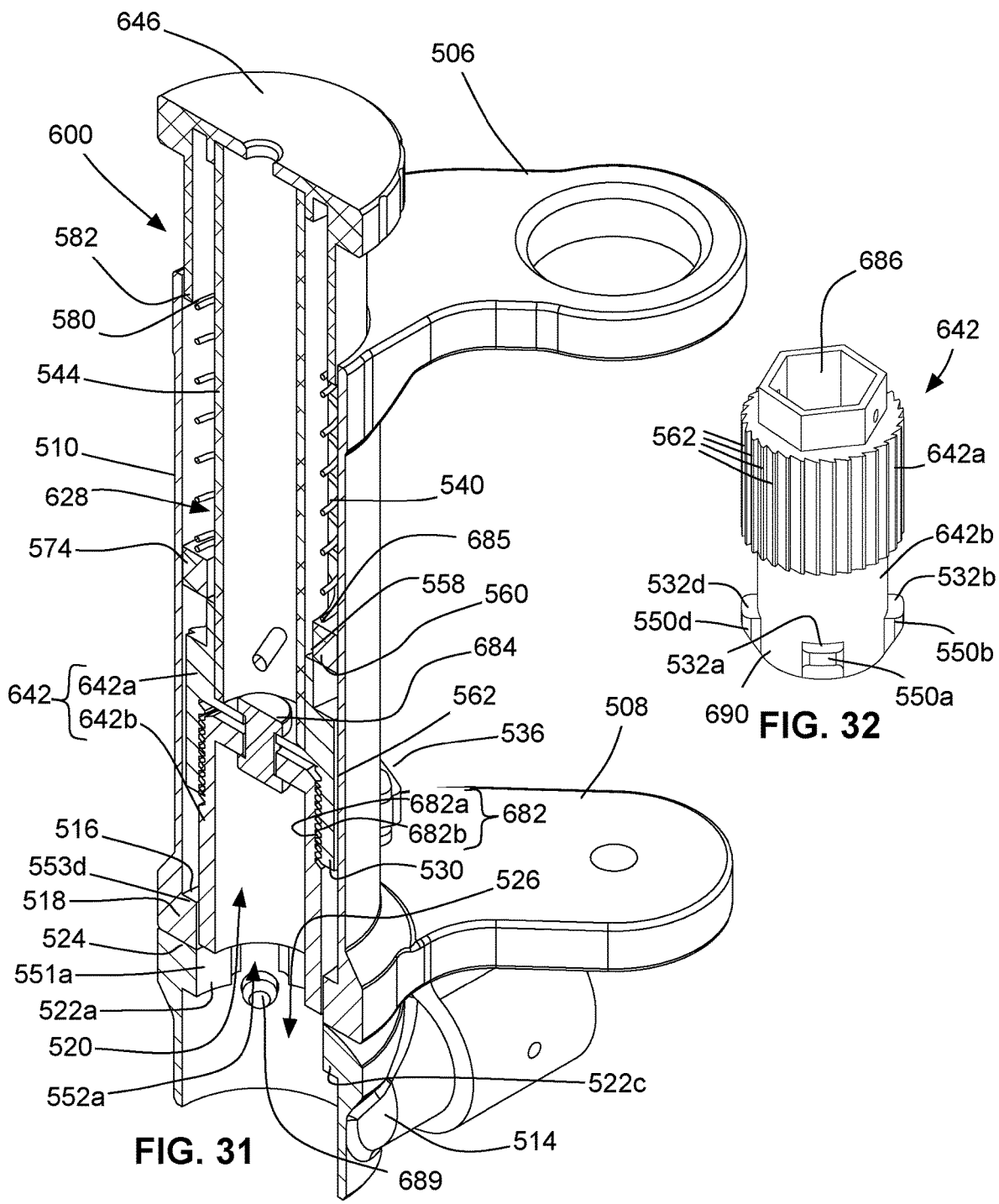

COMPACTABLE BICYCLE

CROSS-REFERENCE TO RELATED APPLICATIONS

This application claims the benefit of priority to U.S. Provisional Patent Application No. 62/403,541 filed Oct. 3, 2016, which incorporates by reference PCT/CA2015/050584, filed on Jun. 23, 2015, the contents of both of which are incorporated herein in their entirety.

FIELD

The present disclosure relates to bicycles that can be compacted for storage and more particularly to folding bicycles.

BACKGROUND

There are many designs for folding bicycles. Typically such designs are relatively weak structurally rendering the bicycle frame at risk of premature failure. Additionally such designs are typically inefficient in that they do not fold into a relatively compact shape.

There is consequently a need for a folding bicycle that addresses at least one of these and/or other shortcomings in existing folding bicycle designs.

SUMMARY

This section provides a general summary of the disclosure, and is not a comprehensive disclosure of its full scope or all of its features.

In one aspect, a compactable bicycle is provided, which includes a frame, a locking mechanism, and first and second wheels. The frame includes a first frame portion and a second frame portion. The first frame portion includes a first tube having an inner surface and the second frame portion includes a second tube having an inner surface. The first and second frame portions are arrangeable together in a use position in which the first and second tubes are aligned with one another. The locking mechanism includes a base member, an expandable member mounted to the base member, and a driver that is movable to releasably drive expansion of the expandable member against the inner surfaces of the first and second tubes to releasably lock the first and second frame portions together in the use position. The first and second bicycle wheels are mounted to the frame.

In another aspect, a compactable bicycle having a length, a height and a width, is provided. The bicycle includes a base frame portion and a steering structure. The base frame portion includes a seat tube and a head tube, and at least one connecting tube that connects the seat tube and the head tube, and a rear frame portion that has a rear wheel mounted thereto for engagement with a ground surface for supporting the compactable bicycle thereon. The steering structure includes a steering tube rotatably mounted in the head tube, a handlebar frame portion connected to the steering tube, and a front wheel support having a front wheel connected thereto. The front wheel support has a front wheel support connecting end axis and a first end face that extends in a first end face plane that is generally normal to the first end face axis. The steering tube has a steering tube connecting end axis and a second end face that extends in a second end face plane that is generally normal to the steering tube connecting end axis. The front wheel support is movable between a use position in which the front wheel support connecting end axis is aligned with the steering tube connecting end axis, in which the first and second end faces abut one another, and in which the front wheel is engageable with a ground surface for supporting the compactable bicycle thereon, and a storage position in which the front wheel support connecting end axis is unaligned with the steering tube connecting end axis, in which the first and second end faces are spaced from one another.

In another aspect, a compactable bicycle is provided and includes a first frame portion and a first pivot connection. The first frame portion defines a longitudinal frame axis, a lateral frame axis and a vertical frame axis, a second frame portion, and a third frame portion. Each of the second and third frame portions has a bicycle wheel associated therewith such that the second frame portion has a rear wheel connected thereto and the third frame portion has a front wheel connected thereto. The first pivot connection includes a first outer member that is tubular and has a first outer member axis that extends generally laterally relative to the longitudinal frame axis, and a first inner member that is pivotably connected to the outer member for pivoting movement within the outer member about the outer member axis, and that is slidable laterally relative to the first outer member. One of the first inner and first outer members is connected to the first frame portion and the other of the first inner and first outer members is connected to one of the second and third frame portions. The aforementioned one of the second and third frame portions is positionable via the first pivot connection in a use position in which the wheel associated with said one of the second and third frame portions is orientable to be coplanar with the first frame portion and to be engageable with a ground surface to support the compactable bicycle thereon, and in a folded position in which the wheel associated with said one of the second and third frame portions is laterally adjacent to the first frame portion.

In another aspect, a compactable bicycle is provided and includes a main frame portion and an axle. The main frame portion includes a seat tube and a head tube, and at least one connecting tube that connects the seat tube and the head tube. The rear frame portion is movably mounted to the main frame portion and has a rear wheel mounted thereto. The rear frame portion is movable between a use position in which the rear wheel is engageable with a ground surface to support the compactable bicycle thereon, and a folded position. The axle is supported on the rear frame portion, and at least one folded position support wheel supported on the axle. When the rear frame portion is in the use position, the at least one folded position support wheel is supported off the ground surface, and when the rear frame portion is in the folded position, the at least one folded position support wheel is engageable with the ground surface to support the compactable bicycle thereon. In an embodiment, a hook member is provided on the main frame portion and is pivotable between an engagement position in which the hook member is positioned to engage the axle to retain the rear frame portion in the use position, and a release position in which the hook member is positioned to permit movement of the rear frame portion away from the use position. Optionally, a hook member biasing member is provided and is positioned to urge the hook member towards the engagement position.

In another aspect, a compactable bicycle is provided and includes a base frame portion and a steering structure. The base frame portion includes a seat tube and a head tube, at least one connecting tube that connects the seat tube and the head tube, and a rear frame portion that has a rear wheel mounted thereto for engagement with a ground surface for supporting the compactable bicycle thereon. The steering structure includes a steering member rotatably mounted in the head tube, a handlebar, and a front wheel support having a front wheel connected thereto for engagement with the ground surface for supporting the compactable bicycle thereon. The steering member includes a first steering member portion and a second steering member portion that are removably connectable together. The first steering member portion has the handlebar connected thereto and the second steering member portion has the front wheel support connected thereto. The head tube includes a first head tube portion that holds the first steering member portion, and a second head tube portion that holds the second steering member portion. The second head tube portion is movable relative to the first head tube portion between a first head tube position in which the second head tube portion carries the first steering member portion to a use position which is superjacent to the second steering member portion, and a second head tube position in which the second head tube portion is in a stowage position and holds the second steering member portion in a stowage position spaced away from the first steering member portion. When the first steering member portion is in the use position the first steering member portion is connectable to the second steering member portion.

In another aspect, a compactable bicycle is provided and includes a frame including a base frame portion having a rear wheel mounted thereto for engagement with a ground surface for supporting the compactable bicycle thereon and a steering structure rotatably mounted to the base frame portion and having a front wheel connected thereto for engagement with the ground surface for supporting the compactable bicycle thereon. At least one of the base frame portion and the steering structure includes a first frame element having a first frame element locking surface, a first end, and a first aperture at the first end, and a second frame element having a second frame element locking surface, a second end and a second aperture at the second end. The first and second frame elements are positionable in a first position in which the first and second apertures are generally aligned with one another and the first and second frame element locking surfaces generally face away from one another, and in a second position in which the first and second apertures are generally unaligned with one another. A plunger is provided and has a first plunger locking surface, a second plunger locking surface. The plunger is movable to a clamping position in which the plunger extends in both the first and second apertures such that the first plunger locking surface engages the first frame element locking surface and the second plunger locking surface engages the second frame element locking surface. The plunger is movable to a release position in which the plunger retracts from the second aperture sufficiently to permit the first and second ends to be separated from one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2a and 2b are perspective views of a portion of the folding bicycle shown in FIG. 1a, illustrating the folding of a rear frame portion of the folding bicycle;

FIG. 2c is a magnified elevation view of a pivot connection shown in FIGS. 2a and 2b;

FIGS. 5 and 6 are perspective views that illustration the operation of a locking mechanism for the rear frame portion of the folding bicycle shown in FIG. 1a;

FIG. 8a is an elevation view of a locking mechanism that can be used to hold two frame portions together on the folding bicycle shown in FIG. 1a;

FIGS. 30a-30e illustrate locking and unlocking of first and second frame elements of the bicycle;

FIG. 31 is a sectional perspective view of another locking mechanism for use with the bicycle shown in FIG. 1a;

FIG. 32 is a perspective view of a portion of a plunger that is part of the locking mechanism shown in FIG. 31;

FIG. 35 is a sectional perspective view of another locking mechanism for use with the bicycle shown in FIG. 1a;

DETAILED DESCRIPTION

Figure 1A:
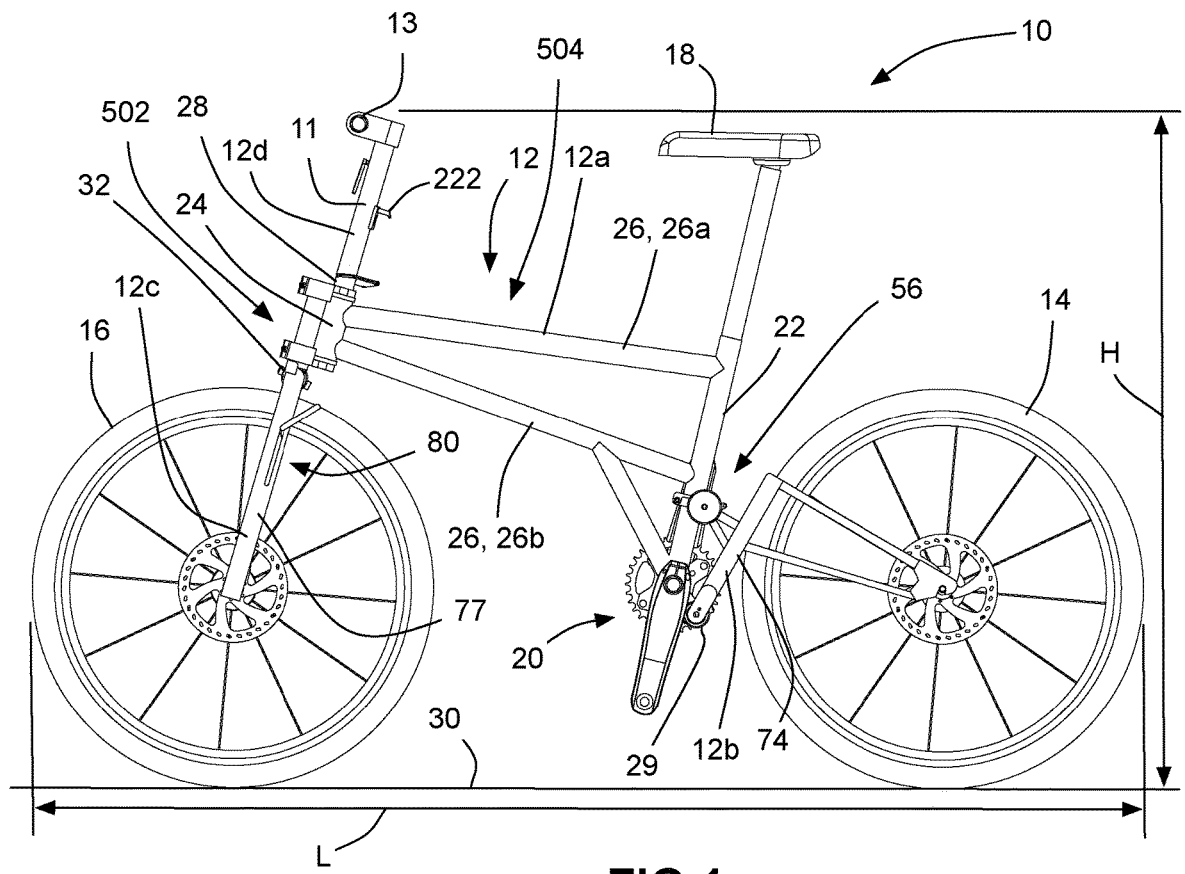
FIG. 1a is an elevation view of a compactable (e.g. folding) bicycle in accordance with the teachings of the present disclosure, in a use position.
Figure 1B:
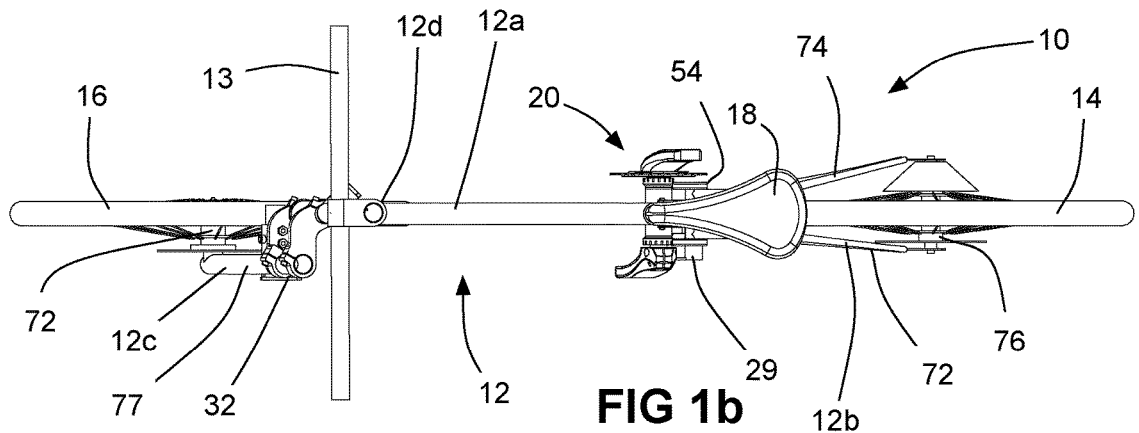
FIG. 1b is a top plan view of the folding bicycle shown in FIG. 1a, in the use position.

Reference is made to FIGS. 1a and 1b, which show a compactable bicycle 10 in accordance with an embodiment of the present disclosure. The folding bicycle 10 is movable between a use position shown in FIGS. 1a and 1b, and a storage position (which in the example shown may also be referred to as a folded position) shown in FIGS. 1f and 1g. The bicycle 10 in the embodiment shown in FIGS. 1a and 1b is compactable by a folding mechanism for selected components of the bicycle 10. However, it will be noted that, in some other embodiments, the bicycle 10 may be compactable by way of other types of mechanism aside from folding mechanisms, an example of which is described below in relation to FIGS. 19-23. For convenience, the bicycle 10 is referred to in some embodiments as a folding bicycle (in embodiments in which a folding mechanism is shown), however, it will be understood that the bicycle 10 may be more broadly referred to as compactable, and the folding mechanisms shown in the figures included herewith may be replaced in some embodiments by any other suitable types of mechanism for compacting the bicycle for the purposes of storage.

The folding bicycle 10 includes a frame 12, a rear wheel 14, a front wheel 16, a seat 18, and a drive component set generally shown at 20. The drive component set 20 includes components such as a crankset with at least one crankset sprocket, at least one rear wheel sprocket on the rear wheel 14, a chain connecting the crankset sprocket and rear wheel sprocket, and pedals that connect to the crankset. The drive component set 20 is envisioned to be included in the folding bicycle 10 typically, however it is possible to provide a version of the folding bicycle 10 that does not have a drive component set (e.g. a running bicycle).

The frame 12 comprises a main frame portion 12a, a rear frame portion 12b, a front wheel support 12c and a handlebar frame portion 12d that includes a handlebar support 11 to which a handlebar 13 is mounted. These frame portions 12a-12d may also be referred to as first, second, third and fourth frame portions 12a, 12b, 12c and 12d. For greater certainty, it will be understood, that any one of these frame portions 12a-12d may be considered the 'first' frame portion, any one may be considered the second, any one may be considered the third and any one may be considered the fourth. Different frame portions may be considered first, second, third or fourth in different contexts herein. Any limitations in this regard will be described below.

The main frame portion 12a may include a seat tube 22, a head tube 24, at least one connecting tube 26 and a steering tube 28. In the example shown there are two connecting tubes (a top tube 26a and a down tube 26b) that connect the seat tube 22 and the head tube 24, however any other suitable number of connecting tubes 26 may be provided. The connecting tubes 26 in the example shown permanently connect the seat tube 22 and head tube 24 (e.g. by welded connections to both or by a forming process where all of the tubes 22, 24 and 26 are formed together all at once). A permanent connection is preferred as it provides a main frame portion that is relatively strong, in particular where a main triangle is formed that extends all the way from the head tube 24 to the seat tube 22 as is shown in the figures. However, it is possible to provide a main frame portion that includes a main triangle that does not extend all the way between the seat tube 22 and the head tube 24 (e.g. where there is a down tube that extends from the seat tube 22 to a point midway along the length of the top tube), or that does not include a main triangle at all (e.g. where there is only a top tube that connects the seat tube 22 and head tube 24). Additionally, it is possible in some embodiments (although less preferable in some instances) to provide a main frame portion that is itself divided into two or more portions that are connected together via hinges or the like. The main frame portion 12a has a first side 25 and a second side 27, which are described further below with reference to the folding of the folding bicycle 10.

The steering tube 28 is pivotably mounted in the head tube 24. The steering tube 28 has both the front wheel support 12c and the handlebar frame portion 12d connected to it. Together the steering tube 28, the front wheel support 12c and the handlebar frame portion 12d make up a steering structure 504 (FIG. 1a), while the head tube 24, the seat tube 22, the connecting tubes 26 and the rear frame portion 12b make up a base frame portion 502 (FIG. 1a) to which the steering structure is pivotally mounted.

Figure 1C:
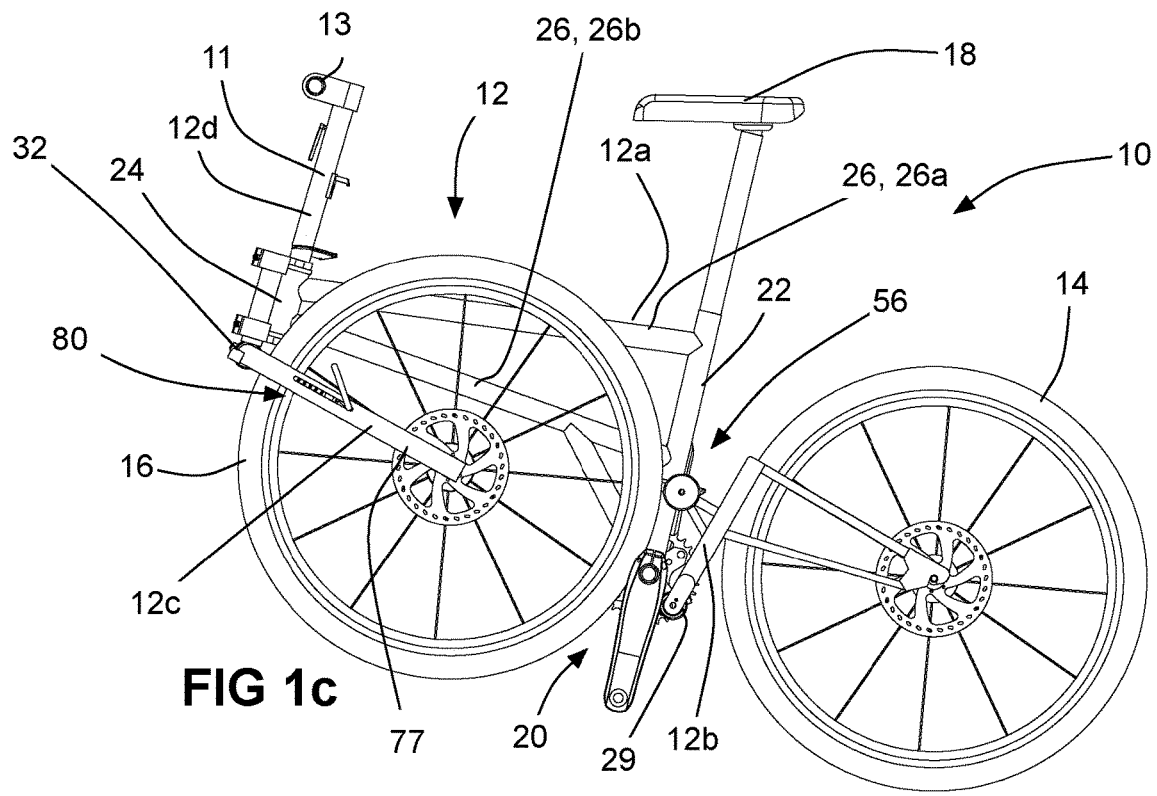
FIG. 1c is an elevation view of the folding bicycle shown in FIG. 1a in a partially folded position.
Figure 1D:
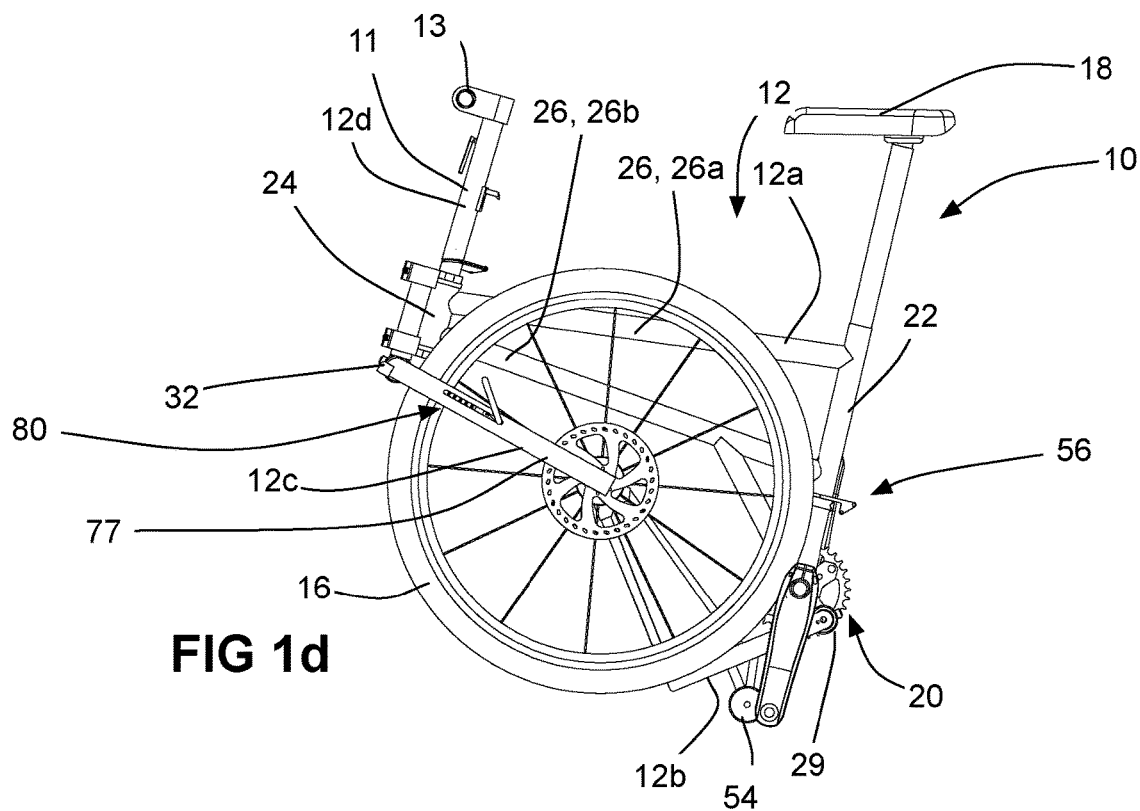
FIG. 1d is an elevation view of the folding bicycle shown in FIG. 1a in a further folded position.

The rear frame portion 12b has the rear wheel 14 connected thereto, and is movably connected to the main frame portion by a pivot connection 29, and is movable via the pivot connection 29 between a use position shown in FIG. 1a, and a folded position shown in FIGS. 1c and 1d. When the rear frame portion 12b is in the use position, the rear wheel 14 is engageable with a ground surface (shown at 30 in FIG. 1a) for supporting the folding bicycle 10 thereon. When the rear frame portion 12b is in the folded position, at least one of the length (shown at L) and the height (shown at H) is reduced relative to when rear frame portion 12b is in the use position.

The pivot connection 29 is shown more clearly in FIGS. 2a-2c and may be referred to as a first pivot connection 29, since there is another pivot connection shown at 32 that connects the front wheel support 12c to the main frame portion 12a. As can be seen, the first pivot connection 29 includes a first outer member 34 that is tubular and has a first outer member axis AP that extends generally laterally relative to the longitudinal bicycle frame axis, shown at AB. The pivot connection 29 further includes a first inner member 36 that is pivotably connected to the outer member 34 for pivoting movement within the outer member 34 about the outer member axis AP, and that is slidable laterally relative to the outer member 34. One of the first outer and first inner members 34 and 36 is connected to the main frame portion 12a and the other of the first inner and first outer members 34 and 36 is connected to the rear frame portion 12b. In the embodiment shown, the outer member 34 is connected to the frame member 12a and the inner member 36 is connected to the rear frame portion 12b.

Referring to FIG. 2c, the outer member 34 (and optionally the inner member 36) are tubular, and accordingly, the outer member 34 has an inner surface 38 that is generally cylindrical and the inner member 36 has an outer surface 40 that is generally cylindrical, thereby permitting the pivotal movement of the inner member 36 relative to the outer member 34. Additionally, a projection 42 is provided on one of the outer and inner members 34 and 36, which is engaged in a helical slot 44 in the other of the first outer and first inner members 34 and 36. The projection 42 cooperates with the slot 44 to drive translational movement of the inner member 36 relative to the outer member 34 during pivotal movement of the inner member 36 in the outer member 34.

The second frame portion 12b is positionable via the first pivot connection 29 in a use position (FIG. 2a) in which the wheel associated with the second frame portion 12b (i.e. the rear wheel 14) is orientable to be coplanar with the main frame portion 12a and to be engageable with the ground surface 30 to support the folding bicycle 10 thereon, and in a folded position (FIG. 2b) in which the rear wheel 14 is laterally adjacent to the main frame portion 12a. Movement from the use position to the folded position is in the clockwise direction shown by arrow 39 (FIG. 2a).

While the projection 42 is shown on the outer member 34 and the slot 44 is shown on the inner member 36 it is possible to provide the slot 44 on the outer member 34 and the projection 42 on the inner member 36. Additionally, while the slot 44 may be helical, it could alternatively have other shapes to accelerate and decelerate (i.e. to control) the amount of lateral movement that takes place during particular portions of the pivotal movement between the use position and the folded position. Thus, the slot 44, in a broader sense, would be suitable to cooperate with the projection 42 as long as the slot 44 extends laterally by a selected amount and circumferentially by a selected amount about the outer member axis AP.

Preferably, to reduce friction between the inner and outer members 36 and 34, a pair of suitable bushings 46 can be produced between them. The bushings 46 may be made from any suitable material, such as a polymeric material. A suitable bushing may be provided by igus inc, Rhode Island, United States. Alternatively or additionally, a suitable lubricant (e.g. grease) may be provided between the inner and outer members 36 and 34 to reduce friction, if needed.

By positioning the rear wheel 14 adjacent to the main frame portion 12a, the length L of the folding bicycle can be reduced without the necessity of providing a pocket of room for the folded rear frame portion 12b and wheel 14 within the bottom of the main frame portion 12a itself, as is the case with some other folding bicycle designs. This is advantageous in that it renders it less obvious that the bicycle 10 is a folding bicycle. Furthermore, it renders the main frame portion 12a and the overall bicycle 10 stronger as there are fewer restrictions on the design of the main frame portion 12a that would otherwise compromise the strength of the main frame portion 12a.

Figure 3A:
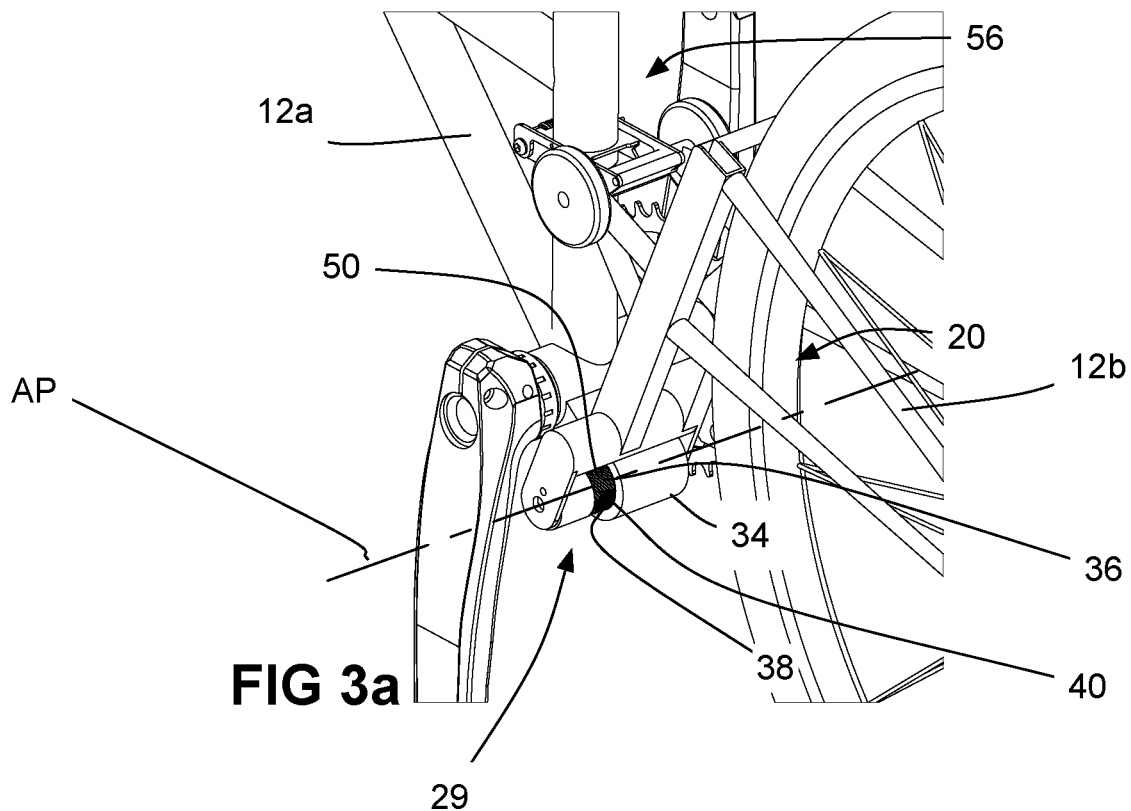
FIGS. 3a and 3b are perspective views of the portion of the folding bicycle shown in FIG. 1a, illustrating the folding of the rear frame portion using an alternative pivot connection.
Figure 3B:
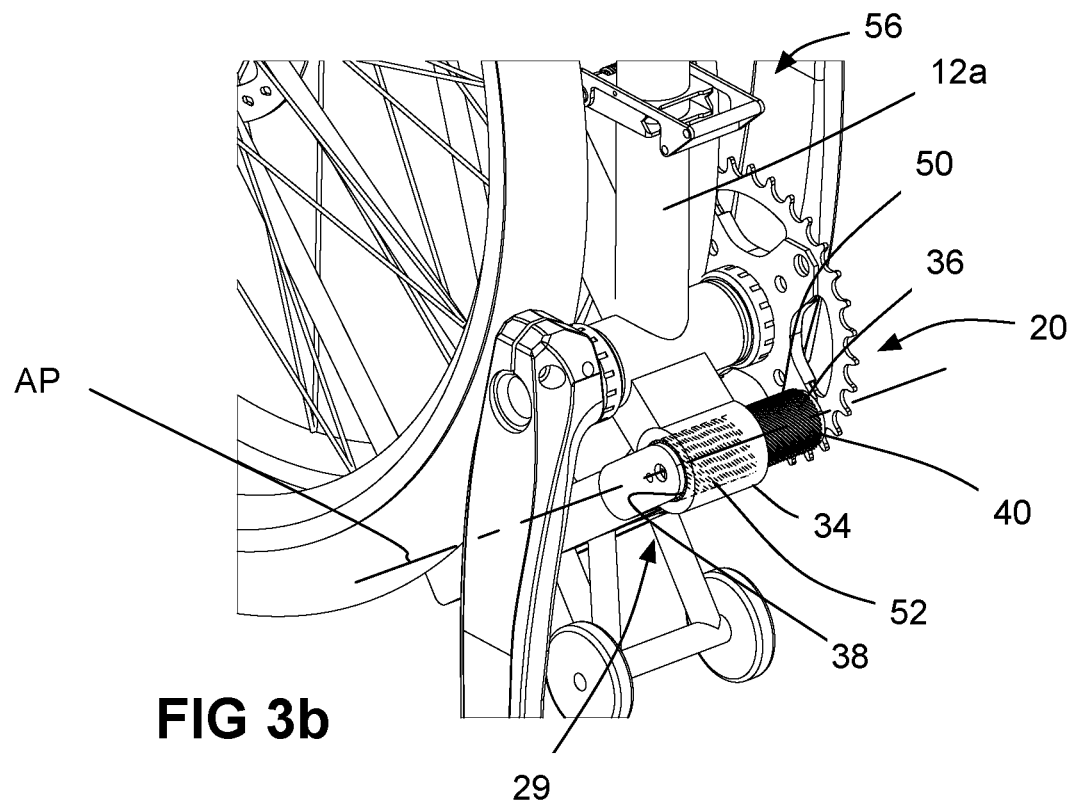

In an alternative embodiment shown in FIGS. 3a and 3b, the projection 42 and the slot 44 may be replaced by an inner member threaded portion 50 on the outer surface 40 of the inner member 36, that mates with an outer member threaded portion 52 (shown in dashed lines) on the inner surface 38 of the outer member 34. The threads cooperate to drive the inner member 36 laterally as it pivots relative to the outer member 34. The rear frame member 12b is shown in the use position in FIG. 3a and in the folded position in FIG. 3b.

Figure 4A:
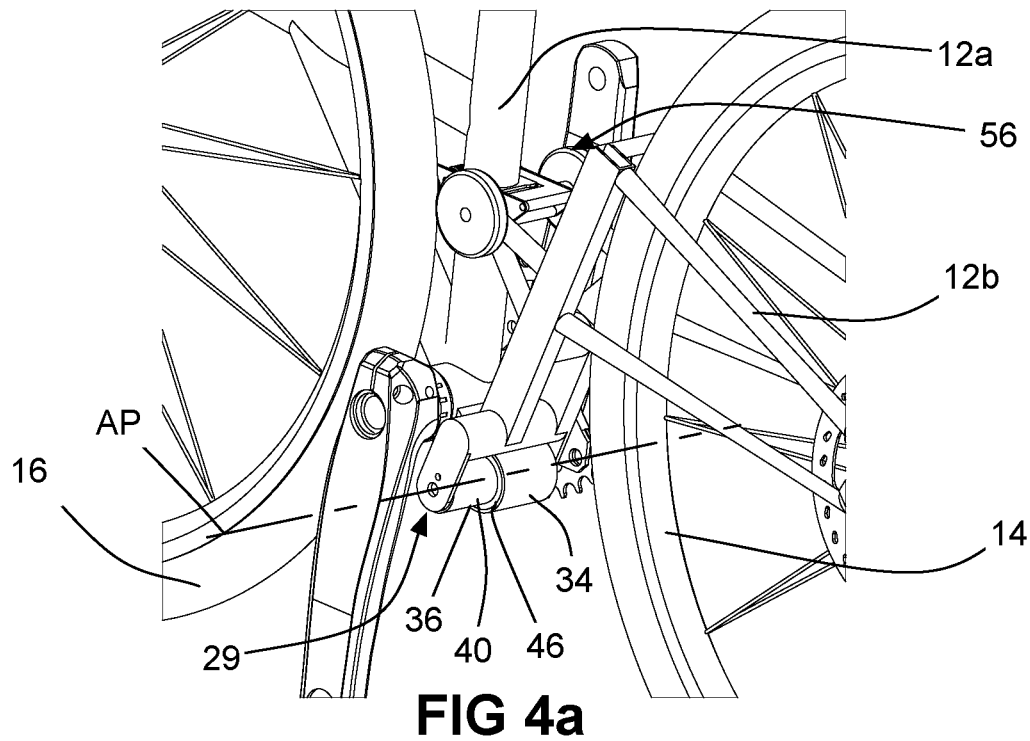
FIGS. 4a and 4b are perspective views of the portion of the folding bicycle shown in FIG. 1a, illustrating the folding of the rear frame portion using another alternative pivot connection.
Figure 4B:
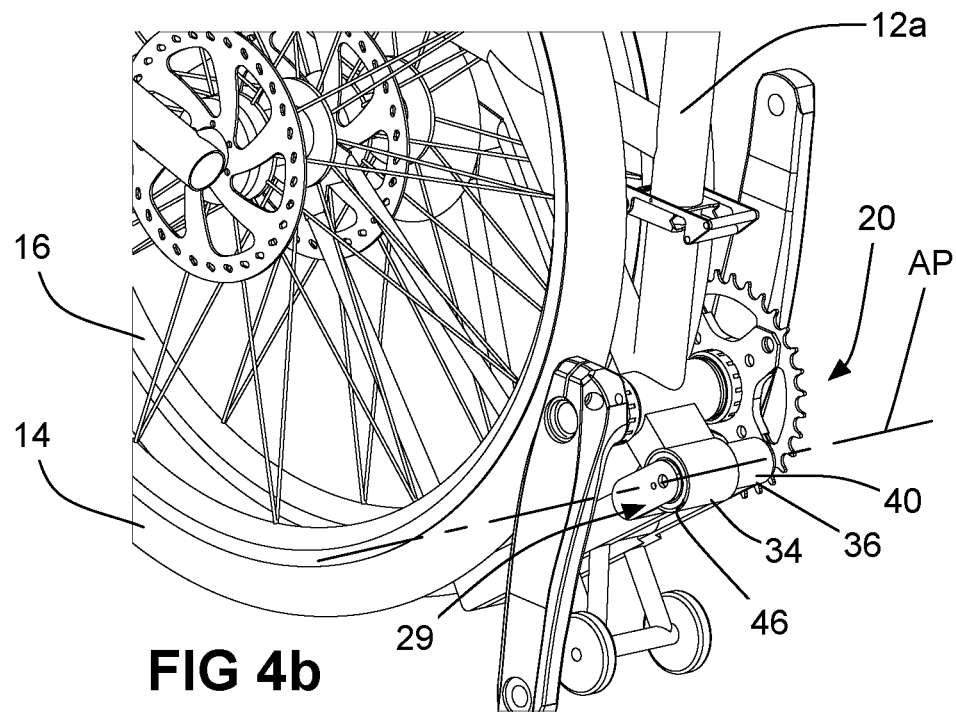

In yet another alternative embodiment, the outer surface 40 of the inner member 36 and the inner surface 38 of the outer member 34 may be free of projections and grooves and the like, so that the inner member 36 is free to move laterally and circumferentially independently of each other, between the use position, shown in FIG. 4a and the folded position shown in FIG. 4b. It will be noted that, in the embodiments shown in FIGS. 2a-2c and 3a and 3b, the rear frame portion 12b may be constrained by the interaction between the projection 42 and 44 (FIGS. 2a-2c) or between the threaded portions 50 and 52 (FIGS. 3a and 3b) to move along a path that brings it alongside the main frame portion 12a when it has fully pivoted to the folded position. By contrast, in the embodiment shown in FIGS. 4a and 4b, the movement of the rear frame portion 12b is unconstrained and so care will need to be taken to ensure that it is moved over laterally sufficiently to ensure that it does not collide with the main frame portion during pivoting movement towards the folded position.

Figure 5:
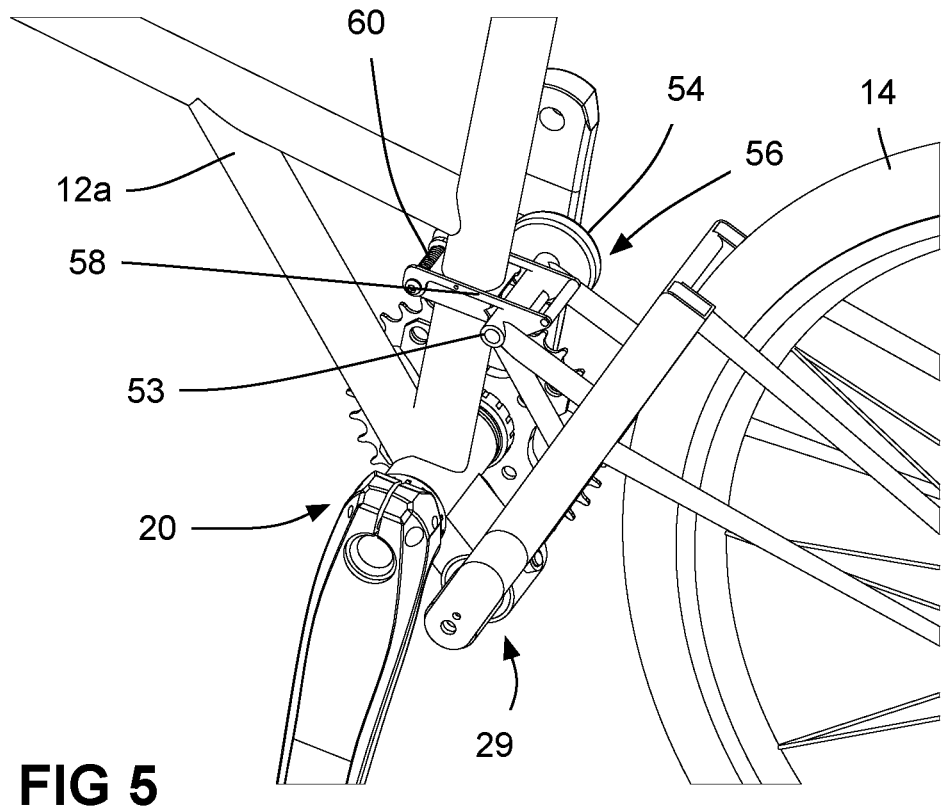

In order to transport the folding bicycle 10 when it is in the folded position, the rear frame portion 12b has an axle 53 supported thereon, and at least one folded position support wheel 54 supported on the axle 53, as shown in FIG. 5. In the embodiment shown, there are two support wheels 54 that are supported on the axle 53. When the rear frame portion 12b is in the use position (FIG. 1a), the folded position support wheels 54 are supported off the ground surface 30. When the rear frame portion 12b is in the folded position (FIG. 1d), the folded position support wheels 54 are engageable with the ground surface 30 to support the folding bicycle thereon. In this way, a user of the bicycle 10 can roll the bicycle 10 on the ground surface 30 on the folded position support wheels 54, even though the rolling ability of the front and rear bicycle wheels 14 and 16 may be compromised due, for example, to friction between the wheels 14 and 16 and the main frame portion 12a.

Figure 6:
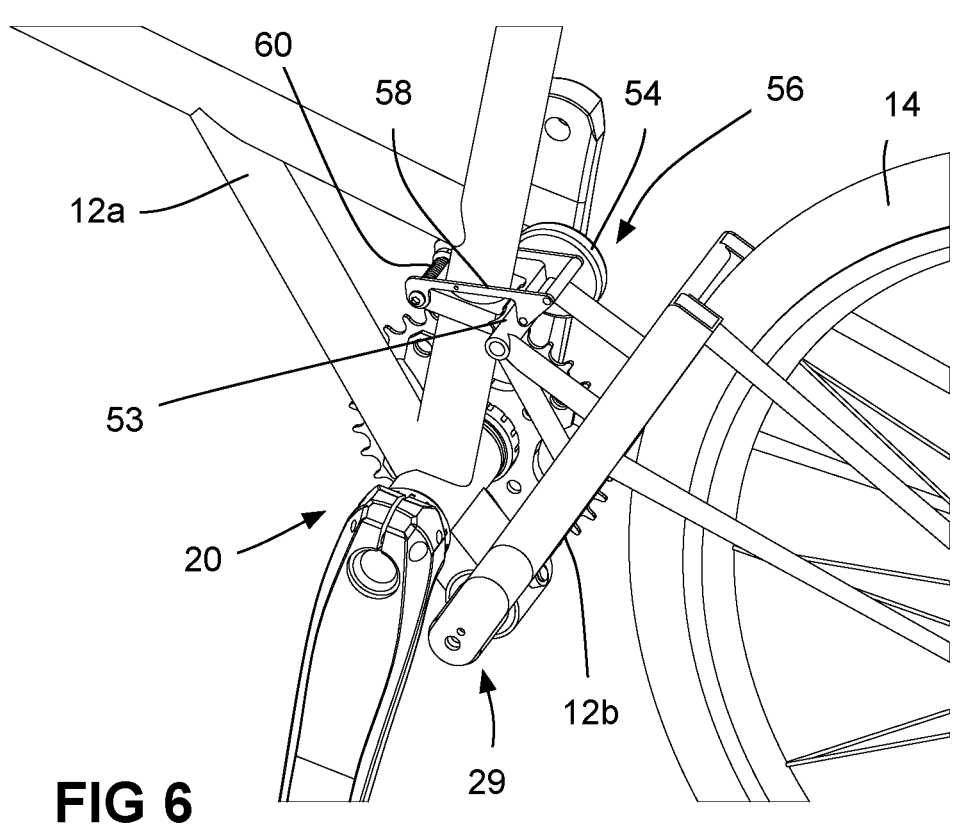

As shown in FIG. 5, to lock the rear frame portion 12b to the main frame portion 12a in the use position, a locking mechanism shown at 56 is provided. The locking mechanism 56 includes a hook member 58 that is pivotally connected to the main frame portion 12a, for movement between an engagement position (shown in FIG. 5), in which the hook member 58 is positioned to engage the axle 53 to retain the rear frame portion 12b in the use position, and a release position (shown in FIG. 6) in which the hook member 58 is positioned to permit movement of the rear frame portion 12b away from the use position.

A biasing member 60 urges the hook member 58 towards the engagement position, so that in the event of a force (e.g. the bicycle 10 hitting a bump) that might urge the hook member 58 upwards off the axle 53, the biasing member 60 can hold the hook member 58 down in engagement with the axle 53.

Figure 9A:
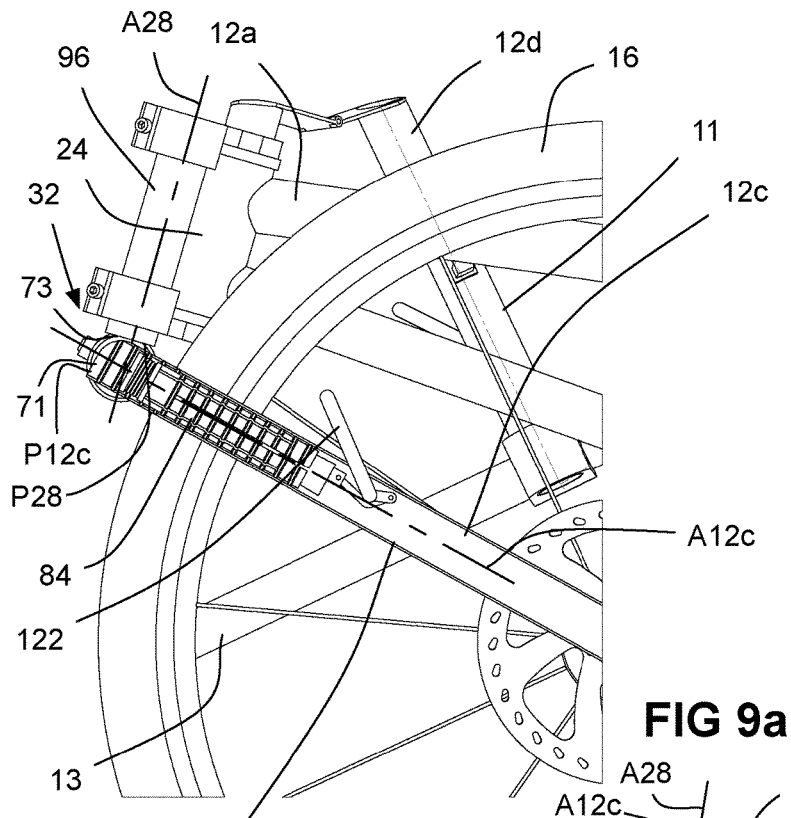
FIG. 9a is a side elevation view, partially in section, of a portion of the folding bicycle shown in FIG. 1a, showing the locking mechanism of FIG. 8a in a frame portion that is in a folded position.
Figure 9B:
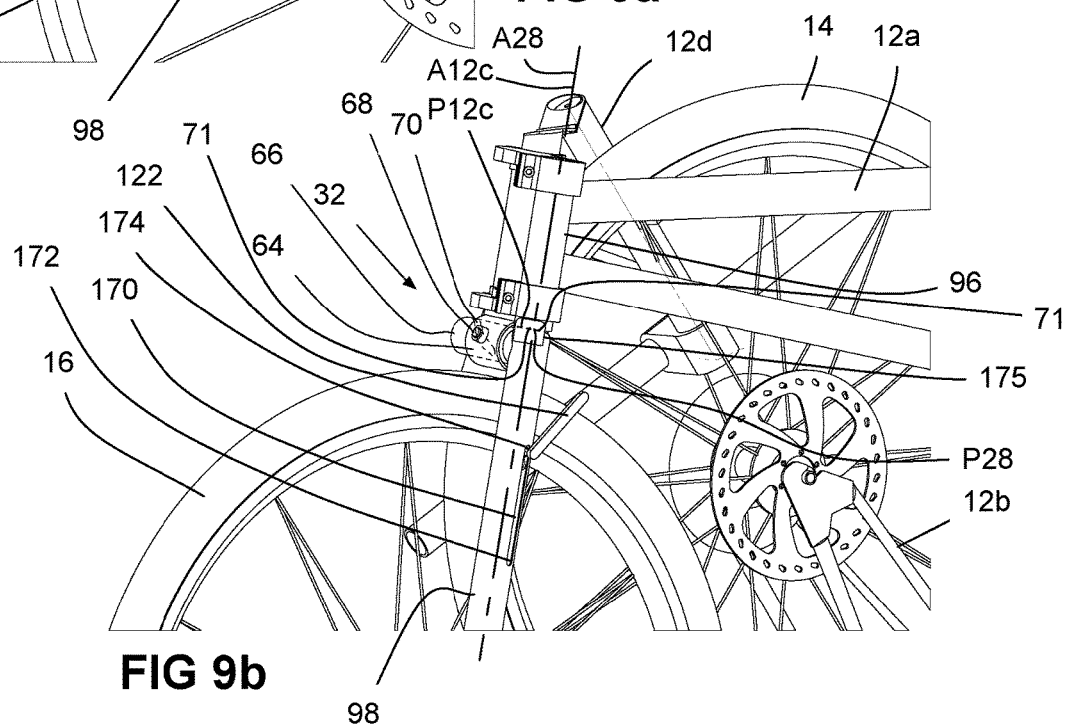
FIG. 9b is a perspective view of the portion of the folding bicycle shown in FIG. 9a showing the locking mechanism of FIG. 8a in the frame portion when in a use position.

Referring to FIG. 9b, the second pivot connection shown at 32, which is provided between the front wheel support 12c and the main frame portion 12a. The second pivot connection 32 may be similar to the first pivot connection 29 and includes an outer member 64 and an inner member 66, which may be similar to the outer and inner members 34 and 36 respectively. In the embodiment shown, the outer member 64 has a projection 68 thereon and is mounted on the main frame portion 12a. The inner member 66 has a slot 70 that receives the projection 68 that extends both laterally and circumferentially by selected amounts so that the front wheel support is movable between a use position (FIG. 1a) in which the front wheel 16 is engageable with the ground surface 30 to support the folding bicycle 10 thereon, and a folded position (FIG. 1c), which reduces at least one of the length L and the height H of the folding bicycle 10. In the folded position, the front wheel 16 may be adjacent to the main frame portion 12a. In the use position the front wheel 16 is orientable to be coplanar with the main frame portion 12a. More particularly, the front wheel 16 is connected to the front wheel support 12c, which, due to its connection to the steering tube 28, permits the front wheel 16 to be steered in a range of desired orientations. When the front wheel support 12c is in the folded position, the front wheel 16 is adjacent the main frame portion 12a, but when the front wheel support 12c is in the use position, the front wheel 16 may be oriented to be straight at which point it will be coplanar with the main frame portion 12a.

Figure 7A:
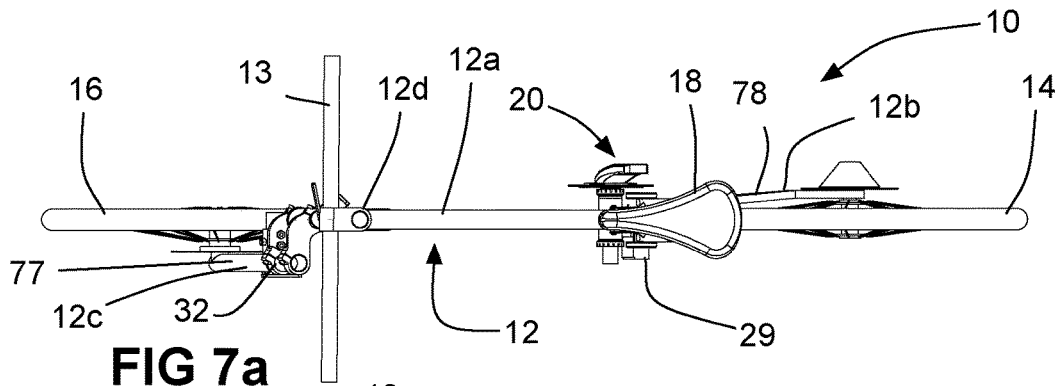
FIGS. 7a and 7b are a top plan view and a perspective view respectively of a variant of the folding bicycle shown in FIG. 1a, which includes a rear frame portion that supports a rear wheel from one side only.
Figure 7B:
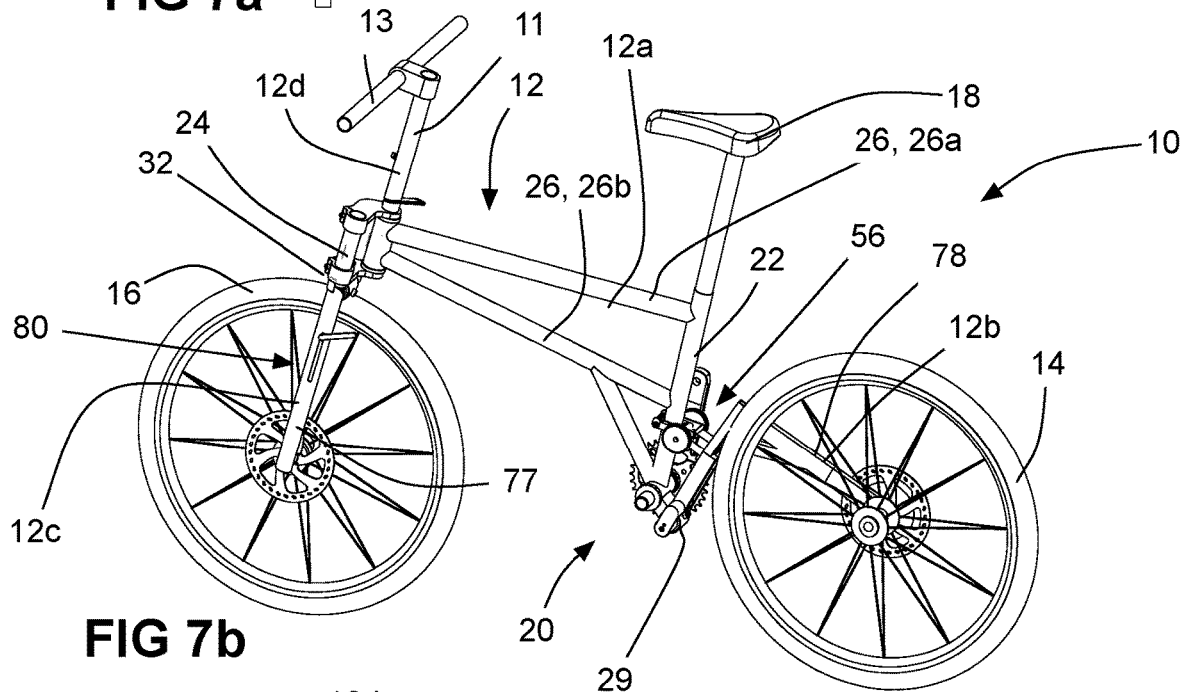
Figure 7C:
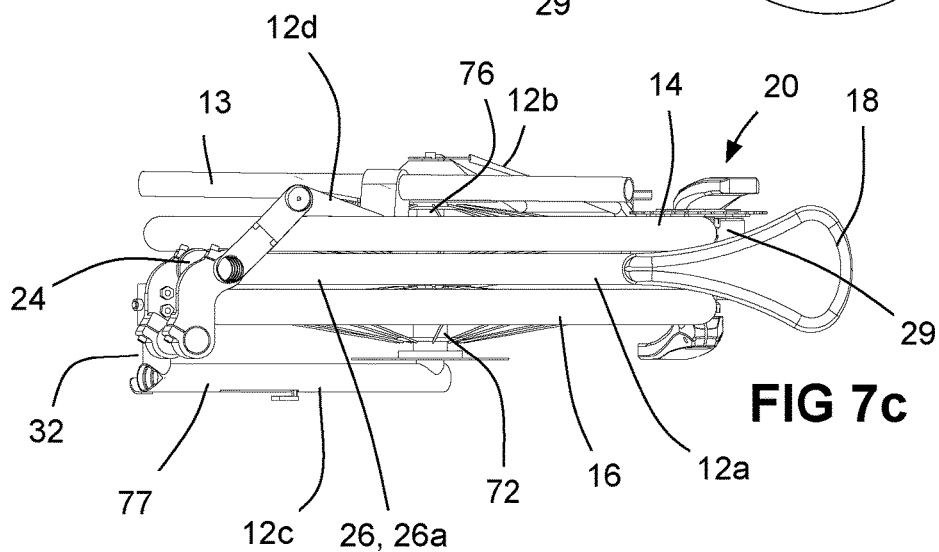
FIG. 7c is a top plan view of the variant of the folding bicycle shown in FIGS. 7a and 7b, in the folded position.

As shown in FIG. 1b, the front wheel support 12c may be a single support arm 77 that extends to and supports the front wheel axle (shown at 72) only on one side of the front wheel 16. When the front wheel support 12c is in the folded position, the front wheel 16 is positioned laterally between the front wheel support 12c and the main frame portion 12a. This permits the wheel 16 to be positioned closer to the main frame portion 12a when in the folded position (as shown in FIG. 7c), so as to reduce the width W of the folding bicycle 10 when folded, as compared to an embodiment in which a more traditional double-sided fork is used to support the wheel 16. As shown in FIG. 7c, the wheel 16 can be positioned immediately adjacent the main frame portion 12a when forming the front wheel support 12c as a single support arm.

The rear frame portion 12b is shown in FIG. 1b as having two support arms 74 that extend on either side of the rear wheel 14 to support the axle of the rear wheel (shown at 76). It is alternatively possible for the rear frame portion 12b to have a single support arm, as shown at 78 in FIGS. 7a and 7b. When the rear frame portion 12b is in the folded position, the rear wheel 14 is positioned laterally between the support arm 78 and the main frame portion 12a. This can permit the wheel 14 to be positioned closer to the main frame portion 12a when in the folded position (as shown in FIG. 7c), so as to reduce the width W of the folding bicycle 10 when folded, as compared to an embodiment in which two support arms 74 are used to support the wheel 14. As shown in FIG. 7c, the wheel 14 can be positioned immediately adjacent the main frame portion 12a when using a single support arm 78.

In an advantageous embodiment, as shown in FIGS. 9a and 9b, the front wheel support 12c has a front wheel support connecting end axis A12c, and a first end face 71 that extends in a first end face plane P12c that is generally normal to the first end face axis A12c. The steering tube 28 has a steering tube connecting end axis A28 and a second end face 73 that extends in a second end face plane P28 that is generally normal to the steering tube connecting end axis A28. The front wheel support 12c is pivotable between a use position (FIG. 9b) in which the front wheel support connecting end axis A12c is aligned with the steering tube connecting end axis A28, in which the first and second end faces 71 and 73 abut one another, and in which the front wheel 16 is engageable with a ground surface for supporting the folding bicycle 10 thereon, and a folded position (FIG. 9a) in which the front wheel support connecting end axis A12c is unaligned with the steering tube connecting end axis A28, and in which the first and second end faces 71 and 73 are spaced from one another. Such a structure is particularly suited to supporting the weight of a rider on the folding bicycle 10, while being space efficient.

The front wheel support 12c may be lockable in the use position by any suitable locking mechanism. An example of a locking mechanism is shown at 80 in FIGS. 8a and 8b. The locking mechanism 80 includes a base member 82, an expandable member 84, a driver 86, a driver biasing member 88 and a quick release mechanism 90. The driver 86 is used to drive expansion of the expandable member 84 against the inner surfaces (shown at 92 and 94 in FIG. 8c) of first and second tubes (shown at 96 and 98 in FIGS. 8c, 9a and 9b) that are part of the main frame portion 12a and the front wheel support 12c respectively, so as to releasably lock the main frame portion 12a and the front wheel support 12c together.

The base member 82 defines a base member axis AL. The expandable member 84 may be expandable by any suitable means. The expandable member 84 may, for example, have a first end 100 and a second end 102, and may have a plurality of pass-through slots 104, that alternately start from each end 100 and 102 and extend most of the way to, but not all the way to, the opposing end 100 and 102. The expandable member 84 has an inner surface 106 that is a first wedge surface (FIG. 8b).

The driver 86 includes a foot member 108, a connecting rod 110 and a wedge member 112 which has a second wedge surface 114 thereon. The driver 86 is movable in a first direction (shown by arrow 116 in FIG. 8b) relative to the base member 82 to drive the first and second wedge surfaces 106 and 114 into each other to drive expansion of the expandable member 84. The driver 86 is movable in a second direction (shown by arrow 118 in FIG. 8b) relative to the base member 82 to drive the first and second wedge surfaces 106 and 114 away each other to permit contraction of the expandable member 84.

In a preferred embodiment, the first and second wedge surfaces 106 and 114 extend away from the axis AL in two cross-sectional planes (shown at P1 and P2 in FIG. 8b) that both include the axis AL and that are orthogonal to one another. It will be noted that plane P2 is directly coincidental with the axis AL in FIG. 8b and so it appears as a solid line superimposed on the axis AL. In the example embodiment shown in FIGS. 8a and 8b, the wedge surfaces 106 and 114 are generally conical. Alternatively, any other shape may be possible, such as, for example, pyramidal.

In the embodiment shown, the driver 86 is moved relative to the base member 84 by a driver biasing member 118 that is positioned between the foot member 108 and the second end 102 of the expandable member 84. The driver biasing member 118 urges the foot member 108 and the expandable member 84 apart, which drives the wedge surfaces 106 and 114 into each other.

The quick release mechanism 90 includes a transfer arm 120 and a handle 122. The handle 122 is pivotally connected to the base member 82 via a pin connection 124 that defines a handle pivot axis. The transfer arm 120 is pivotally connected at one end 128 to the driver 86 via a pin connection 130, and at another end 132 to the handle 122 via another pin connection 134 which defines a handle connection axis that is offset from the handle pivot axis.

Figure 8A:
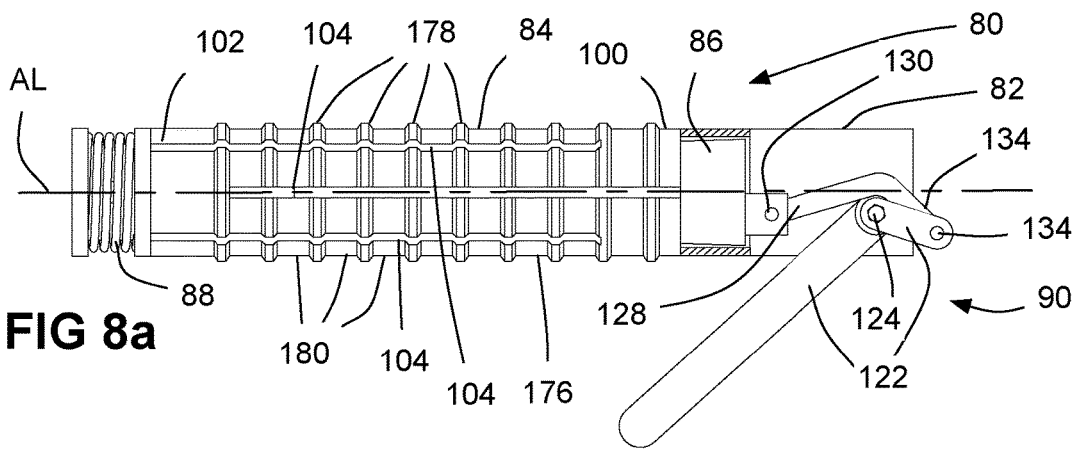
Figure 8B:
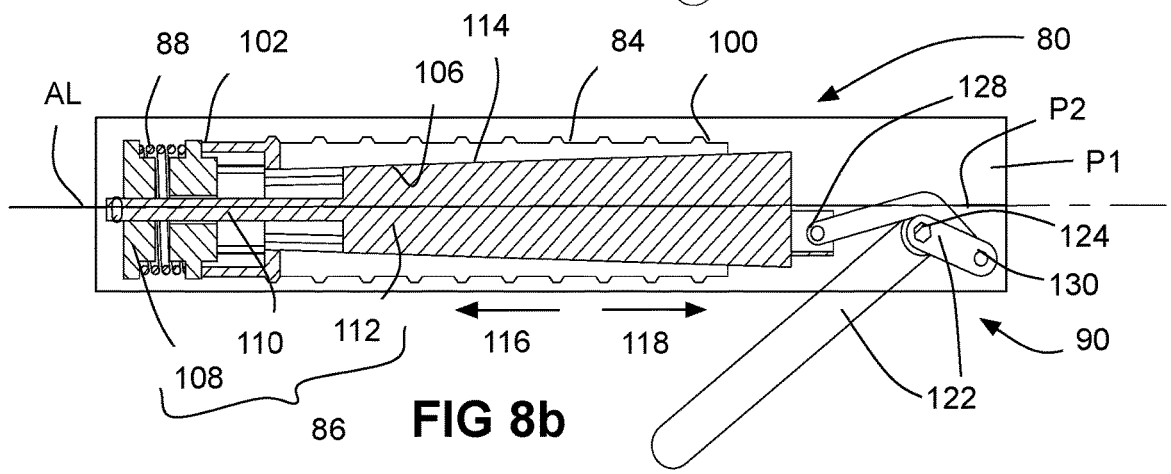
FIGS. 8b and 8c are sectional elevation views of the locking mechanism shown in FIG. 8a, in a locking position and a release position respectively.
Figure 8C:
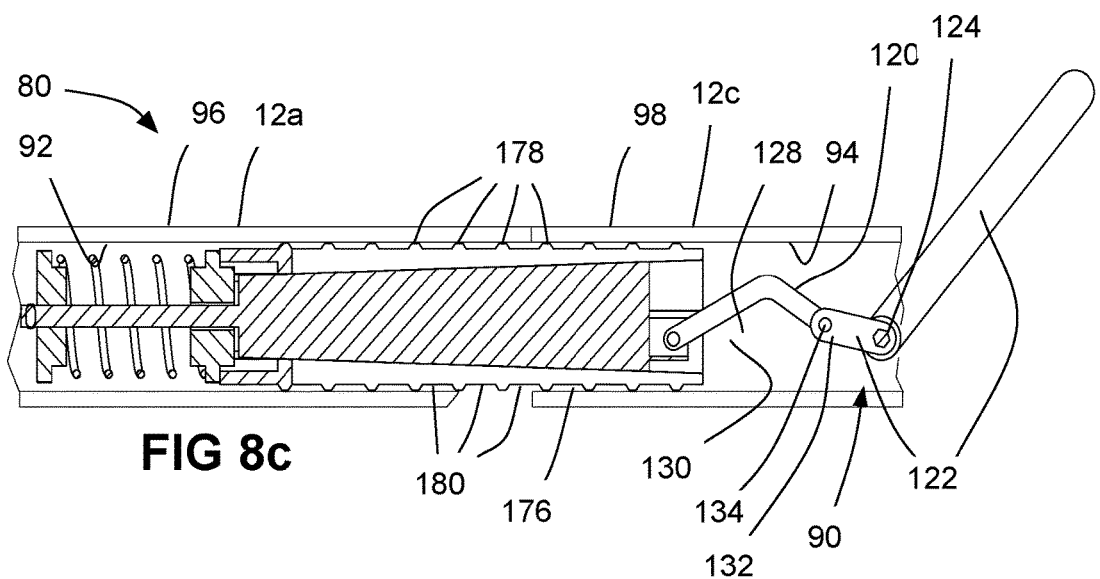

The handle 122 is pivotable between an unlocking position, shown in FIGS. 8a and 8b and a locking position shown in FIG. 8c. In the unlocking position the transfer arm 120 is oriented to transfer force from the driver biasing member 88 to the handle 122 to urge the handle 122 to remain in the unlocking position. Additionally, in the unlocking position, the transfer arm 120 limits the position of the driver 86 relative to the expandable member 84 so as to prevent the driver 86 from causing expansion of the expandable member 84.

In the locking position the driver biasing member drives first and second wedge surfaces 106 and 114 into one another to drive the expansion of the expandable member 84.

While the second wedge surface 114 has been shown to be on the driver 86, it is alternatively possible for the second wedge surface 116 to be on the base member 82, and for a driver to drive the wedge surface 106 on the expandable member 84 into engagement with the wedge surface 114 on the base member 82.

Figure 10A:
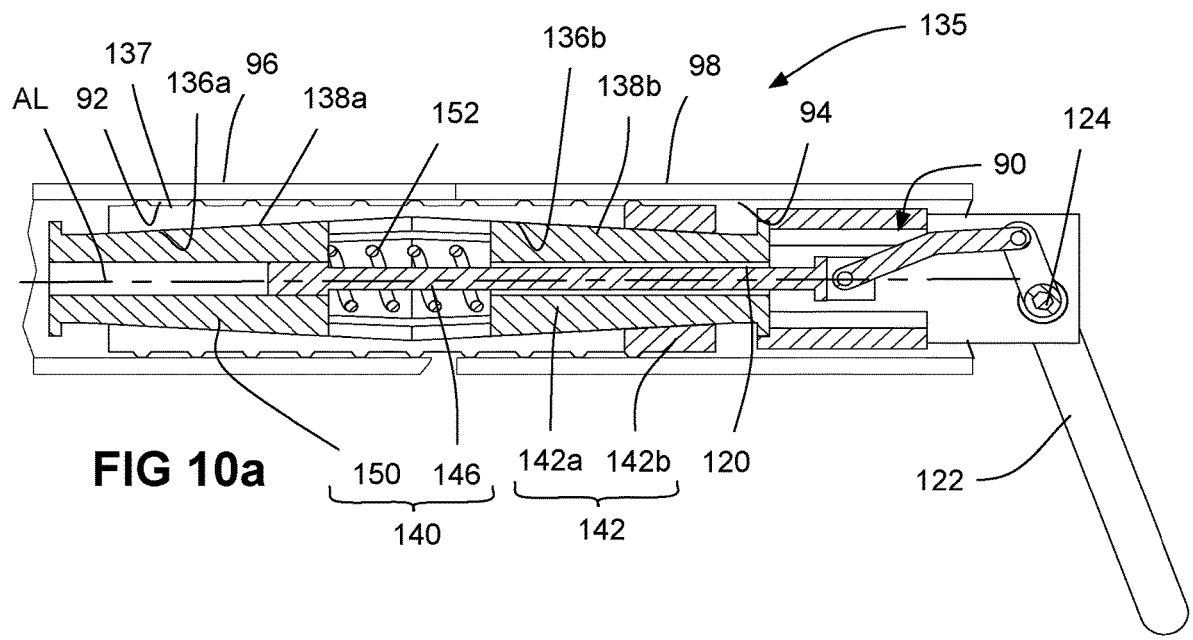
FIGS. 10a and 10b are sectional elevation views of a variant of the locking mechanism shown in FIG. 8a, in a locking position and a release position respectively.
Figure 10B:
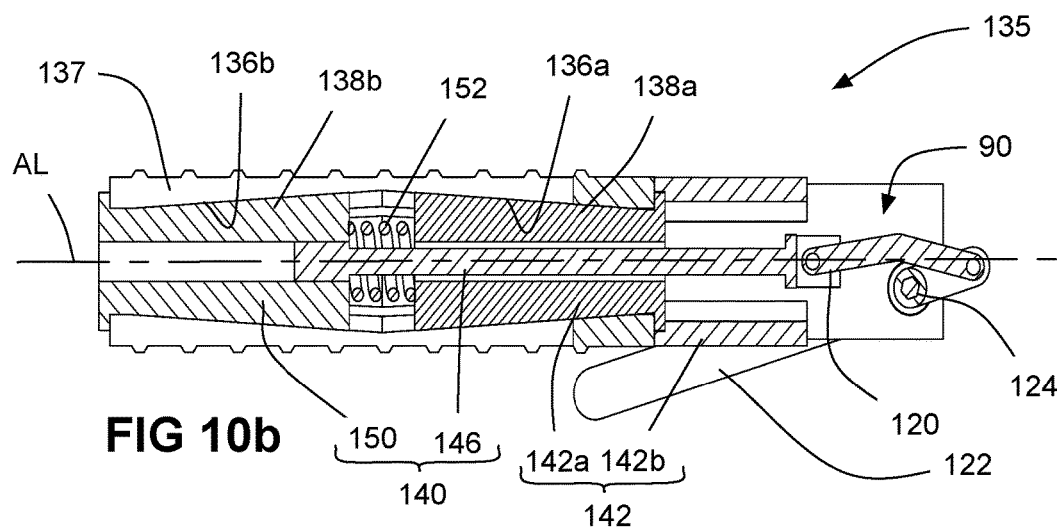

In an alternative embodiment shown in FIGS. 10a and 10b, the locking mechanism is shown at 135, and is similar to the locking mechanism 80, but has two first wedge surfaces, one of which is shown at 136a and another of which is shown at 136b. The two wedge surfaces 136a and 136b are provided on the expandable member shown at 137. The wedge surface 136a faces in a first axial direction (where 'axial' refers to the axis AL). In the view shown in FIGS. 10a and 10b, the first axial direction is towards the left). The wedge surface 136b faces in a second axial direction (i.e. towards the right in the view shown in FIGS. 10a and 10b). Furthermore, there are two second wedge surfaces, a first one of which is shown at 138a and is on the driver shown at 140 and a second one of which is shown at 138b and is provided on the base member shown at 142. More particularly the wedge surface 138b is on an extension member 142a that is connected to a main portion 142b of the base member 142. The second wedge surfaces 138a and 138b are complementary to the first wedge surfaces 136a and 136b. The driver 140 includes a connecting arm 146 that has a first end 148 that pivotally connects to the transfer arm 120, and a second end that fixedly connects to a wedge member 150 on which the wedge surface 138a is positioned. A driver biasing member 152 is provided, which is, in the example shown positioned between the wedge member 150 and the extension member 142a (or, more broadly, between the driver 140 and the base 142), urging the wedge member 150 and the extension member 142a away from each other, which is in a direction that drives them towards engagement with the first wedge surfaces 136a and 136b.

When the handle 122 of the quick release mechanism 90 is positioned in a locking position, which is shown in FIG. 10a, the biasing member 152 drives the two second wedge surfaces 138a and 138b apart, which drives them into engagement with the first wedge surfaces 136a and 136b, which causes expansion of the expandable member 137. It will be noted that the symmetry of the first and second, first wedge surfaces 136a and 136b and the corresponding symmetry of the first and second, second wedge surfaces 138a and 138b makes it more likely to provide generally equal amounts of expansion at both ends of the expandable member 137. This makes it more likely that the forces with which the expandable member 137 engages the first tube 96 (FIG. 10a) and second tube 98 are approximately equal.

When the handle 122 of the quick release mechanism 90 is in the unlocking position shown in FIG. 10b, (which would involve a clockwise rotation of the handle 122 from the position shown in FIG. 10a), the transfer arm 120 is oriented to transfer force from the driver biasing member 152 to the handle 122 to urge the handle 122 to remain in the unlocking position. Additionally, in the unlocking position, the transfer arm 120 limits the positions of the second wedge surfaces 138a and 138b relative to the first wedge surfaces 136a and 136b so as to prevent the driver 140 from causing expansion of the expandable member 137.

Figure 11A:
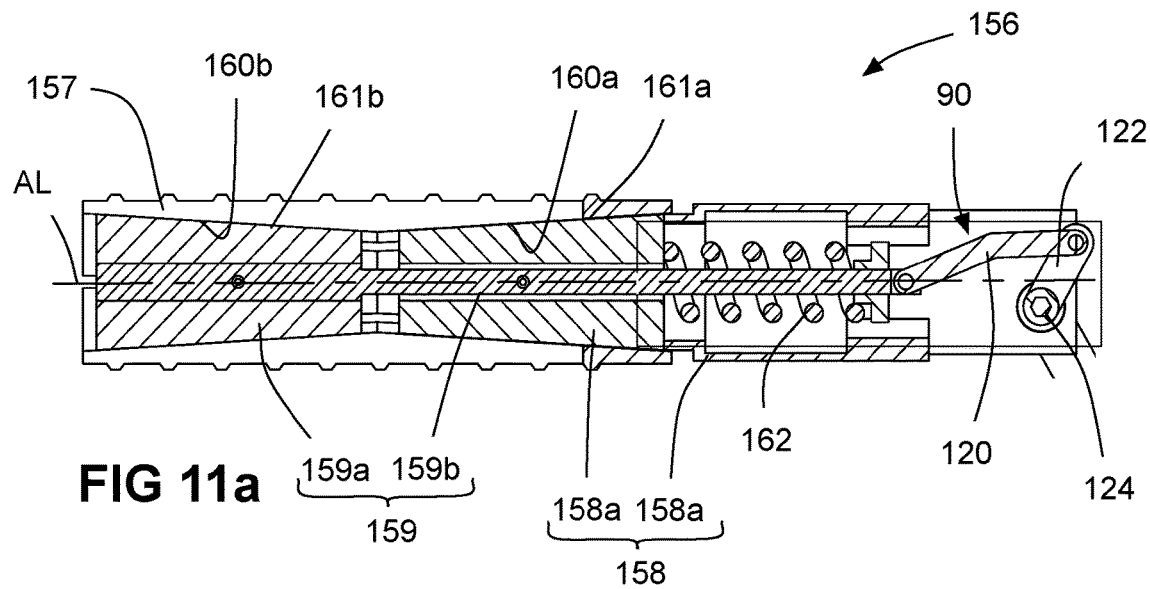
FIGS. 11a and 11b are sectional elevation views of another variant of the locking mechanism shown in FIG. 8a, in a locking position and a release position respectively.
Figure 11B:
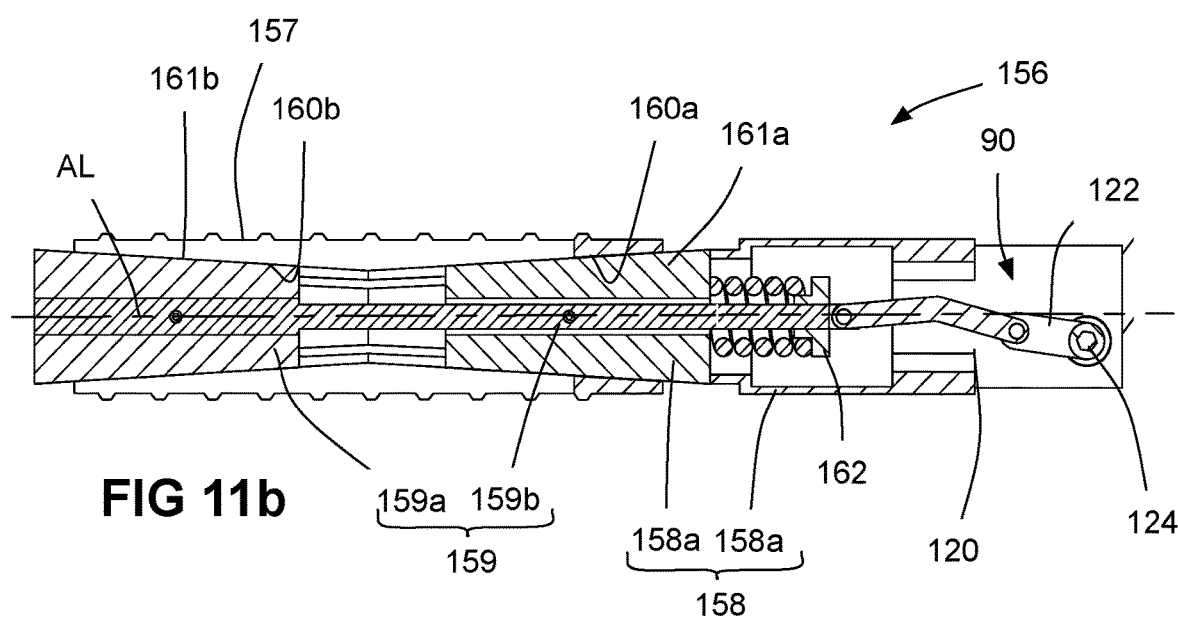

Reference is made to FIGS. 11a and 11b, in which another embodiment of a locking mechanism is shown at 156. The locking mechanism 156 is similar to the locking mechanism 135, and has an expandable member 157, a base 158 that includes an extension member 158a and a main portion 158b, and a driver 159 that includes a wedge member 159a and a transfer arm 159b that pivotally connects to the connecting arm 120 of the quick release mechanism 90. The main portion 158b of the base 158 is shown simply as a rectangle, for convenience. Additionally, a portion of the handle 122 is omitted from FIGS. 11a and 11b, for convenience. All of the components of the aforementioned components of the locking mechanism 135 may be similar to the analogous elements of the locking mechanism 135 in FIGS. 10a and 10b, but with differences as described below.

A difference with the locking mechanism 156 from the locking mechanism 135 is that the first wedge surfaces (shown at 160a and 160b) generally face away from each other, instead of facing each other as the first wedge surfaces 136a and 136b do in the embodiment shown in FIGS. 10a and 10b, and the second wedge surfaces (shown at 161a and 161b) face each other instead of facing away from each other as they do in the embodiment shown FIGS. 10a and 10b. Also, in the embodiment shown in FIGS. 11a and 11b, the driver biasing member, shown at 162, is positioned between a foot member 164 on the transfer arm 159b from the driver 159 and the extension member 158a of the base 158.

As shown in FIG. 9b, the handle 122 may extend through a locking mechanism engagement control slot 170 in one of the first and second tubes 96 and 98 so as to be accessible by a user of the bicycle 10 from outside of the tubes 96 and 98. The slot 170 has a first end 172 and a second end 174. Movement of the handle 122 to the first end 172 withdraws the locking mechanism 80 substantially entirely out of the other of the first and second tubes 96 and 98. In the example shown, it withdraws the locking mechanism 80 substantially entirely out of the first tube 96 (and substantially entirely into the second tube 98, as shown in FIG. 9a). Movement of the handle 122 to the second end 174 of the slot 170 drives the locking mechanism 80 to a position in which the locking mechanism 80 is partially positioned in both the first and second tubes 96 and 98 (FIG. 9b), so as to permit expansion of the locking mechanism 80 so as to lock the first and second tubes 96 and 98 together.

Figure 1E:
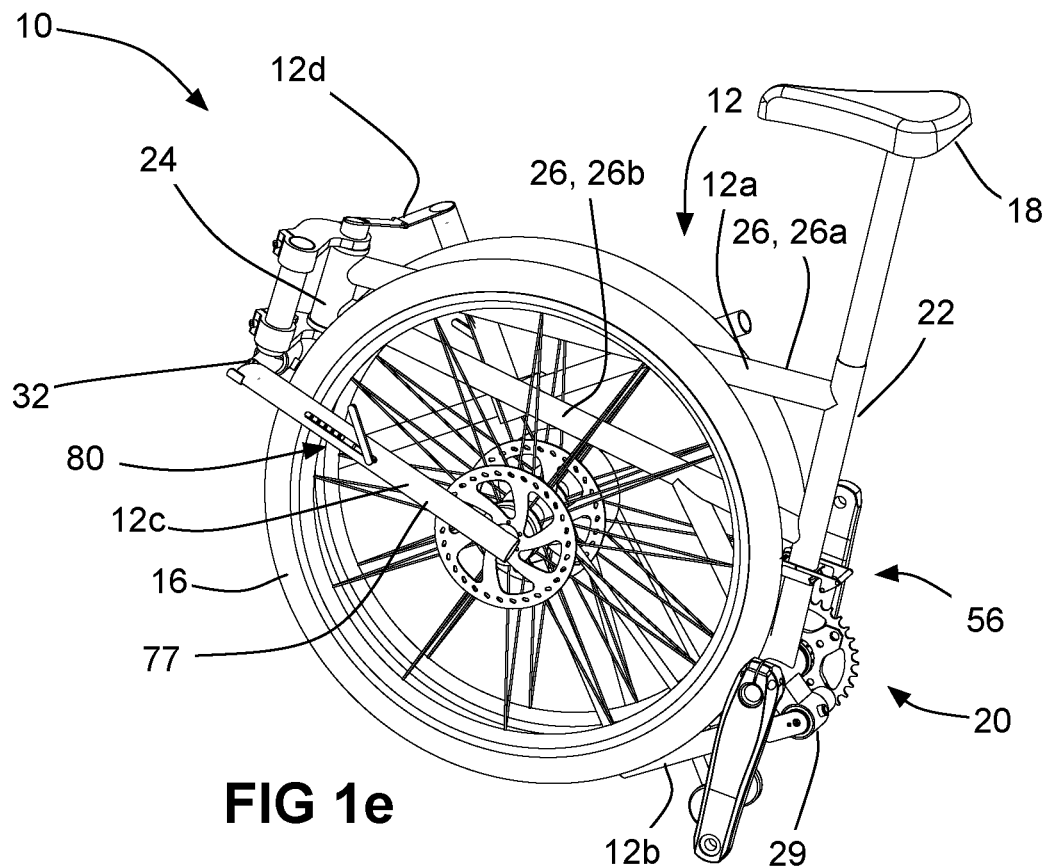
FIG. 1e is a perspective view of the folding bicycle shown in FIG. 1a in a further folded position.
Figure 1F:
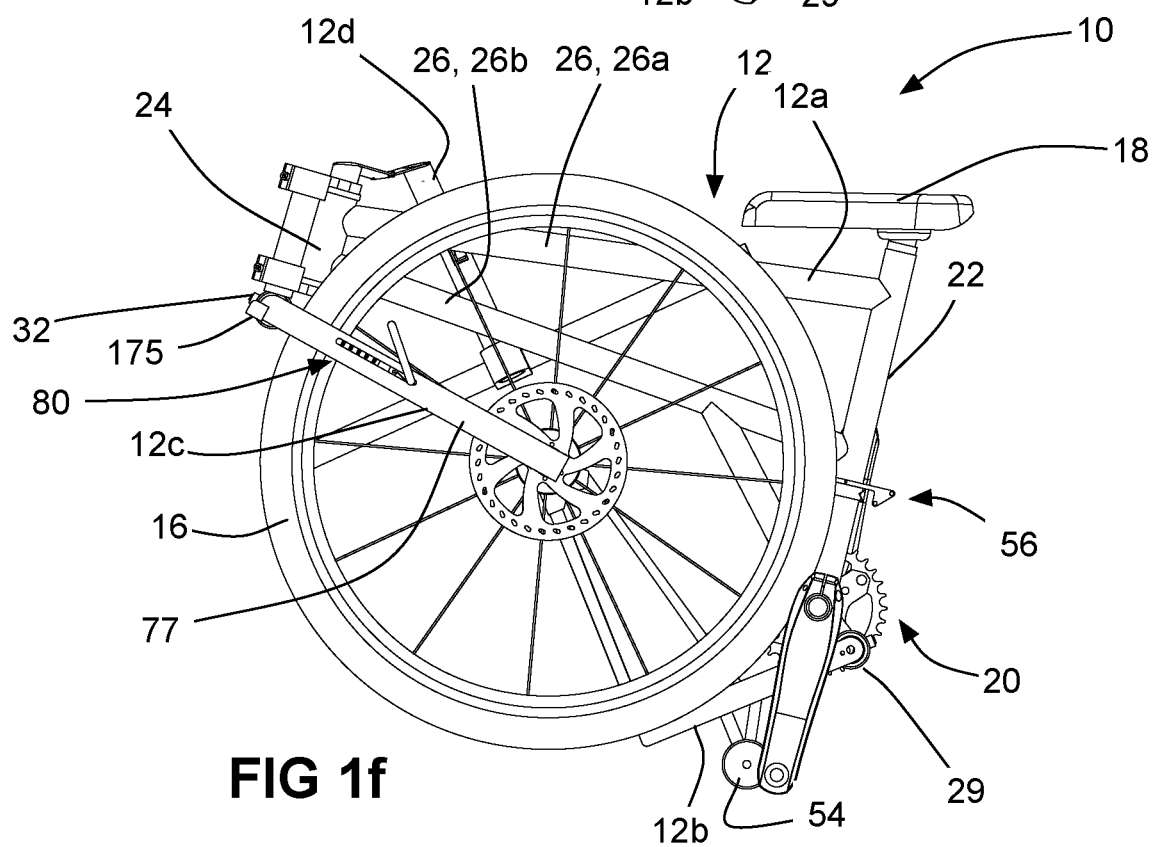
FIGS. 1f and 1g are an elevation view and a perspective view respectively of the folding bicycle shown in FIG. 1a in a fully folded position.

As shown in FIGS. 1f and 9b, a guide member shown at 175 may be provided on the end of the second tube 98, which engages the first tube 96 when the front wheel support 12c reaches the use position to ensure that the first and second tubes 96 and 98 are in good alignment with one another, thereby facilitating bringing the locking mechanism upwards into the first tube 96.

As shown in FIG. 8a, the expanding member 84 may have an outer surface 176 that includes a plurality of projections (some of which are shown at 178) and valleys 180 between the projections 178. The projections 178 act as force concentrators which assist in biting into the inner surfaces 92 and 94 of the first and second tubes 96 and 98. In a preferred embodiment, the projections 178 extend generally only circumferentially about the outer surface 176 so as to provide strong resistance to axial movement (movement along the axis AL). However, the projections 178 could extend in other directions, e.g. they could extend helically, or even axially. Alternatively, the expandable member 84 could have any other type of outer surface 176, such as, for example, an outer surface that has no projections thereon.

Figure 12B:
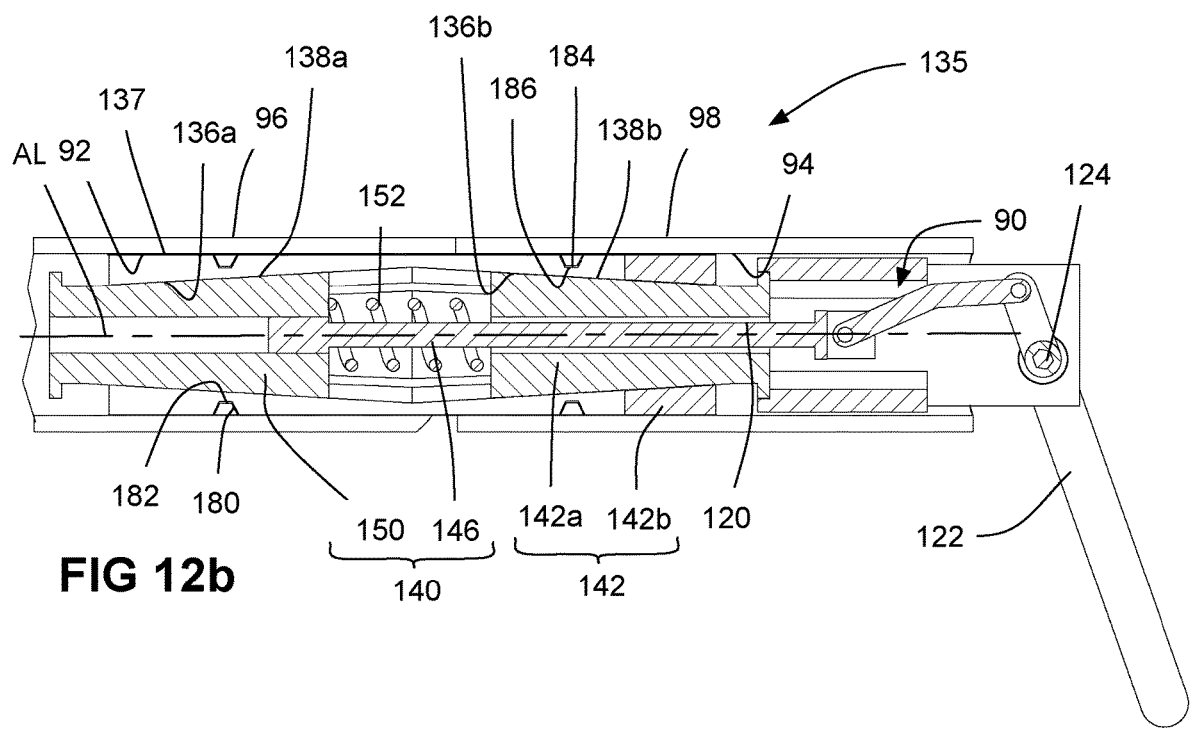
FIGS. 12a and 12b are sectional elevation views of the variant of the locking mechanism shown in FIGS. 10a and 10b, in a locking position and a release position respectively, showing optional projections and recesses that assist in holding the locking mechanism in position.
Figure 12A:
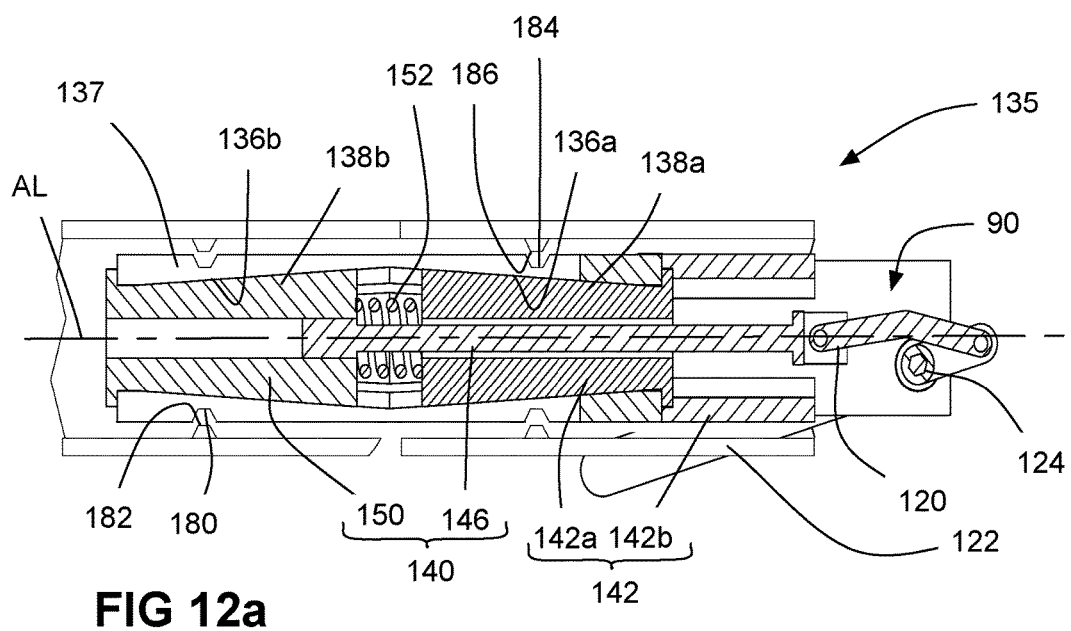

In an embodiment, shown in FIGS. 12a and 12b, the expandable member of the locking mechanism may have a first circumferentially extending recess 180 thereon. In FIGS. 12a and 12b the locking mechanism is the example that is shown in FIGS. 10a and 10b (i.e. locking mechanism 135) however, any of the other locking mechanisms 80 or 156 could have the aforementioned recess. One of the first and second tubes 96 and 98 may have a first circumferentially extending projection 182 thereon that is matable with the recess 180. The first projection 182 is withdrawn from the first recess 180 when the expandable member 135 is unexpanded, as shown in FIG. 12b, so as to permit the locking mechanism 135 to be withdrawn from the first tube 96, thereby permitting the folding of the frame portion 12c. Referring to FIG. 12a, when the expandable member 135 is expanded the first recess 180 receives the first projection 182 to lock the expandable member 135 in place axially (relative to axis AL) so as to retain the expandable member 135 in engagement with both the first and second tubes 96 and 98. In the embodiment shown, the first projection 182 is shown on the first tube 96, however, it could alternatively be on the second tube 98, with the recess 180 positioned accordingly. As shown in FIGS. 12a and 12b, the expandable member 135 may optionally have a second circumferentially extending recess 184 and the other of the first and second tubes 96 and 98 (in this case tube 98) has a second circumferentially extending projection 186. The first and second recesses 180 and 184 receive the first and second projections 182 and 186 to retain the expandable member 135 in engagement with both the first and second tubes when the expandable member is expanded. The first and second projections 182 and 186 are withdrawn from the first and second recesses 180 and 184 when the expandable member 135 is unexpanded.

Figure 13:
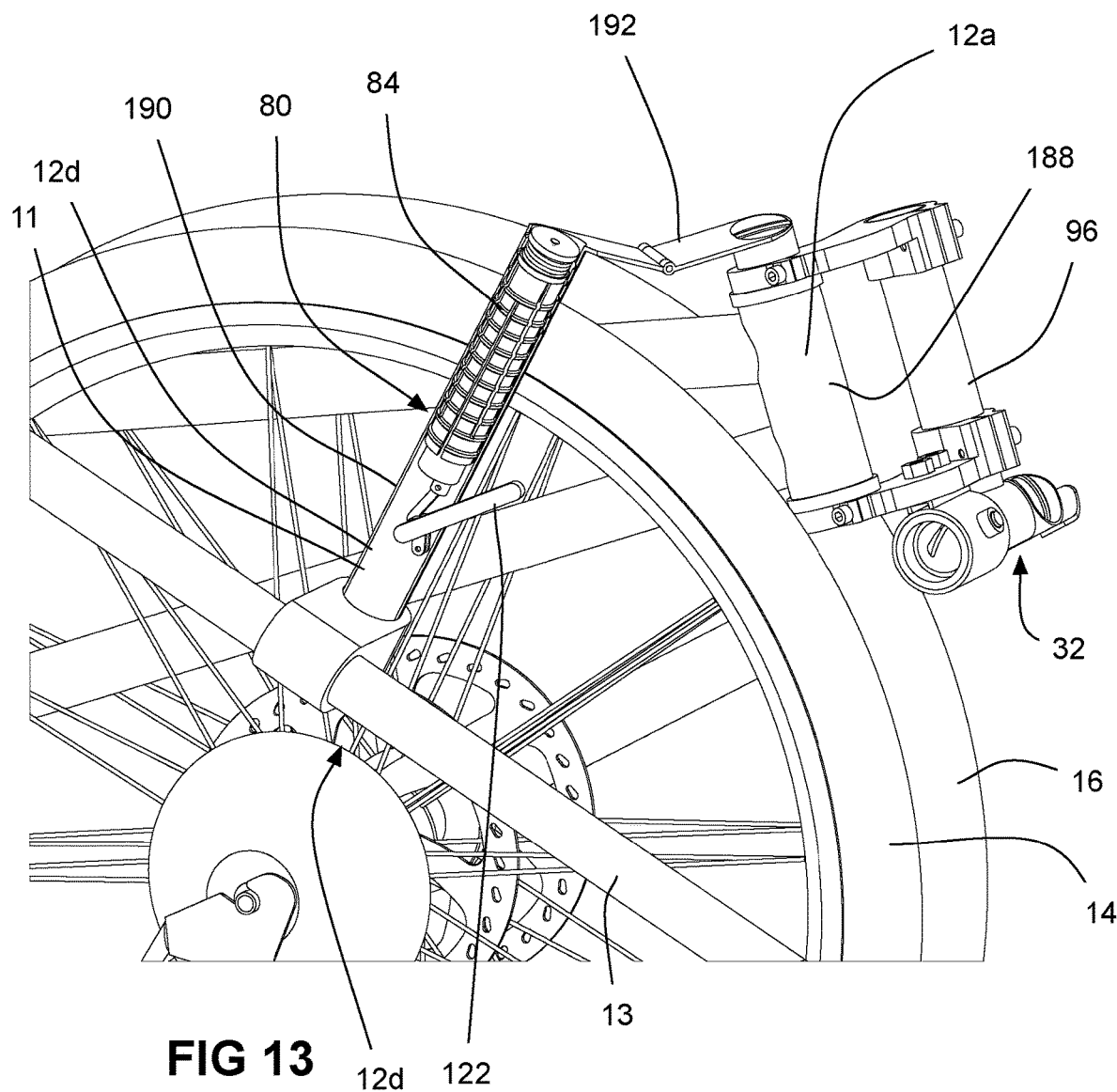
FIG. 13 is a perspective view of a portion of the folding bicycle shown in FIG. 1a showing a handlebar portion of the frame in a folded position, sectioned to shown the locking mechanism shown in FIG. 8a therein.

The locking mechanism is shown in use between a first frame portion (i.e. frame portion 12a) and a second frame portion (i.e. frame portion 12c). However, as shown in FIG. 13, the locking mechanism can alternatively or additionally be used to connect other pairs of frame portions, such as, for example, the main frame portion 12a and the handlebar frame portion 12d (in which case, the first frame portion would again be portion 12a and the second frame portion would be the handlebar frame portion 12d). In this case, the first and second tubes are shown at 188 and 190, and are connected by a hinge 192. In this example, the handlebar frame portion 12d is movably connected to the steering tube 28 (via the hinge 192) for movement between a use position in which the handlebar 13 is holdable by a rider of the folding bicycle 10 for steering the front wheel 16 and a folded position (shown in FIG. 13) to reduce the height and width of at least a portion of the folding bicycle 10.

Instead of providing a quick release mechanism for the locking mechanisms 80, 135 and 156, another means for locking and unlocking the locking mechanism may be provided, such as, for example, a threaded rod that is fixed to the wedge member and a nut that is fixedly connected to the base member. Rotation of a hand knob or the like can cause rotation of the rod, which would drive the rod and the attached wedge member axially, thereby controlling locking and unlocking of the locking mechanism.

Figure 14A:
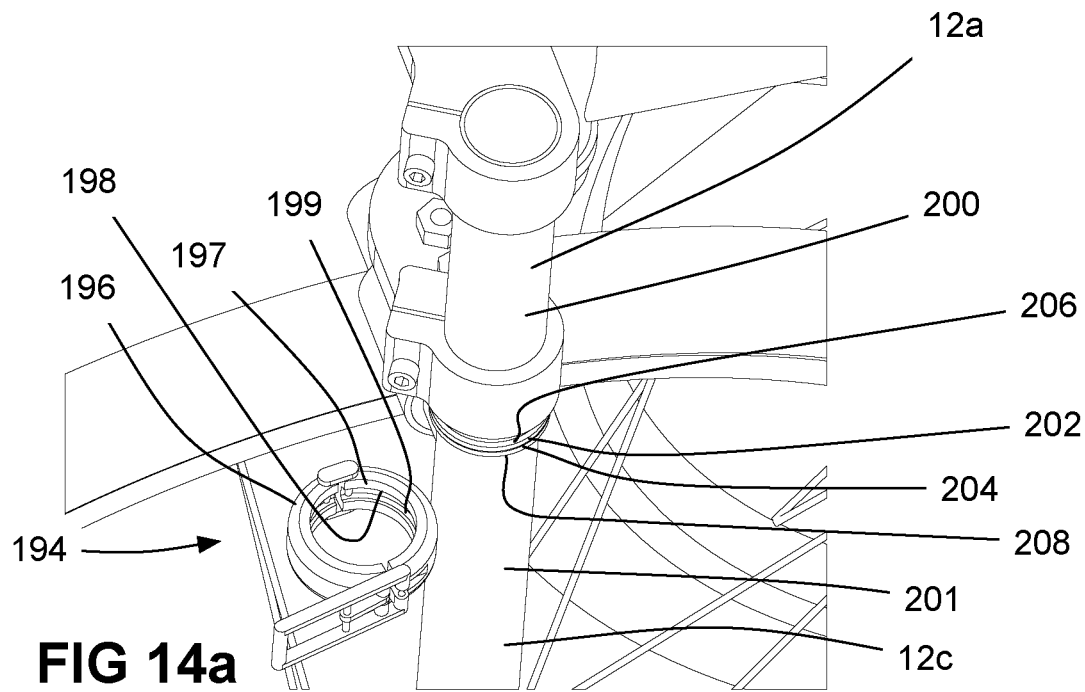
FIGS. 14a and 14b are perspective views that show an alternative locking mechanism to that shown in FIG. 8a, unmounted and mounted to the frame of the folding bicycle.
Figure 14B:
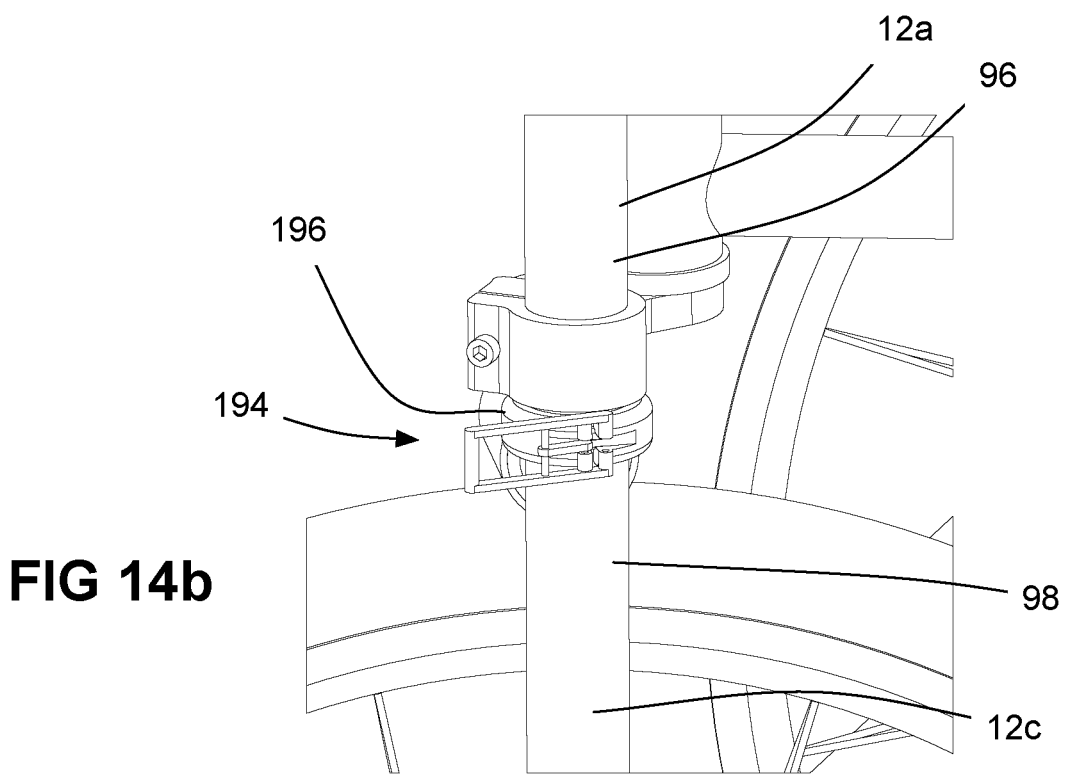

As an alternative to the locking mechanisms 80, 135, 156, shown in FIGS. 8a-13, a locking mechanism 194 may be provided, as shown in FIGS. 14a and 14b. The locking mechanism 194 includes an over-center latch 196 that includes an inner surface 197 that has first and second mutually facing bevel surfaces 198 and 199. First and second tubes shown at 200 and 201 which are part of first and second frame portions (in this case frame portions 12a and 12c), may have first and second flanges 202 and 204 thereon. The flanges 202 and 204 have bevel surfaces 206 and 208 that face away from one another. The over-center latch 196 is shown off the tubes 200 and 201 in FIG. 14a however in practice it would remain around one of the tubes when not in use. When the first and second tubes 200 and 201 abut one another, the over-center latch 196 can be slid (upwards or downwards, as the case may be) over the two flanges 202 and 204 and can be latched, as shown in FIG.

14*b*), thereby driving clamping engagement of the bevel surfaces 198 and 199 with the bevel surfaces 206 and 208.

It will thus be understood that the locking mechanism may be any suitable type of locking mechanism, and is not intended to be limited to the particular examples shown and described.

Figure 15:
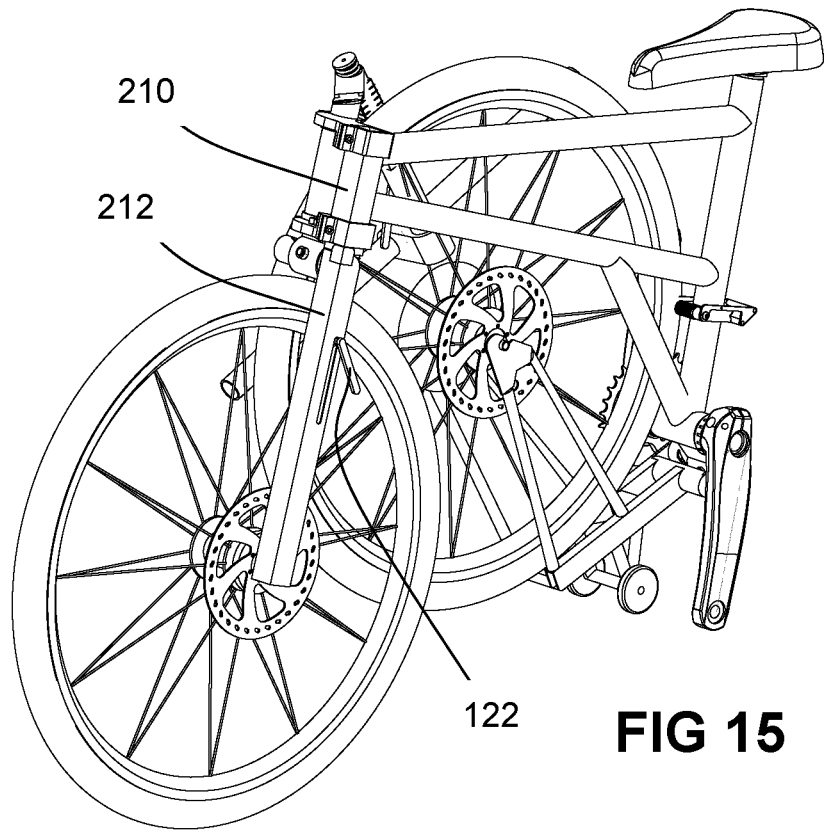
FIG. 15 is a perspective view of the folding bicycle shown in FIG. 1a in a partially folded position, illustrating an alternative front wheel support that is square.
Figure 16:
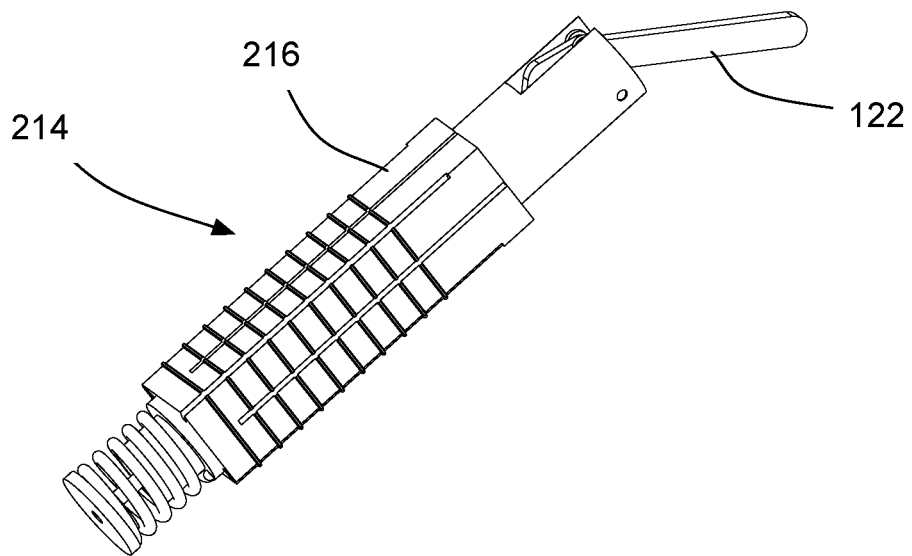
FIG. 16 is a perspective view of a locking mechanism that is square that is for use with the front wheel support on the folding bicycle shown in FIG. 15.

With reference to FIG. 15, it will be noted that the first and second tubes in which the locking mechanism is positioned need not be cylindrical. For example, the tubes shown at 210 and 212 are generally square in cross-section. The locking mechanism itself may also be square, as shown in FIG. 16, at 214. In such an embodiment, the wedge surfaces that engage one another to cause expansion of the expansion member (shown at 216) would be pyramid-shaped instead of conical.

Referring to FIGS. 1*a*-1*i*, to fold the folding bicycle 10 from the use position shown in FIGS. 1*a* and 1*b*, one can unlock the locking mechanism 80, 135, 156 that holds the front wheel support 12*c* in the use position, and fold the front wheel support 12*c* (counterclockwise from the view shown in FIG. 1*a*) to the folded position shown in FIG. 1*c* where the front wheel support 12*c* and consequently the front wheel 16 are positioned on the second side 27 of the first frame portion 12*a*. One can unlock the rear frame portion 12*b* by lifting the hook member 58 to the release position (FIG. 6) and by pivoting the rear frame portion 12*b* (clockwise in the view shown in FIG. 1*c*) to the folded position shown in FIG. 1*d* where the rear frame portion 12*b* and consequently the rear wheel 14 are positioned on the first side 25 of the first frame portion 12*a*. With the rear frame portion 12*b* in the folded position, the handlebar portion 12*d* of the frame 12 can be unlocked and can be folded over to the folded position, as shown in FIG. 1*e*.

Figure 17:
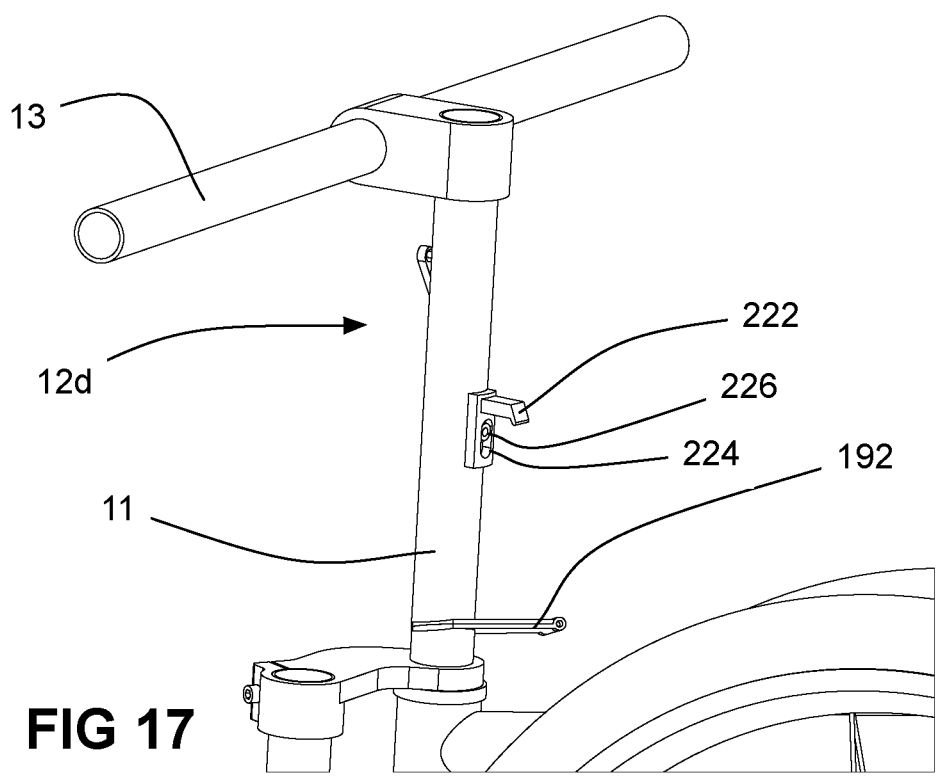
FIG. 17 is a perspective view of a portion of the folding bicycle shown in FIG. 1a, showing a holding member that is used to hold the rear frame portion of the folding bicycle in a folded position.
Figure 18:
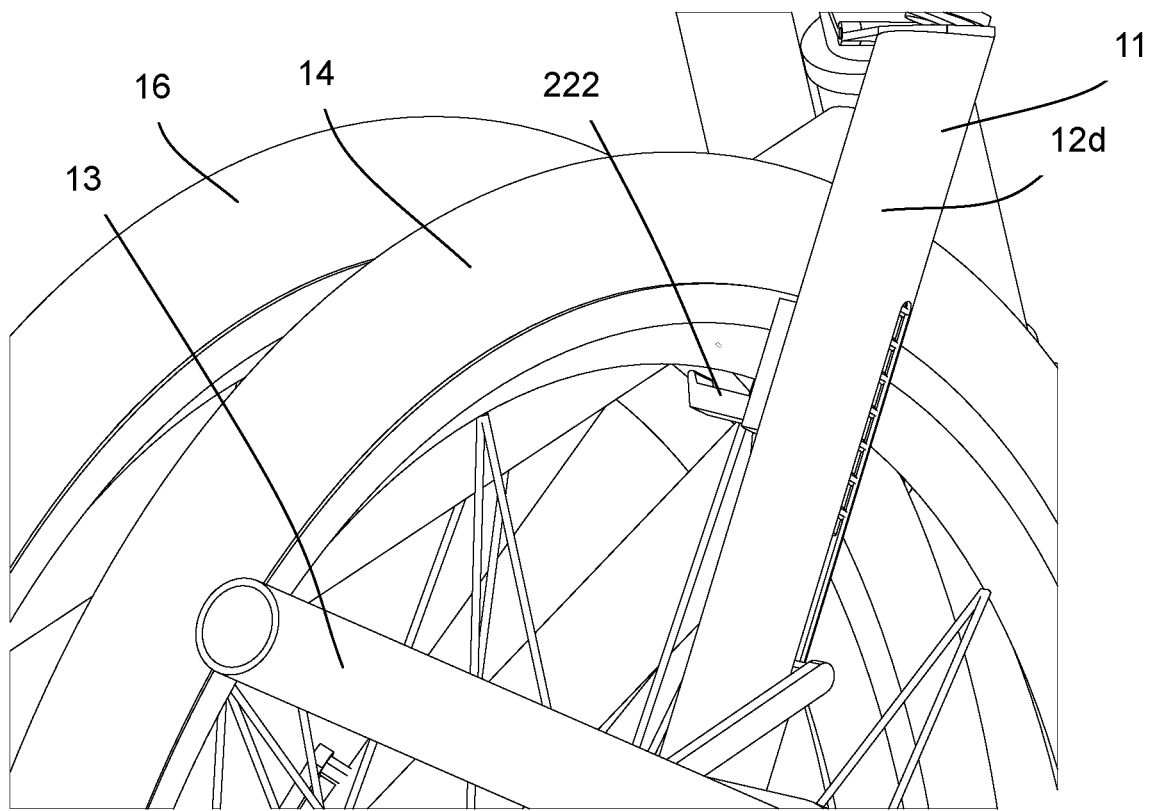
FIG. 18 is a perspective view of the portion of the folding bicycle shown in FIG. 17, showing the holding member holding the rear frame portion of the folding bicycle in the folded position.

It will be noted that, when the second frame portion 12*b* is in the folded position, it would be beneficial to provide a way of holding it in the folded position. A rear frame portion folded position holding member for this purpose is shown at 222 in FIGS. 17 and 18. The holding member 222 may be a hook that is mounted to the handlebar support 11. When the handlebar portion 12*d* is folded over, as shown in FIG. 18, the holding member 222 winds up being positioned underneath the rim of the wheel 14, so that it hooks the rim and prevents the wheel 14 and the rear frame portion 12*b* from pivoting back towards the use position. Optionally, the holding member 222 may be connected to the handlebar support 11 via a slotted aperture and a threaded fastener, as shown at 224 and 226 respectively to permit some adjustability in the position of the holding member 222 to suit the user's preference.

Figure 1G:
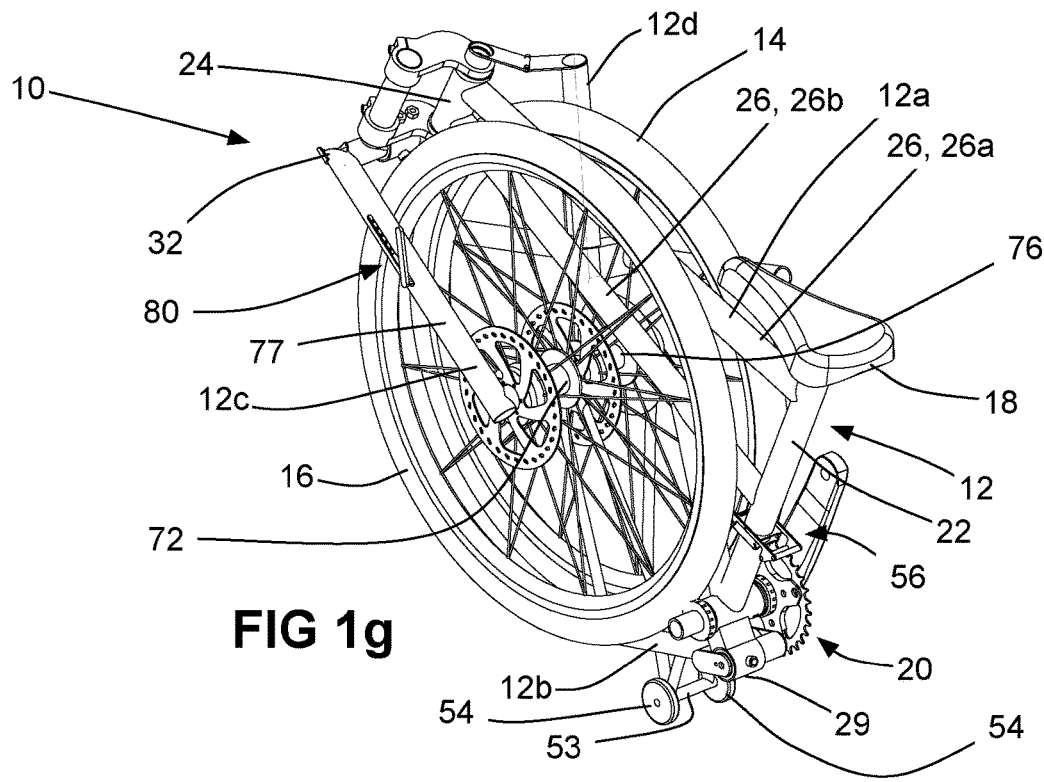
Figure 1H:
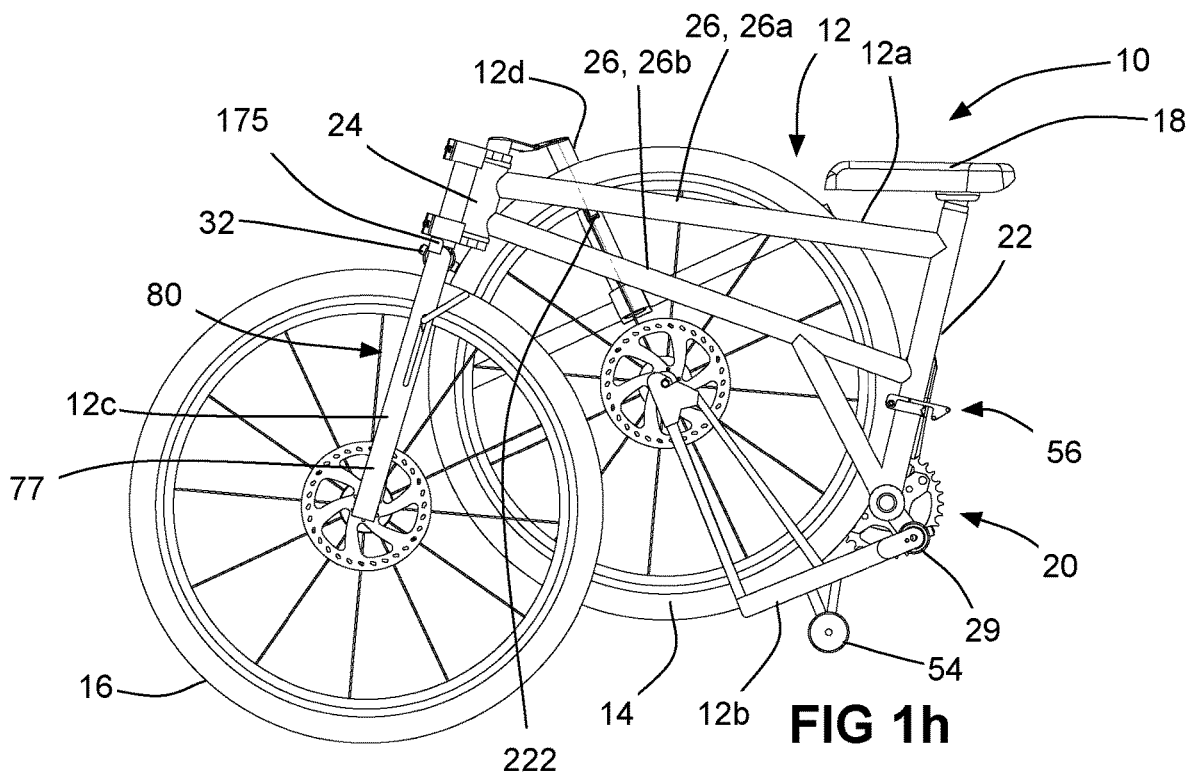
FIG. 1h is an elevation view of the folding bicycle shown in FIG. 1a in a partially unfolded position.
Figure 1I:
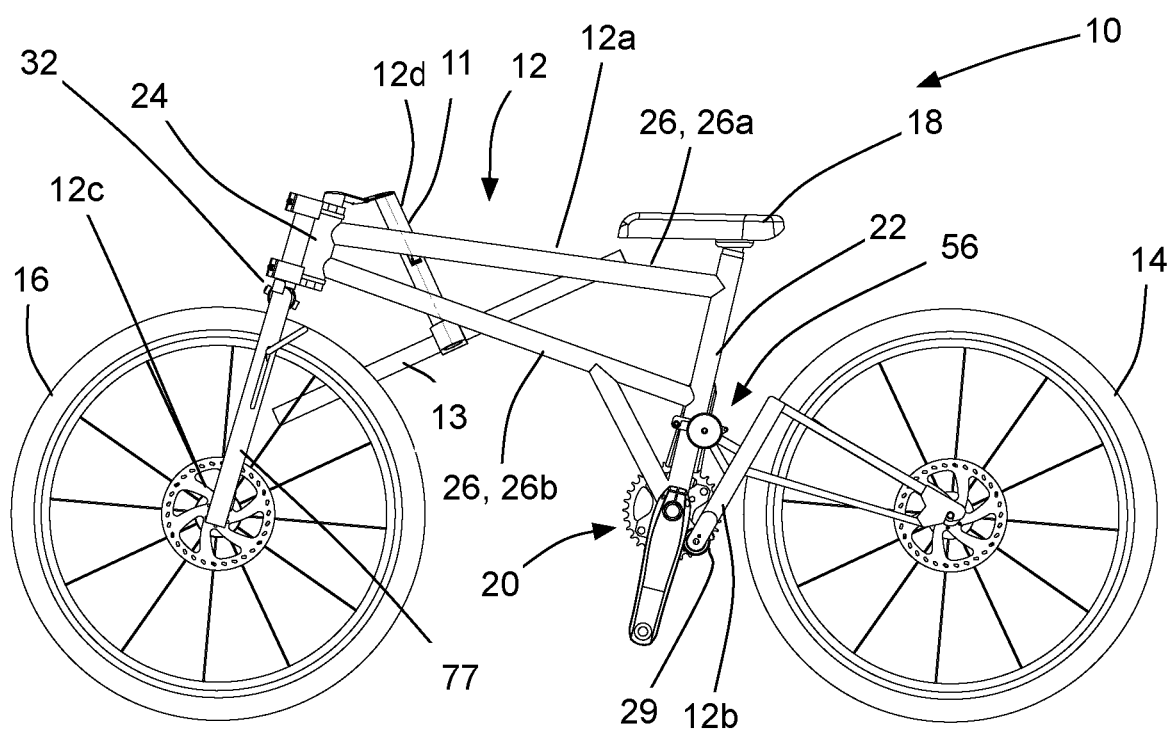
FIG. 1i is an elevation view of the folding bicycle shown in FIG. 1a in a further unfolded position.

The seat 18 may be lowered into the seat tube 22 to reduce the height of the associated region of the folding bicycle 10, as shown in FIG. 1*f*. FIG. 1*g* shows the same position of the folding bicycle 10 as FIG. 1*f* (i.e. the folded position. To open the folding bicycle 10 to the use position from the folded position, one can unfold the front wheel support 12*c* (by pivoting it clockwise in the view shown in FIG. 1*g*), to the use position shown in FIG. 1*h*. Once in position, the locking mechanism 80, 135, 156 (or the locking mechanism 194) can be locked. The holding member 222 can be unhooked from the rear wheel 14 and the rear frame portion 12*b* can be pivoted back to the use position shown in FIG. 1*i* and be locked in place by the hook member 58. The handlebar portion 12*d* can be pivoted up into its use position and locked in place via its locking mechanism and the seat 18 can be raised to its use position, such that the folding bicycle 10 is in the use position shown in FIGS. 1*a* and 1*b*. It will be noted that some steps described above can take place in a different order than that described above. For example, during unfolding of the bike 10, the handlebar portion 12*d* can be raised and locked in its use position before the rear wheel 14 is swung out to its use position.

As shown in FIGS. 1*g* and 7*c*, when the folding bicycle 10 is in the folded position (more specifically, when the second and third frame portions are in the folded positions), the front and rear wheel axles 72 and 76 are aligned with one another and are substantially in abutment with one another. As a result, in the event that the folding bicycle 10 receives a lateral force against one or both of the wheels 14 and 16, the abutment of the axles 72 and 76 assists in resisting the force and in inhibiting bending stresses on the front wheel support 12*c* and/or the rear frame portion 12*b* as the case may be.

Figure 19:
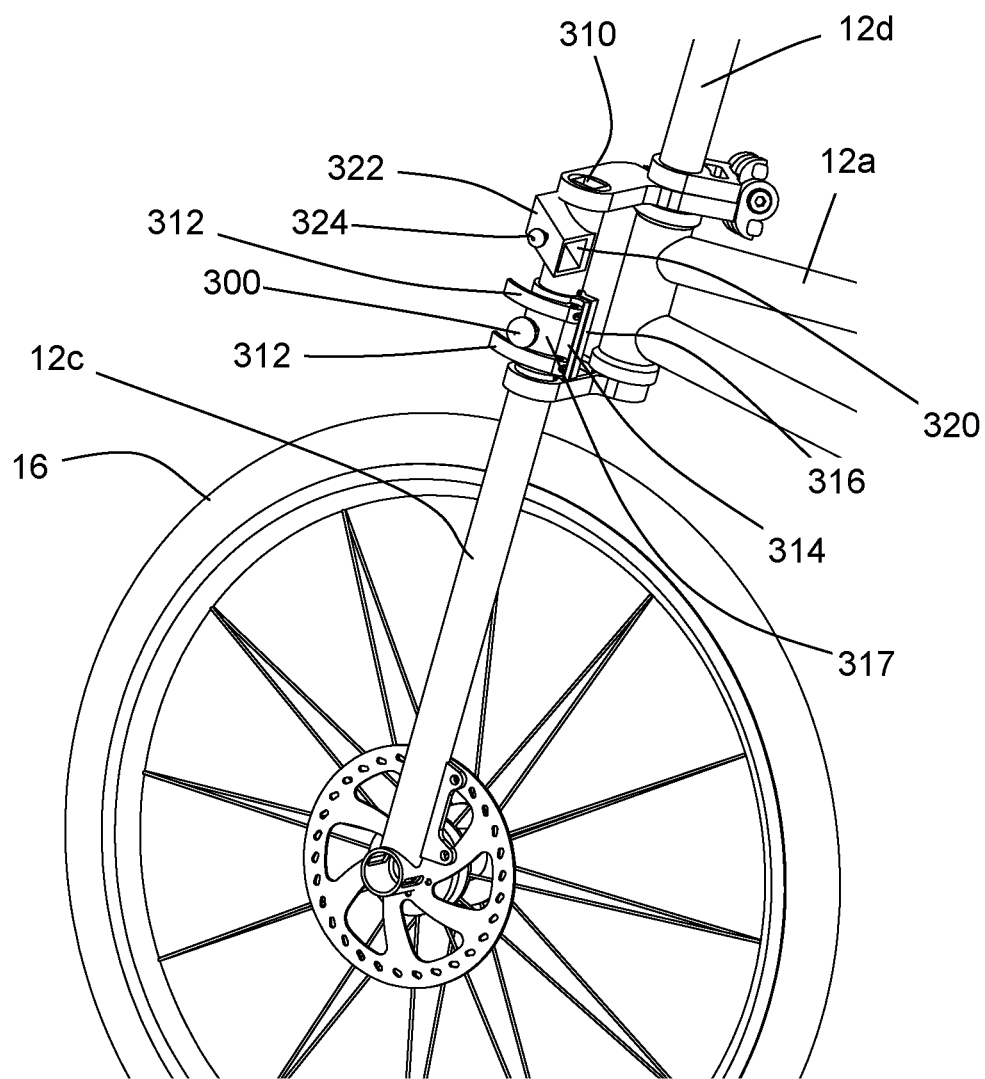
FIG. 19 is a perspective view of a portion of the compactable bicycle shown in FIG. 1, with a removable front wheel support, in a use position.
Figure 20:
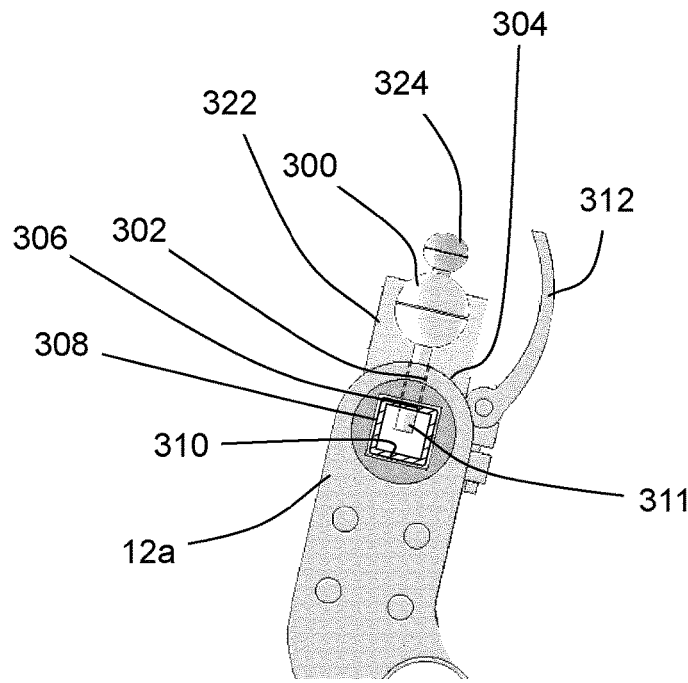
FIG. 20 is a plan view from underneath showing the mounting of the front wheel support shown in FIG. 19.

In the above-described embodiments, the front wheel support is shown and described as pivoting between a use position and a folded position. It will be understood, however, that the front wheel support may move between a use position and a folded position in any suitable way. For example, with reference to FIG. 19, the front wheel support 12*c* may be movable between a use position and a storage position by being removable from the rest of the bicycle 10 (e.g. from the main frame portion 12*a*) when in one of the use and storage positions, and being reconnectable to the rest of the bicycle 10 in the other of the use and storage positions. In FIG. 19, the front wheel support 12*c* is shown in the use position. The front wheel support 12*c* is shown in the storage position in FIG. 23. In the use position, an alignment pin 300 extends through a first aperture 302 on a portion of the frame 12 aside from the front wheel support 12*c* (e.g. on a wall 304 of the main frame portion 12*a* as shown in FIG. 20) and through a second aperture 306 on the front wheel support 12*c*. To assist in aligning the front wheel 16 when it is in the use position, the free end (shown at 308 in FIG. 19) of the front wheel support 12*c* may be configured with a non-circular cross-sectional shape, such as a square cross-sectional shape, and the front wheel support receiving aperture shown at 310 on the main frame portion 12*a* may have a corresponding hollow non-circular (e.g. hollow-square) cross-sectional shape. The alignment pin 300 may be retained in place in the apertures 302 and 306 by any suitable means. For example, the alignment pin 300 may include one or more balls (not shown) along its shaft (shown at 311) and may include a spring-loaded plunger to lock the balls outwardly or to permit the balls to retract radially (for removal or insertion of the pin 300).

Figure 21:
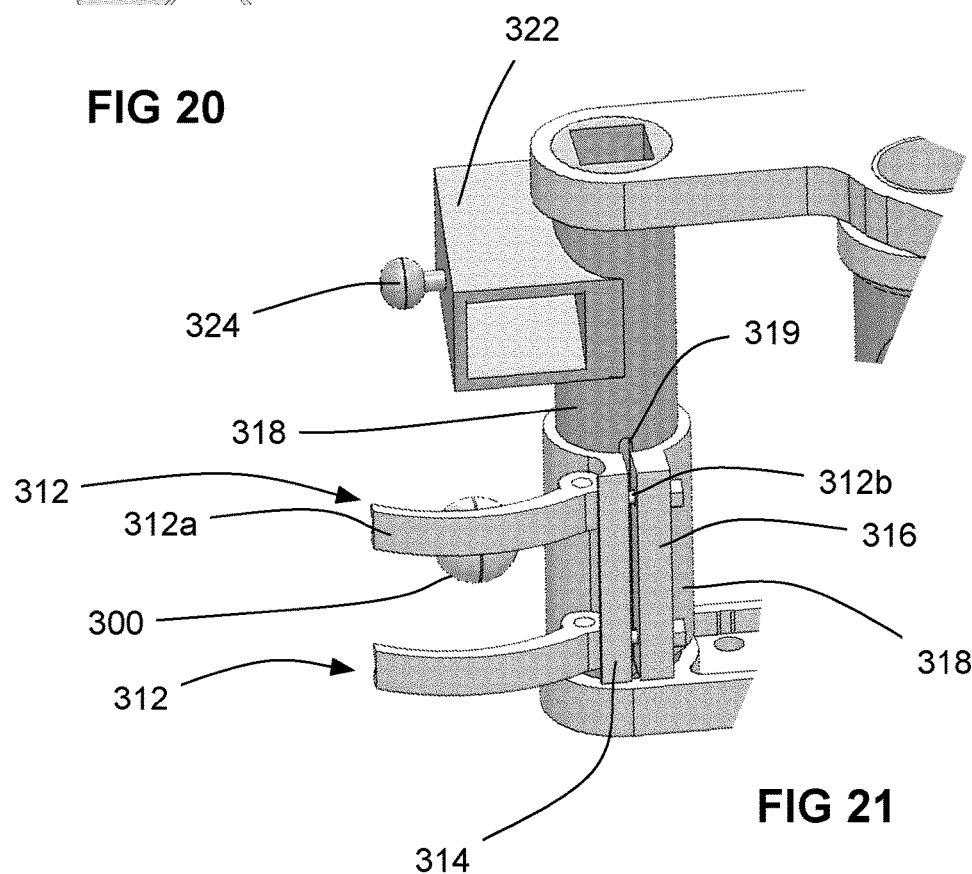
FIG. 21 is a perspective view of a portion of the bicycle shown in FIG. 19 showing a pair of cam-lock members.
Figure 22:
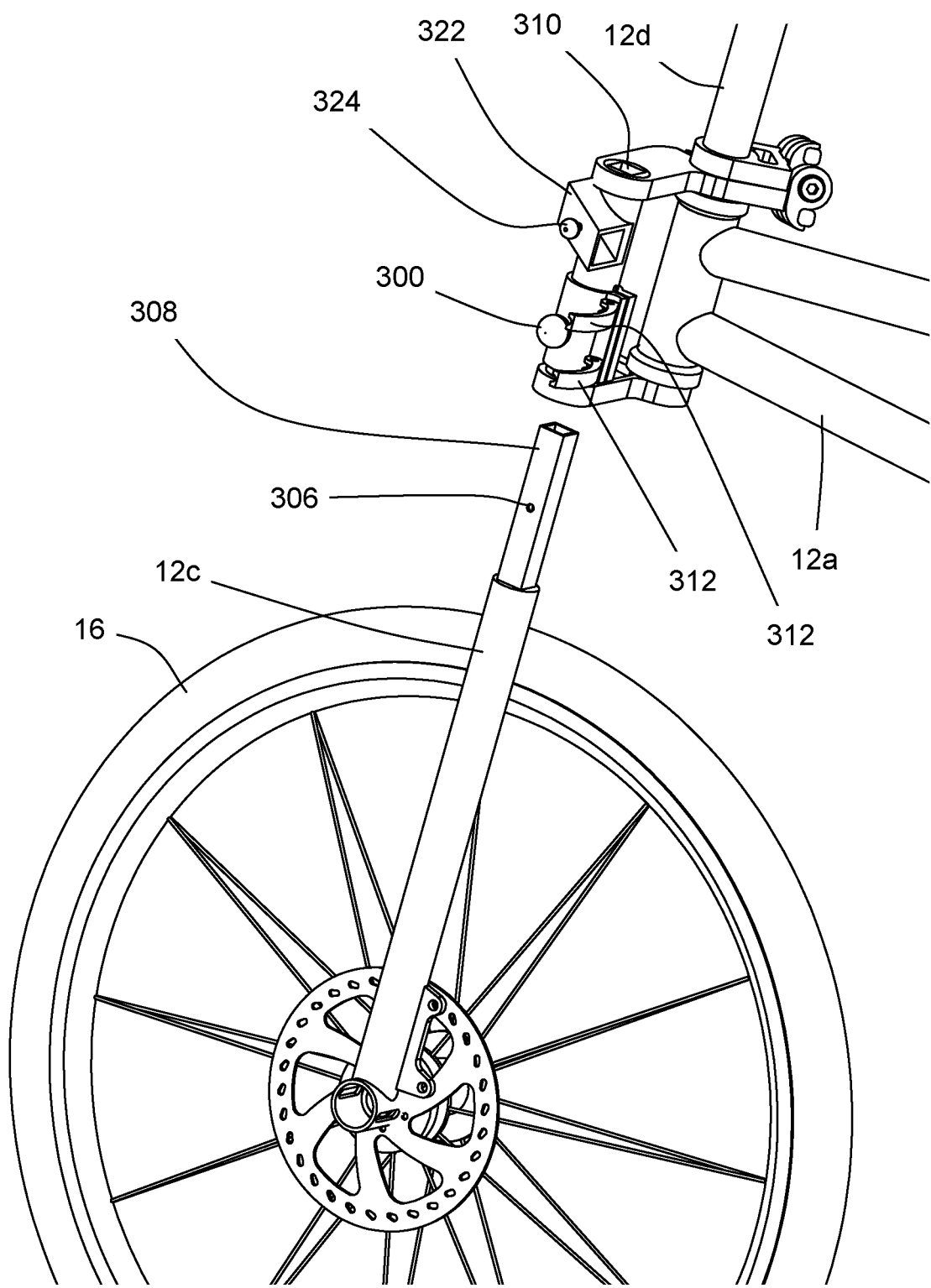
FIG. 22 is a perspective view of the compactable bicycle shown in FIG. 19, with the front wheel support removed from the rest of the frame.
Figure 23:
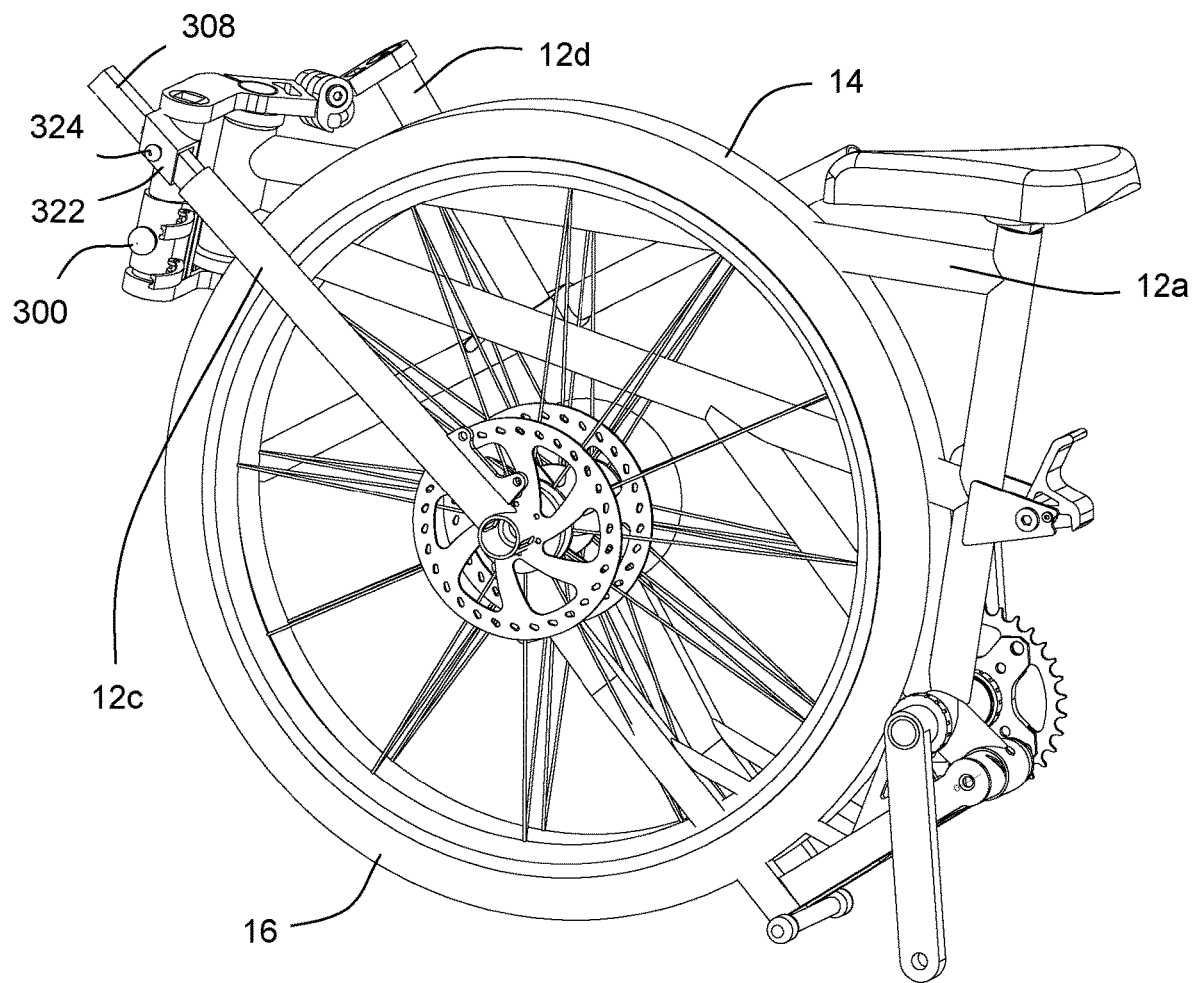
FIG. 23 is a perspective view of the compactable bicycle shown in FIG. 19, with the front wheel support in a storage position.

While there may be a snug fit of the free end 308 of the front wheel support 12*c* in the aperture 310, there may still remain some play between the two. With reference to FIG. 21, to firmly hold the free end 308 (and therefore the front wheel support 12*c* in place one or more (in this example, two) cam-lock members 312 are provided, each of which includes a cam-lock lever 312*a* and a connector rod 312*b* that passes between two spaced apart flanges shown at 314 and 316 of a clamp member 317. The clamp member 317 surrounds an inner tube 318 that defines the aperture 310. The inner tube 318 has a slot 319 that permits deformation (resilient collapse) of the inner tube 318 against the free end 308 of the front wheel support 12*c* when the cam-lock levers 312 are moved to their clamping position (FIG. 19), which draws the flanges 314 and 316 towards one another. The cam-lock clamps 312 may be similar to quick-release clamps on a front and rear wheel of a typical bicycle today. The cam-lock clamps are movable between a clamping position (FIG. 19) and a release position (FIGS. 20-22). The inner tube 318 in the embodiment shown in FIGS. 19-23 forms part of the main frame portion 12a.

The front wheel support 12c is shown removed from the main frame portion 12a in FIG. 22. The front wheel support 12c is shown inserted into a storage position receiving aperture 320 on a remaining portion of the frame 12 (e.g. on the main frame portion 12a). The aperture 320 may be provided in a storage position receiving tube 322. A storage position locking pin 324 may pass through an aperture in the tube 322 and through the second aperture 306 in the front wheel support 12c to lock the front wheel support 12c in place in the storage position.

Figure 24:
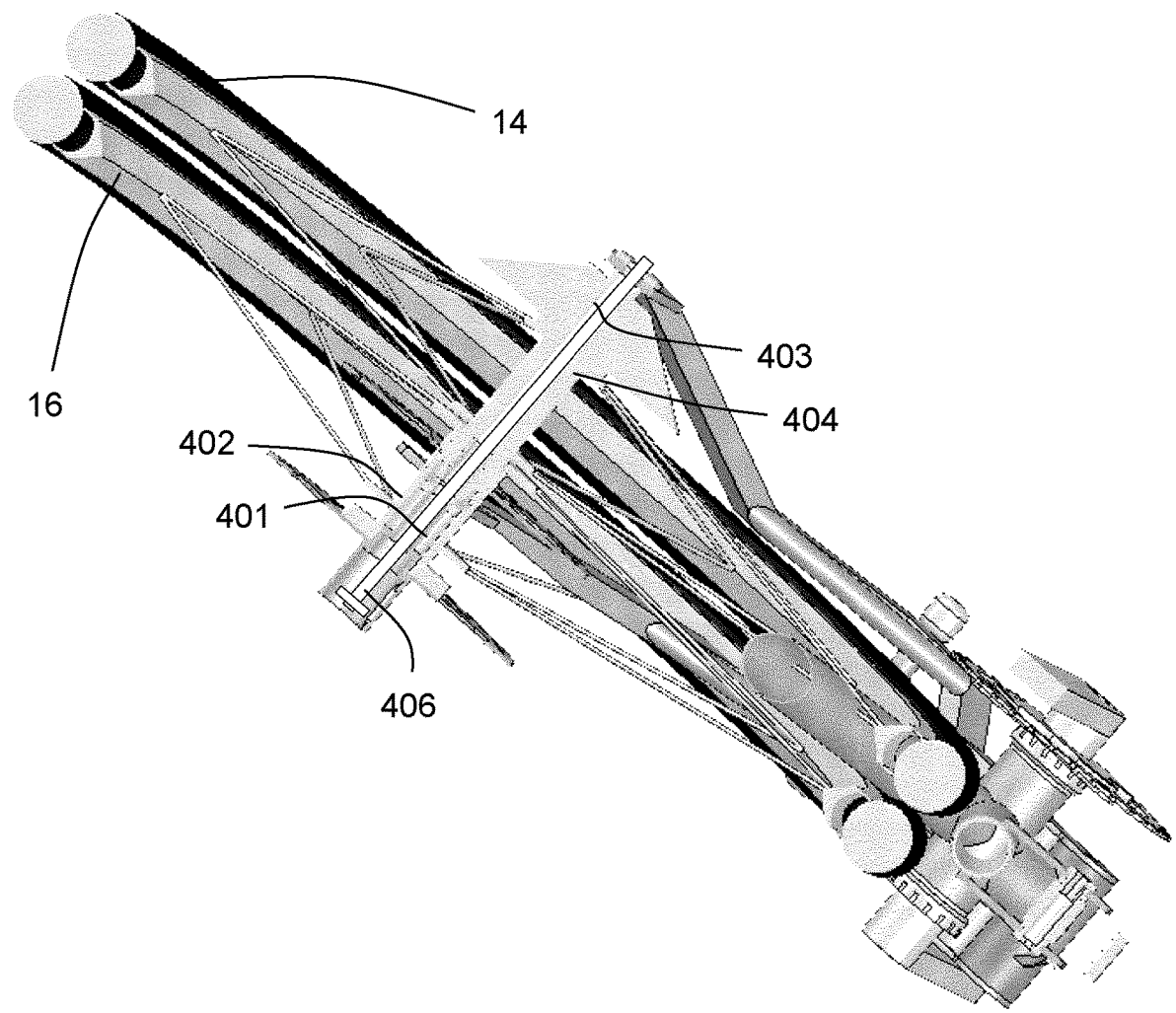
FIG. 24 is a sectional plan view of the bicycle in a storage position, showing an optional pin used to hold the front and rear wheels in axial alignment with one another.

As shown in FIG. 24, it is optionally possible to provide a first axial passageway in the shaft 402 front wheel 16 that is alignable with a second axial passageway in the shaft 404 of the rear wheel 14, such that a ball-plunger pin 406 can pass-through the passageways 401 and 403 to lock the front and rear wheels 16 and 14 in alignment with one another when the bicycle 10 is in the storage position. This facilitates rolling the bicycle 10 along the ground when it is in the storage position.

Figure 25:
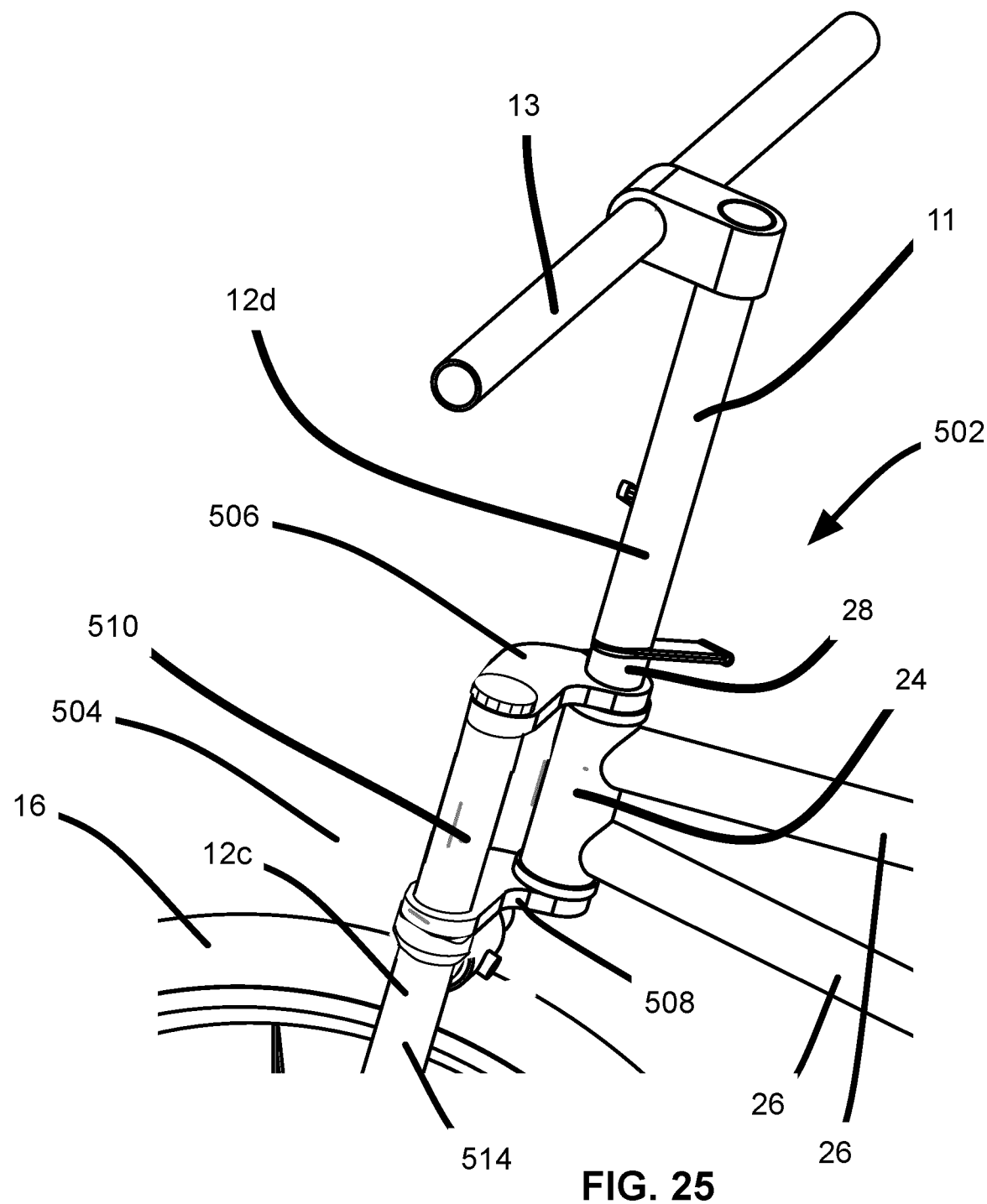
FIG. 25 is a perspective view of a portion of the bicycle shown in FIG. 1a, illustrating an alternative locking mechanism.

Reference is made to FIG. 25, which a portion of the bicycle 10, in which there is a locking mechanism for locking elements of the steering structure 504, that is an alternative to the locking mechanisms shown in FIGS. 1-24. As shown in FIG. 25, the steering structure 504 includes first and second extension arms 506 and 508, and an extension tube 510 that is generally parallel to and offset from the steering tube 28. The first and second extension arms 506 connect the steering tube 28 and the extension tube 510 together. The front wheel support 12c is movable relative to the extension tube 510, optionally by way of a pivot connection 32 that is similar to the pivot connection 32 shown in FIG. 9b.

Figure 26:
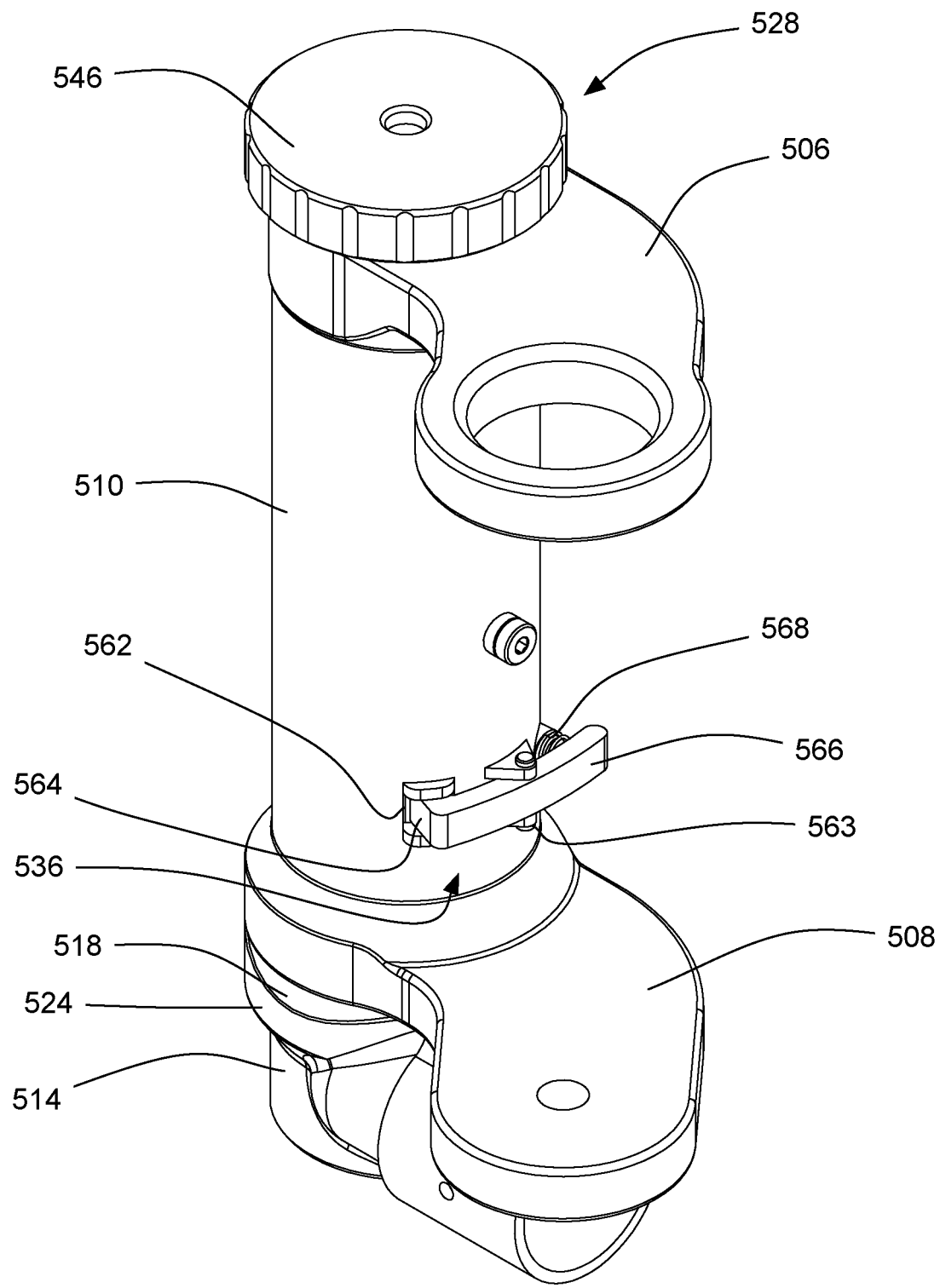
FIG. 26 is a magnified perspective view of the locking mechanism.

The locking mechanism is shown at 512 in FIG. 26 and is used for connecting the extension tube 510 and the tube shown at 514 that is part of the front wheel support 12c. The extension tube 510 and the tube 514 are but examples of a first frame element and a second frame element that can be locked together using the locking mechanism 512. Accordingly, for the following description, the extension tube 510 and the tube 514 are referred to as the first frame element 510 and the second frame element 514. It will further be noted that the first and second frame elements 510 and 514 are shown as being part of the steering structure 504, however they could alternatively form part of the base frame portion 502.

Figures 28, 29:
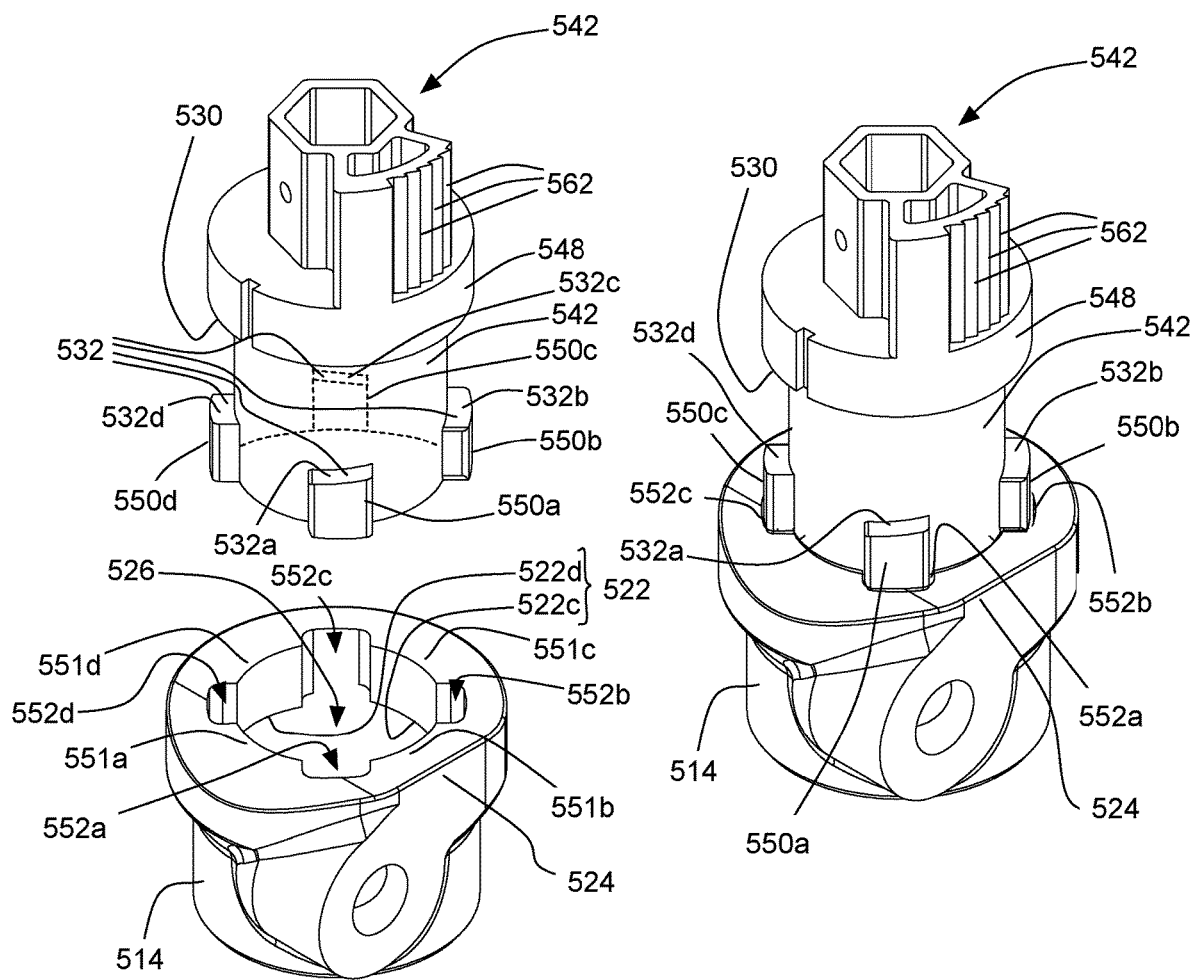
FIG. 28 is an exploded perspective view of a portion of a plunger with first primary locking surfaces and a portion of the wheel support member with second primary locking surfaces from the locking mechanism shown in FIG. 27.
FIG. 29 is a perspective view of the portions of a plunger and the wheel support member shown in FIG. 28, in a release position.

With reference to FIG. 26, it can be seen that the first frame element 510 has a first frame element locking surface 516, a first end 518, and a first aperture 520 at the first end 518. The second frame element 514 has a second frame element locking surface 522, a second end 524 and a second aperture 526 at the second end 524. The first and second frame elements 510 and 514 are positionable in a first position (FIGS. 30b, 30c, 30d, 30e) in which the first and second apertures 520 and 526 are generally aligned with one another and the first and second frame element locking surfaces 516 and 522 generally face away from one another, and in a second position (FIG. 30a) in which the first and second apertures 520 and 526 are generally unaligned with one another. A plunger 528 is provided and has a first plunger locking surface 530, a second plunger locking surface 532 (FIG. 28), and an intermediate plunger portion 534 between the first and second plunger locking surfaces 530 and 532.

The plunger 528 is movable to a clamping position (FIG. 30e) in which the plunger 528 extends in both the first and second apertures 520 and 526 such that the first plunger locking surface 530 engages the first frame element locking surface 516 and the second plunger locking surface 532 engages the second frame element locking surface 522 and the intermediate plunger portion 534 is preferably but not necessarily in some tension, such that the first and second ends 518 and 524 are abutted with one another and are clamped together. The plunger 528 is also movable to a release position (FIGS. 30a and 30b) in which the plunger 528 retracts from the second aperture 526 sufficiently to permit the first and second ends 518 and 524 to be separated from one another. A plunger locking member 536 (FIG. 27) is provided and is positionable to engage the plunger 528 to prevent movement of the plunger 528 away from the clamping position. A plunger clamping biasing member 538 is provided and urges the plunger 528 towards the clamping position. A plunger release biasing member 540 is also provided and urges the plunger 528 towards the release position.

The components and operation identified above will now be described in further detail. The plunger 528 includes a plunger body 542, a plunger rod 544 and a plunger handle 546. The first plunger locking surface 530 is an annular shoulder provided on a flange 548 on the plunger body 542. The first frame element locking surface 516 may be an annular shoulder that extends radially inwardly sufficiently to abut the first plunger locking surface 530.

The second plunger locking surface 532 may include a plurality of second plunger locking surface segments 532a, 532b, 532c and 532d (FIG. 28) that are positioned on radial projections 550a, 550b, 550c and 550d and are sloped in a circumferential direction. In the example shown the second plunger locking surface segments 532a, 532b, 532c and 532d are sloped downwardly towards the left. Similarly, the second frame element locking surface 522 may include a plurality of second frame element locking surface 522a, 522b, 522c and 522d (FIGS. 28 and 30a-30e) that are positioned on radial projections 551a, 551b, 551c and 551d (FIGS. 28 and 30a-30e) and are sloped in the same circumferential direction as the surfaces 550a-550d. The radial projections 551a-551d are spaced from one another such that axial slots 552a, 552b, 552c and 552d are between adjacent radial projections 551a-551d.

The first frame element 510 has inward radial projections that are aligned with the radial projections 551a-d when the first and second frame ends are positioned as shown in FIGS. 30b-30e. The radial projections are shown generally at 553. In the example shown the first frame element 510 has four radial projections which are aligned with the four radial projections 551a-551d on the second frame element 514, however, only two such radial projections 553 are shown in FIGS. 30a-30e. These are identified at 553a and 553b. Slots 554 are provided between adjacent radial projections 554. There are therefore four slots 554 in example embodiment being described, however, only one slot 554 (shown as 554a) is depicted in FIGS. 30a-30e. The alignment of the radial projections 553 with the radial projections 551a-551d aligns the slots 552a-552d with the slots 554.

The plunger body 542 (FIG. 27) is fixedly connected to an end of the rod 544 by any suitable means, such as by a press-fit and/or by means of a mechanical fastener. The plunger handle 546 is fixedly connected to another end of the rod 544 by any suitable means, such as by a press-fit and/or by means of a mechanical fastener. The plunger handle 546 is positioned outside the extension tube 510 and is accessible by a user of the bicycle 10 to move the plunger 528 between the clamping and release positions. The plunger rod 544 may be a faceted rod to assist in maintaining a solid connection with the plunger handle 546 and with the plunger body 542. Additionally, the faceted exterior of the rod 544 is also used in connecting the rod 544 to the plunger clamping biasing member 538 as described further below. In the example shown, the rod 544 is hexagonal (i.e. it has 6 facets), however, it could alternatively have any other suitable number of facets.

Figure 27:
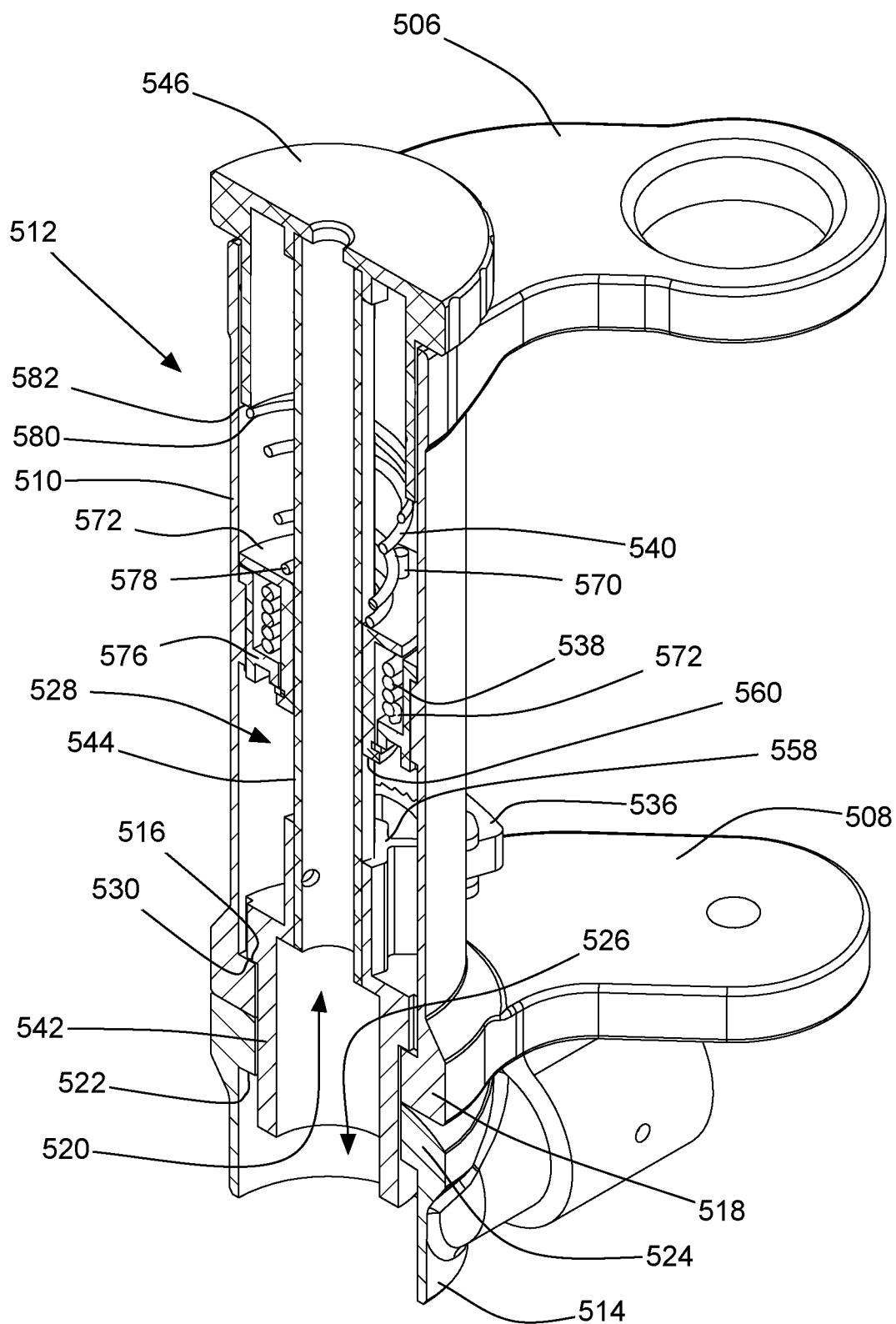
FIG. 27 is a magnified sectional perspective view of the locking mechanism.

Referring to FIG. 27, the plunger clamping biasing member 538 may be a torsion spring that has a first end 570 and a second end 572. The first end 570 may be fixedly connected to the first frame element 510 by any suitable means such as by an insert 574 that mounts within the interior of the first frame element (i.e. in the aperture 520). The second end 572 may be mounted to a sleeve 576 that is rotationally operatively connected to the plunger rod 544 (and therefore in general to the plunger 528) but permits axial sliding movement of the plunger 528 therethrough. For example, the sleeve 576 may have a hexagonal pass-through aperture 578 through which the plunger rod 544 passes, which permits the aforementioned axial sliding of the plunger 528 and which is rotationally connected to the plunger rod 544 so as to rotationally operatively connect the biasing member 538 to the plunger 528, i.e. so that the biasing member 538 can drive the plunger 528 rotationally.

The plunger release biasing member 540 may be a helical compression spring that has a first axial end 578 that is engaged with the sleeve 576 and a second axial end 580 that is engaged with a shoulder 582 on the plunger handle 546. The sleeve 574 has a flange that rests on a support surface of the insert 574. As a result, engagement of the first end 578 of the plunger release biasing member 540 with the sleeve 576 is engagement of the first end 578 with the first frame element 510. As a result of this arrangement, the biasing member 540 urges the plunger 528 towards the release position.

FIG. 30a depicts the plunger 528 in the release position and the first and second frame elements 510 and 514 in a stowage position. In order to lock the first and second frame elements together in a use position, the second frame element 514 is moved (e.g. by means of a pivot connection 32 as shown in FIG. 9b), to an abutted position in which the first and second ends 518 and 524 are positioned such that the first and second apertures 520 and 526 are aligned with one another, as shown in FIG. 30b. In this position, the plunger 528 is still in the first aperture 520 only and does not extend into the second aperture 526. From this position, the plunger 528 is moved in the direction of arrow 556 (i.e. towards and into the second aperture 526 in the second frame element 514), so that the plunger 528 now straddles both frame elements 510 and 514, as shown in FIG. 30c. It will be noted that, limit surfaces 558 and 560 on the plunger 528 and the first frame element 510 engage one another when the plunger 528 is in the release position so as to prevent the radial projections 550 from leaving the slots 554. As a result, when it is desired to move the plunger 528 from the release position to the clamping position, it is not necessary to rotate the plunger 528 first to align the projections 550a-550d with the slots 554.

The position of the plunger 528 in FIG. 30c is merely an intermediate position en route from the position shown in FIG. 30b in the direction of arrow 556 to the position shown in FIG. 30d. Throughout the movement of the plunger 528, the plunger clamping biasing member 538 urges the plunger 528 rotationally (clockwise in the view shown in FIG. 27, or to the left in the views shown in FIGS. 30a-30e). However, the presence of the projections 550a-550d in the slots 554 and 553a-553d prevents the plunger 528 from being driven rotationally by the biasing member 538. Once the plunger 528 clears the slots 554 and 553a-553d and has been brought sufficiently past the projections 551a-551d (i.e. once the plunger 528 is in the position shown in FIG. 30d), the plunger clamping biasing member 538 can drive the plunger 528 rotationally in a first rotational direction (towards the left, in the direction of the arrow 555, in the views shown in FIGS. 30a-30e) to the clamping position shown in FIG. 30e, bringing the second plunger locking surface 532 into engagement with the second frame element locking surface 522. At some amount of engagement between the locking surfaces 532 and 522 the first plunger locking surface 530 and the first frame element locking surface 516 will engage one another. Any further rotation of the plunger 528 after that point will cause an increase in the amount of engagement (angular overlap) between locking surfaces 532 and 522 while generating progressively increasing axial tension in the intermediate portion 534 of the plunger 528. The said further rotation of the plunger 528 can be carried out to some extent by the plunger clamping biasing member 538 and can be supplemented by the user of the bicycle 10 by manually grasping and rotating the plunger handle 546 in the appropriate direction (i.e. in the same direction as the force applied by the biasing member 538). The tension in the intermediate portion 534 of the plunger 528 defines the clamping force that holds the first and second frame elements 510 and 514 in abutment with one another. Worded another way, the plunger 528 is axially slidable to bring the plunger projections 550 past the radial projections 551 and is rotatable in a first rotational direction about the plunger axis to bring the plurality of plunger locking surfaces 532 at least into engagement with the plurality of second frame element locking surfaces 522, to clamp the first and second frame elements 510 and 514 together. Once the plunger 528 has been rotated sufficiently to generate a suitable clamping force, the plunger locking member 536 is used to hold the plunger 528 in place. In the example shown, the plunger 528 has a set of ratchet teeth thereon, shown at 562. The plunger locking member 536 has a pawl 564 incorporated therein, and moves between an engagement position in which the locking member 536 (the pawl 564 specifically) engages one of the teeth 562, and a release position in which the locking member 536 is clear of the teeth 562. When in the engagement position, the locking member 536 prevents rotation of the plunger 528 in a direction towards a reduced clamping force, but permits further rotation of the plunger 528 in a direction towards increasing the clamping force.

The movement of the plunger locking member 536 between the engagement and release positions may be a pivoting movement due to a pivot connection 563 (e.g. via a pin that passes through the plunger locking member and that is connected to the first frame element 510). The plunger locking member 536 may further include a handle 566 that is at the opposite end of the plunger locking member 536 to the pawl 564, and a plunger locking member biasing member 568 that biases the plunger locking member 536 towards the engagement position.

The plunger locking member 536 is positioned on the exterior of the first frame element 510 but the pawl 564 can access the teeth 562 on the plunger 528 (which are inside the first frame element 510) through a window in the first frame element 510.

To release the first and second frame elements 510 and 514 from one another, the user can press the handle 566 on the plunger locking member 538 to lift the pawl 564 out of the teeth 562 on the plunger 528. The user can then rotate the plunger 528 away from the position shown in FIG. 30e, against the biasing force of the plunger clamping biasing member 538 until the projections 550 are aligned with the slots 552a-552d (the position shown in FIG. 30d). Once the projections 550 and slots 552a-552d are aligned, the user can pull the plunger 528 out from the second aperture 526 in the second frame element 514, going from the position shown in FIG. 30d, through the position shown in FIG. 30c and finally to the release position shown in FIG. 30b, at which point the second frame element 514 can be pivoted to its stowage position.

It will be noted that, once the projections 550 are aligned with the slots 552a-552d, the plunger release biasing member 540 can drive the plunger 528 from the position shown in FIG. 30d to the position shown in FIG. 30b.

While there are four locking surface segments 532 and 522 on the plunger 528 and the second frame element 514 respectively, it will be understood that there could be more or fewer of the surfaces segments 532 and 522 (and associated projections 550 and 552). In short there is at least one locking surface segment 532 and at least one locking surface segment 552.

Reference is made to FIG. 31, which shows another locking mechanism at 600 that can be used in place of the locking mechanism 512. The locking mechanism 600 may be similar to the locking mechanism 512 and may include elements with similar functions as those in the locking mechanism 512 (and which may be identified with the same reference numbers even if slightly different in shape). Differences between the locking mechanism 600 and the locking mechanism 512 are described below. The locking mechanism 600 includes a plunger 628 that may be similar to the plunger 528 and includes a plunger handle 646 (which may be similar to the plunger handle 546 (FIG. 27)), a plunger rod 644 and a plunger body 642, that is itself divided into a first plunger body portion 642a and a second plunger body portion 642b. The first and second plunger body portions 642a and 642b have respective first and second plunger threaded surfaces 682a and 682b which are engaged to one another to form a threaded connection 682 between the first and second plunger body portions 642a and 642b. Additionally, a limit member 684 is provided to limit how far apart the first and second plunger body portions 642a and 642b can be axially separated (i.e. unthreaded) from one another.

The plunger body 642 has the first plunger locking surface 530 on the first plunger body portion 642a and has the second plunger locking surface 532 (segments 532a, 532b and 532d of which are shown on projections 550a, 550b and 550d in FIG. 32).

The plunger rod 644 may have facets to facilitate its rotational connection to the handle 646 and to the first plunger body 642a. As can be seen in FIG. 32, the first plunger body 642a is shown with a hex-shaped aperture 686 for receiving a faceted end of the plunger rod 644. However, the plunger 628 is not, in the example shown, biased by a plunger clamping biasing member and so the facets are not needed to engage a sleeve like sleeve 576 that is shown in FIG. 27.

Figure 34A:
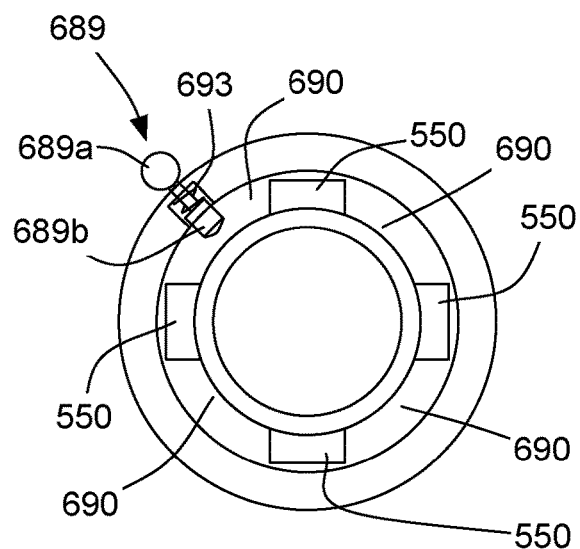
FIGS. 34a and 34b illustrate the movement of a counter-rotation preventing member that is part of the locking mechanism shown in FIG. 31.
Figure 34B:
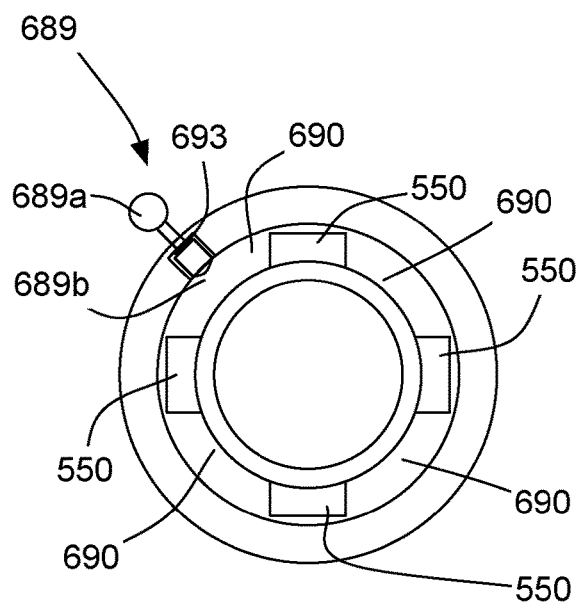

Referring to FIGS. 34a and 34b, the locking mechanism 600 further includes a counterrotation prevention member 689 that is used to hold the second plunger body portion 642b rotationally when the first and second plunger body portions 642a and 642b are being screwed together. The counterrotation prevention member 689 has a handle 689a that is on the exterior of the second frame element 514 and a plunger 689b that extends radially into the second frame element aperture 526 when the counterrotation prevention member 689 is in the operative position (as shown in FIG. 34a). A counterrotation prevention member biasing member 693 urges the counterrotation prevention member 689 towards the operative position. The counterrotation prevention member 689 is movable between the operative position and an inoperative position (FIG. 34b).

Figure 33A:
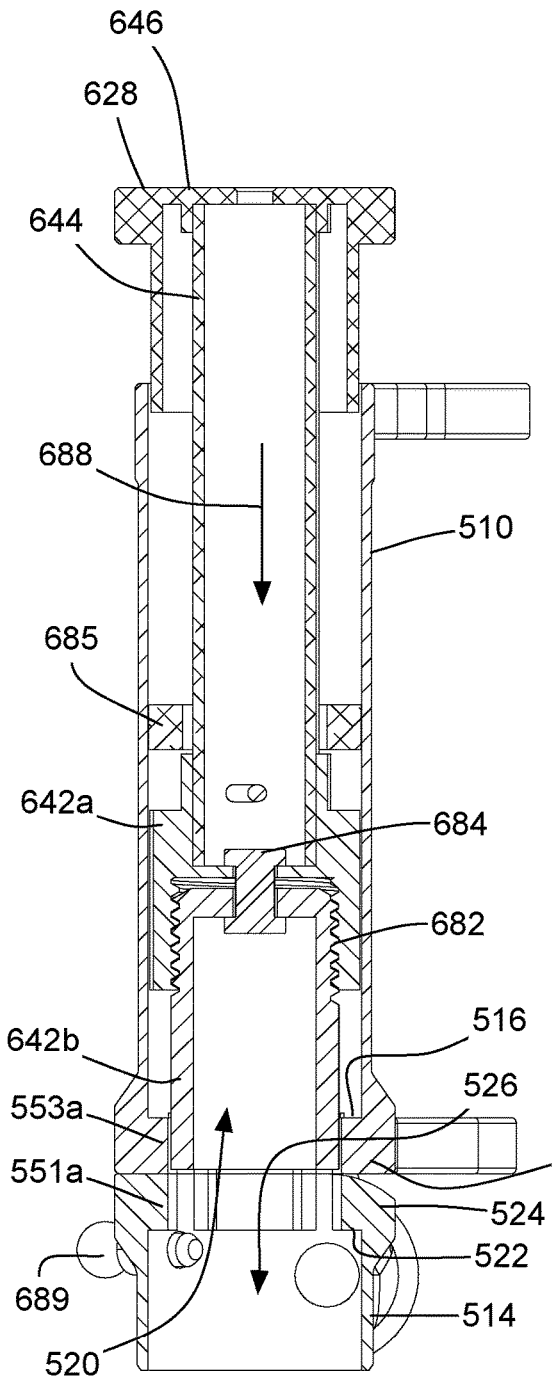
FIG. 33a is a sectional elevation view of the locking mechanism shown in FIG. 31 with the plunger in a release position.
Figure 33B:
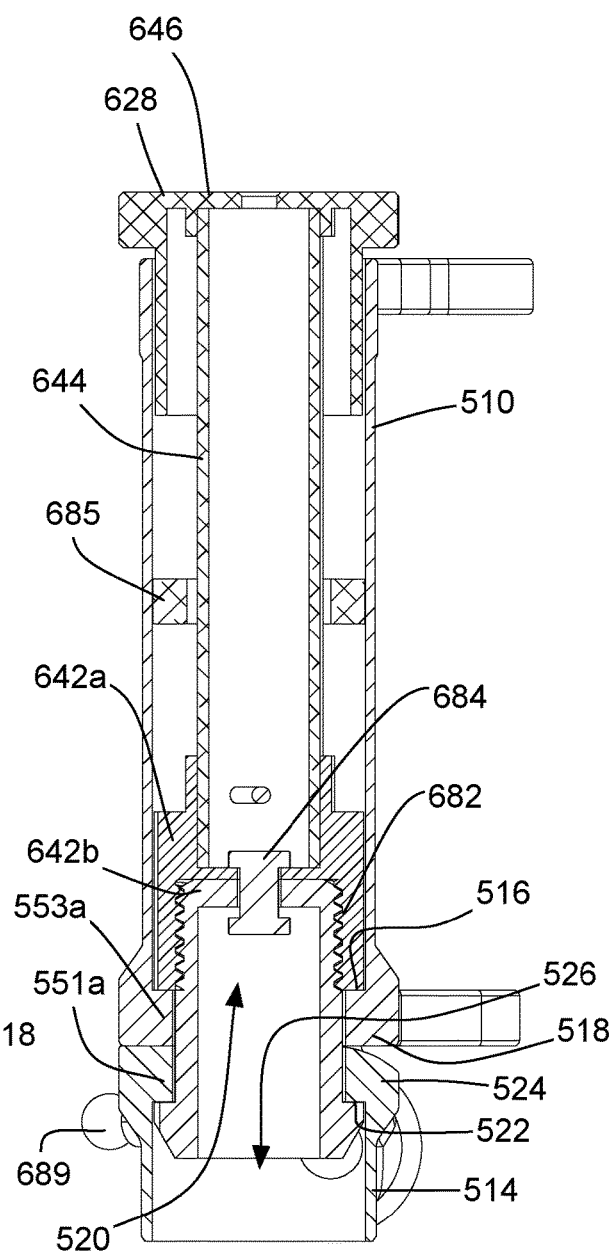
FIG. 33b is a sectional elevation view of the locking mechanism shown in FIG. 31 with the plunger in a clamping position.

The operation of the plunger 628 is as follows, with reference to FIGS. 33a and 33b. FIG. 33a shows the plunger 628 in the release position. As in the embodiment shown in FIG. 27, the projections 550 on the plunger 628 remain in the slots 554 (not shown in FIG. 31) when the plunger 628 is in the release position due to the engagement of the limit surfaces 558 and 560 on the plunger 628 and the insert shown at 685 mounted to the interior surface of the first frame element 510. It will be noted that the first and second plunger body portions 642a and 642b may be axially separated from one another by a selected amount when the plunger 628 is in the release position.

To move the plunger 628 to the locking position, the plunger 628 is first moved axially in the direction of arrow 688 (downward in the view shown in FIG. 33a). The plunger 628 is moved downwardly until the projections 550 pass into the second aperture 526 sufficiently to clear the slots 552. As the projections 550 leave the slots 552, a leading face 692 on one of the projections 550 engages the counterrotation prevention member 689 and pushes it to the inoperative position against the biasing force of the counterrotation prevention member biasing member 693. Thus, in this position, the counterrotation prevention member 689, because it is engaged with the outside of one of the projections 550 does not prevent rotation of the plunger 628.

Thus, the plunger 628 can be rotated in a first rotational direction so that the second plunger locking surface 532 is brought into alignment with the second frame element locking surface 522. When this rotation occurs, the projection 550 that was blocking the counterrotation prevention member 689 moves out of the way and the counterrotation prevention member 689 is then moved to the operative position where it is positioned in the gap 690 between two adjacent projections 550. During rotation of the plunger 628 into this position, the plunger locking member 536 (FIG. 31) may need to be moved into its release position.

Once the counterrotation prevention member 689 is in the operative position, the user can turn the plunger 526 in a second rotational direction to begin tightening the first and second plunger body portions 642a and 642b together, until the first and second plunger body portions 642a and 642b are well tightened on the first and second frame element locking surfaces 516 and 522. During this rotation in the second rotational direction, the plunger locking member 536 can simply ride over the teeth 562 in typical fashion of a pawl and ratchet. Once tightened as desired, the counterrotation prevention member 689 and the plunger locking member 536 cooperate to prevent the first and second plunger body portions 642a and 642b from rotating in the direction towards separating.

When it is desired to unlock the first and second frame elements 510 and 514, the user first moves the plunger locking member 536 to the release position. The user can then rotate the plunger handle 646 and therefore the first plunger body portion 642a in the first rotational direction so as to unthread the first and second plunger body portions 642a and 642b from one another.

Once the two plunger body portions 642a and 642b are sufficiently unthreaded to loosen their engagement with the first and second frame element locking surfaces 516 and 522, the user can pull the counterrotation prevention member 689 to its inoperative position and can rotate the plunger 628 in the second rotational direction to bring the projections 550 into alignment with the slots 552. At that point the user can pull the plunger 628 (and/or allow the plunger release biasing member 540 to drive the plunger 628) to its release position shown in FIG. 33a.

Figure 35:
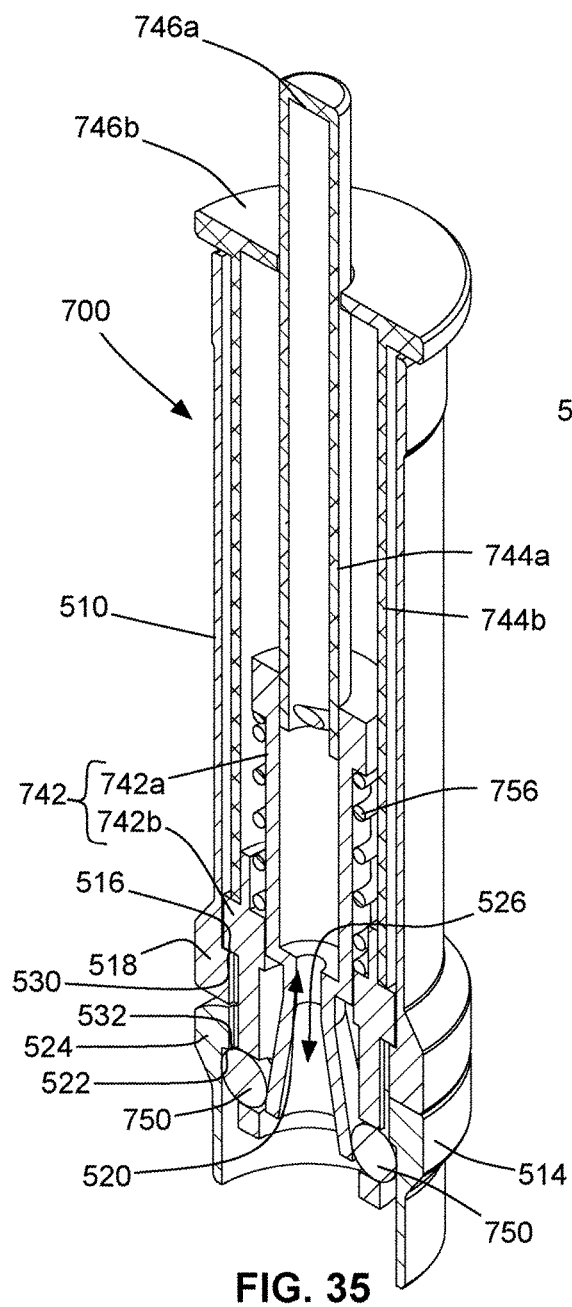
Figure 36A:
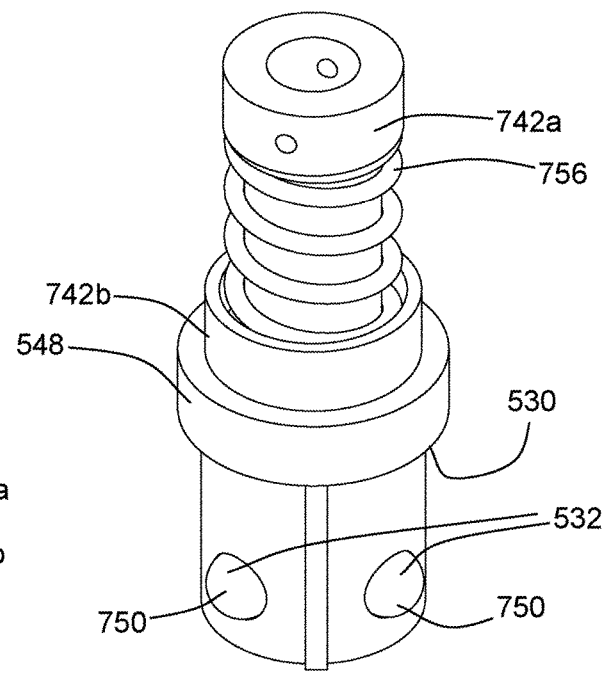
FIG. 36a is a perspective view of a portion of a plunger that is part of the locking mechanism shown in FIG. 35, containing a first type of wedge member.
Figure 36B:
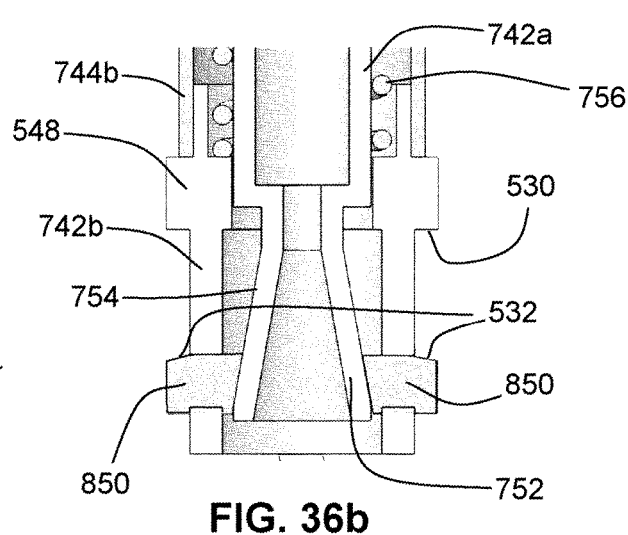
FIG. 36b is a sectional perspective view of a portion of the plunger that is part of the locking mechanism shown in FIG. 35, containing a second type of wedge member.

Reference is made to FIG. 35, which shows another locking mechanism at 700 that can be used in place of the locking mechanism 512. The locking mechanism 700 may be similar to the locking mechanism 512 and may include elements with similar functions as those in the locking mechanism 512 (and which may be identified with the same reference numbers even if slightly different in shape). Differences between the locking mechanism 700 and the locking mechanism 512 are described below. The locking mechanism 700 includes a plunger 628 that includes a plunger body 742 that is divided into a first plunger body portion 742a and at least one second plunger body portion 742b. A first plunger rod 744a extends between the first plunger body portion 742a and a plunger handle 746a that is outside the first frame element 510. A second plunger rod 744b extends between the second plunger body portion 742b and a second handle 746b outside the first frame element 510. The second plunger portion 742b has the first plunger locking surface 530 thereon (on a flange 548), and also includes at least one wedge member 750. The at least one wedge member 750 provides the second plunger locking surface 532. In the example shown, there are four wedge members 750, however a greater or smaller number of wedge members may be provided. In the example shown in FIGS. 35, 36a and 37a and 37b, the wedge members 750 are shown to be balls (e.g. steel balls), however other shapes of wedge member may be provided, such as, for example, rectangular elements 850 shown in FIG. 36b, with chamfered surfaces thereon that act as the locking surface 532. The wedge members 750 are positionable in a projected position (FIG. 37b) in which the wedge members 750 are held projected from the second plunger body portion 742b, and a retraction position FIG. 37a) in which the wedge members 750 are permitted to retract into the second plunger body portion 742b.

Figures 37A, 37B:
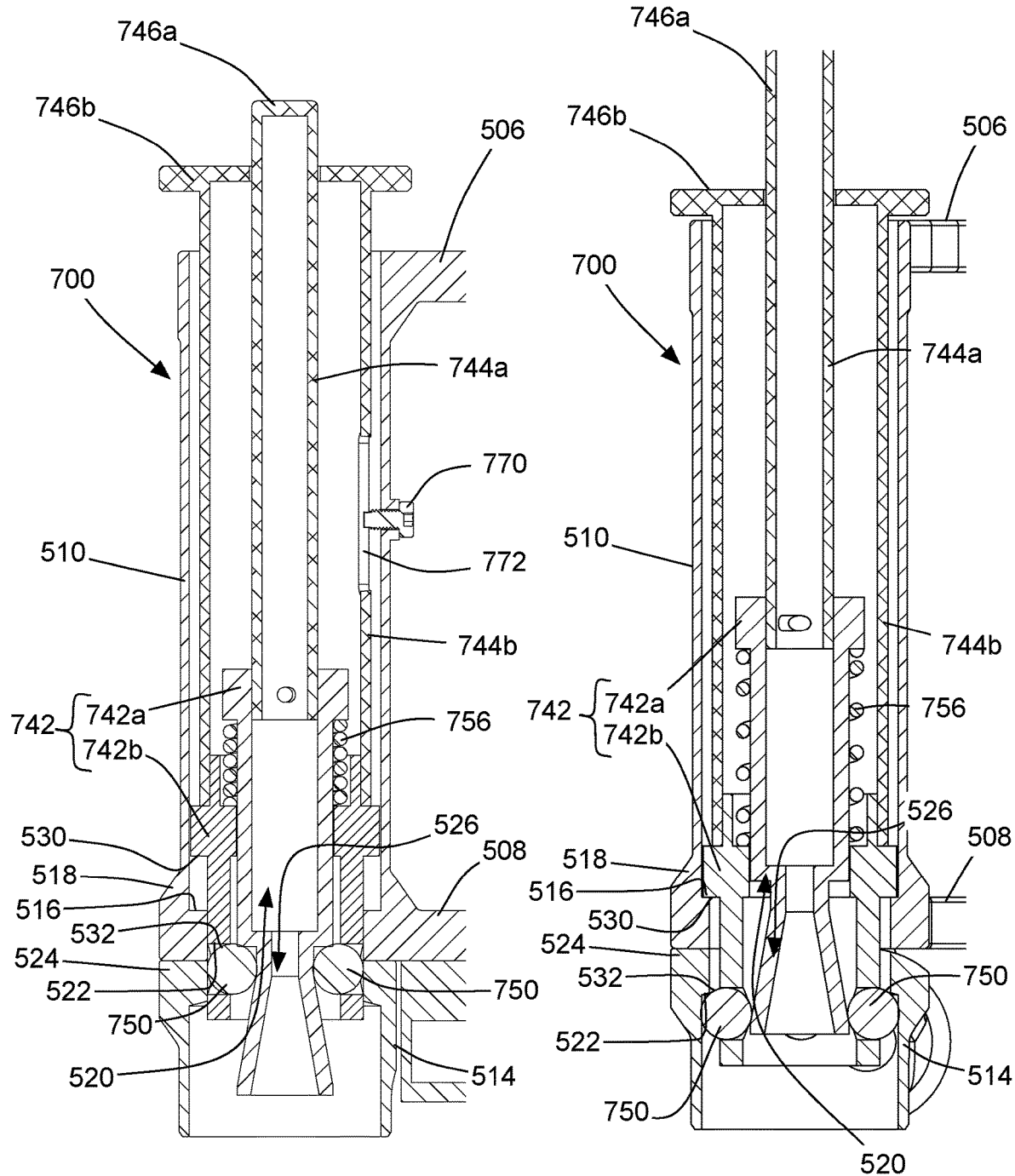
FIG. 37a is a sectional elevation view of the locking mechanism shown in FIG. 35 with the plunger in a release position.
FIG. 37b is a sectional elevation view of the locking mechanism shown in FIG. 35 with the plunger in a clamping position.

The first plunger body portion 742a has a wedge member driver 752 thereon. The wedge member driver 752 is movable between a wedge member retraction position, as shown in FIG. 37a, and a wedge member projection position, as shown in FIG. 37b. When the wedge member driver 752 is in the wedge member retraction position, the wedge members 750 are permitted to move to the retraction position shown in FIG. 37a. When the wedge member driver 752 is in the wedge member projection position, a conical wedge member drive surface 754 on the wedge member driver 752 urges the wedge members 750 to move to the projected position shown in FIG. 37b. The wedge member drive surface 754 need not be conical but could have any tapered shape (e.g. pyramidal) to progressively drive the wedge members 750 outward. A plunger body biasing member 756 (e.g. a helical compression spring) urges the first and second plunger body portions 742a and 742b apart, which, in turn, drives the wedge member driver 752 towards the wedge member projection position, which drives the wedge members 750 further outward from the second plunger body portion 742b. The more the wedge members 750 project from the second plunger body portion 742b, the greater the clamping force that is exerted between the first and second frame element locking surfaces 516 and 522, (which means the greater the amount of tension that is present in the second plunger body portion 742b). the force of the biasing member 756 may be sufficient to drive wedge member driver 752 sufficiently, to drive the wedge members 750 outward sufficiently to clamp against the second frame element locking surface 522 sufficiently to hold the first and second frame elements 510 and 514 together during operation of the bicycle 10. Alternatively, a plunger locking member (not shown) that is similar to the plunger locking member 736 but is positioned on the second plunger body portion 742b and is oriented to engage a series of teeth that extends axially along the plunger rod 744 so as to hold the wedge member driver 752 in the wedge member projection position until the user manually pivots the plunger locking member out of the way. Use of a plunger locking member also permits the user to pull up on the first plunger body portion 742a to drive the wedge members 750 out even farther then they are driven by the biasing member 756, and to have the plunger locking member present to lock the first plunger body portion 742a in whatever position was achieved by the user. In embodiments in which the biasing member 756 is sufficiently strong, it may be considered the plunger locking member. In embodiments wherein it is not sufficiently strong, a separate plunger locking member, such as that described above, may be provided.

To move the plunger 728 to a release position from a clamping position (FIG. 37b), the user unlocks the plunger locking member (not shown) if there is one, and pushes down on the first plunger body portion 742a via the first handle 746a, thereby moving the wedge member driver 752 to the wedge member retraction position. The user pulls up on the second plunger body portion 742b (via the second plunger handle 746b) thereby pulling the second plunger member out of the second aperture 526 so that it is only in the first aperture 520. If desired, the second plunger body portion 742b can be pulled upward (in the view shown in FIG. 37b) sufficiently so that the wedge members 750 engage the first frame element locking surface 516, at which point the first plunger body portion 742a can be permitted to drive the wedge members 750 outward to prevent the second plunger body portion 742b from moving into the second aperture 526 inadvertently. A limit member such as a screw 770 (shown in the view shown in FIG. 37a) may be mounted to the first frame element 510 and may extend into a longitudinal slot 772 in the second plunger rod 744b can be used to prevent the second plunger body portion 742b from being removed altogether from the first frame element 510.

It will be noted that in the embodiment shown in FIGS. 35-37b, the first and second locking surfaces 516 and 522 need not be provided on projections with slots there between. The first and second locking surfaces 516 and 522 may simply be shoulders provided on inwardly extending flanges.

Aside from the locking mechanisms shown above, it is possible to provide other types of locking mechanism to clamp the first and second frame elements 510 and 514 together.

Figure 38:
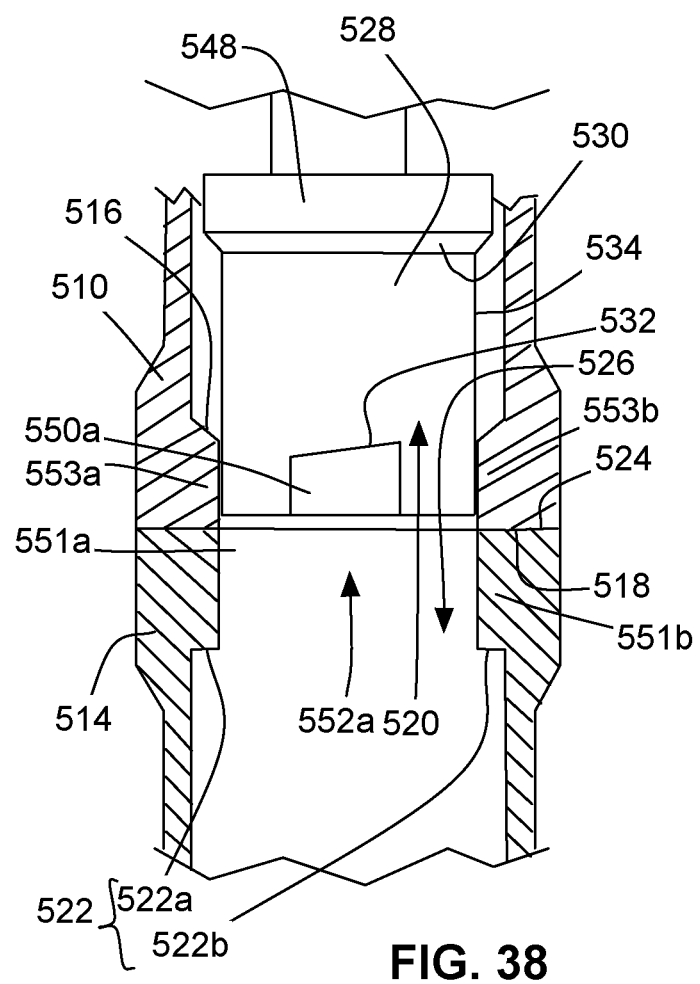
FIG. 38 is a sectional elevation view of an alternative first frame element locking surface that is angled.

For greater certainty, it will be understood that the first and second frame element locking surfaces 516 and 522 do not need to extend directly in the radial plane. At least one of these surfaces 516 and 522 could be angled so as to matingly receive a frustoconical shape and, in such a case, may be referred to as being a partially or entirely inverse-frustoconical surface, as the case may be. For example, FIG. 38 shows an embodiment where the first frame element locking surface 516 is inverse-frustoconical, and matingly receives a first plunger locking surface 530 that is frustoconical. In the example in FIG. 38, the second frame element locking surface 522 and the second plunger locking surface 532 may be similar to the surfaces 522 and 532 shown in any of FIGS. 25-37b. An embodiment in which at least one of the first and second frame element locking surfaces (e.g. surface 516) and its corresponding plunger locking surface (e.g. surface 530) are angled is advantageous in that they assist in centering the plunger in the apertures 520 and 526, which can improve the operation of the locking mechanism and the capacity of the locking mechanism to ensure that the joint formed between the first and second frame elements 510 and 514 is strong.

While it has been shown for each embodiment in FIGS. 25-38 to show a plunger locking member (e.g. plunger locking member 536), it will be understood that such a member is advantageous in reducing the likelihood of unintentional release of the plunger from the clamping position but such a member is optional and could be omitted. For greater certainty, the surfaces 516 and 522 in FIG. 38 are still considered to generally face away from one another.

As noted above, it is preferable for the plunger body 542 to be in tension during the engagement of the plunger locking surfaces 530 with the first and second frame element locking surfaces 516 and 522. This helps provide a rattle-free joint between the first and second frame elements 510 and 514. However, for greater certainty, it is not strictly necessary for the plunger (e.g. plunger 528) to be in tension when in the clamping position. It is possible for the locking mechanism to work where the surfaces 516 and 522 on the first and second frame elements 510 and 514 are engaged by the surfaces 530 and 532 on the plunger so as to clamp the first and second frame elements 510 and 514 together substantially without tension in the intermediate portion 534 of the plunger body 542.

In each of the embodiments shown in FIGS. 25-38, the ends 518 and 524 of the first and second frame elements 510 and 514 have been abutted with one another when the plunger locks the frame elements 510 and 514 together. However, it will be understood that this need not be the case. For example it is optionally possible for them to each abut some other element (such as a portion of the plunger itself) when the plunger is in the clamping position.

The plunger locking member 536 has been shown to incorporate a pawl 564 to engage the teeth 562 on the plunger body 542. However, it will be noted that the plunger locking member 536 could incorporate any tooth engaging element, such as a plurality of plunger locking member teeth (not shown) that are shaped similarly to the teeth 562 but which are on the plunger locking member 536. The plunger locking member teeth could engage the teeth 562 to lock the plunger in the clamping position, similarly to how the pawl 564 locks the plunger 528 in FIG. 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A compactable bicycle, comprising:
    a frame including a base frame portion having a rear wheel mounted thereto for engagement with a ground surface for supporting the compactable bicycle thereon and a steering structure rotatably mounted to the base frame portion and having a front wheel connected thereto for engagement with the ground surface for supporting the compactable bicycle thereon,
    wherein at least one of the base frame portion and the steering structure includes a first frame element having a first frame element locking surface, a first end, and a first aperture at the first end, and a second frame element having a second frame element locking surface, a second end and a second aperture at the second end, wherein the first and second frame elements are positionable in a first position in which the first and second apertures are generally aligned with one another and the first and second frame element locking surfaces generally face away from one another, and in a second position in which the first and second apertures are generally unaligned with one another;
    a plunger having a first plunger locking surface, a second plunger locking surface, wherein the plunger is movable to a clamping position in which the plunger extends in both the first and second apertures such that the first plunger locking surface engages the first frame element locking surface and the second plunger locking surface engages the second frame element locking surface,
    and wherein the plunger is movable to a release position in which the plunger retracts from the second aperture sufficiently to permit the first and second ends to be separated from one another.

2. A compactable bicycle as claimed in claim 1, further comprising a plunger locking member that is positionable to engage the plunger to prevent movement of the plunger away from the clamping position.

3. A compactable bicycle as claimed in claim 2, wherein the plunger has a toothed surface and wherein the plunger locking member includes a pawl that is biased towards engagement with the toothed surface.

4. A compactable bicycle as claimed in claim 1, wherein, when the plunger is in the clamping position the first and second ends are abutted with one another.

5. A compactable bicycle as claimed in claim 1, wherein the plunger has an intermediate plunger portion between the first and second plunger locking surfaces, and wherein, when the plunger is in the clamping position the intermediate plunger portion is in tension.

6. A compactable bicycle as claimed in claim 1, wherein the plunger has a plunger axis and wherein the second plunger locking surface and the second frame element locking surface are both sloped in a generally circumferential direction.

7. A compactable bicycle as claimed in claim 1, wherein the plunger has a plunger axis, and wherein the second plunger locking surface is one of a plurality of second plunger locking surfaces provided on a plurality of plunger projections that extend radially outwardly, and wherein the second frame element locking surface is one of a plurality of second frame element locking surfaces provided on a plurality of radial projections that extend radially inwardly, wherein the plunger is axially slidable to bring the plunger projections past the radial projections and is rotatable in a first rotational direction about the plunger axis to bring the plurality of plunger locking surfaces at least into engagement with the plurality of second frame element locking surfaces, to clamp the first and second frame elements together.

8. A compactable bicycle as claimed in claim 1, further comprising a plunger clamping biasing member that urges the plunger towards the clamping position.

9. A compactable bicycle as claimed in claim 8, wherein the plunger clamping biasing member is a torsion spring having a first end that is connected to the first frame element, and a second end connected to a sleeve, wherein the sleeve is rotationally connected to the plunger but permits axial movement of the plunger relative thereto.

10. A compactable bicycle as claimed in claim 1, further comprising a plunger release biasing member that urges the plunger towards the release position.

11. A compactable bicycle as claimed in claim 1, wherein the plunger includes a plunger body having a first plunger body portion and a second plunger body portion, wherein the first plunger body portion has the first plunger locking surface thereon and the second plunger body portion has the second plunger locking surface thereon, wherein the first and second plunger body portions are connected together via a threaded connection, wherein tightening of the threaded connection clamps the first and second plunger body portions onto the first and second frame element locking surfaces when the plunger is in an engagement position.

12. A compactable bicycle as claimed in claim 1, wherein the plunger includes a plunger body having a first plunger body portion and a second plunger body portion, wherein the second plunger body portion has the first plunger locking surfaces thereon, and further has at least one wedge member thereon that has the second plunger locking surface thereon, wherein a wedge member driver is provided on the first plunger body portion and is movable between a wedge member retraction position in which the wedge member driver permits the at least one wedge member to retract relative to the second plunger body portion and a wedge member projection position in which the wedge member driver drives the at least one wedge member to project outwards from the second plunger body portion to clamp against the second frame element locking surface.

\* \* \* \* \*